United States Patent
Leontaris et al.

(10) Patent No.: US 9,282,343 B2
(45) Date of Patent: Mar. 8, 2016

(54) MULTIVIEW AND BITDEPTH SCALABLE VIDEO DELIVERY

(75) Inventors: Athanasios Leontaris, Mountain View, CA (US); Yan Ye, San Diego, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 209 days.

(21) Appl. No.: 14/237,348

(22) PCT Filed: Aug. 31, 2012

(86) PCT No.: PCT/US2012/053442
§ 371 (c)(1),
(2), (4) Date: Feb. 5, 2014

(87) PCT Pub. No.: WO2013/033596
PCT Pub. Date: Mar. 7, 2013

(65) Prior Publication Data
US 2014/0348232 A1    Nov. 27, 2014

Related U.S. Application Data

(60) Provisional application No. 61/529,548, filed on Aug. 31, 2011.

(51) Int. Cl.
| | |
|---|---|
| H04N 19/00 | (2014.01) |
| H04N 19/63 | (2014.01) |
| H04N 19/597 | (2014.01) |
| H04N 19/61 | (2014.01) |
| H04N 19/37 | (2014.01) |
| H04N 19/186 | (2014.01) |

(Continued)

(52) U.S. Cl.
CPC ............. *H04N 19/63* (2014.11); *H04N 19/186* (2014.11); *H04N 19/31* (2014.11); *H04N 19/33* (2014.11); *H04N 19/36* (2014.11); *H04N 19/37* (2014.11); *H04N 19/503* (2014.11); *H04N 19/593* (2014.11); *H04N 19/597* (2014.11); *H04N 19/61* (2014.11)

(58) Field of Classification Search
CPC ............................ H04N 19/63; H04N 19/186
USPC ..................................... 375/240.12
See application file for complete search history.

(56) References Cited

U.S. PATENT DOCUMENTS

| | | | |
|---|---|---|---|
| 8,619,852 B2 | 12/2013 | Leontaris | |
| 2002/0021761 A1* | 2/2002 | Zhang | H04N 19/89 375/240.27 |

(Continued)

FOREIGN PATENT DOCUMENTS

EP    1737240    12/2006

OTHER PUBLICATIONS

D.C. Hutchison "Introducing DLP 3-D TV".

(Continued)

*Primary Examiner* — Sath V Perungavoor
*Assistant Examiner* — Jeffery Williams

(57) ABSTRACT

A video encoding and decoding system for use in a multiview and bitdepth coding system is described. Such system can comprise a plurality of layer groupings, where each group can be adapted to encode and/or decode based on predictions from previous layers and a plurality of data categories from the input video data.

25 Claims, 43 Drawing Sheets

(51) Int. Cl.
  *H04N 19/33* (2014.01)
  *H04N 19/31* (2014.01)
  *H04N 19/36* (2014.01)
  *H04N 19/503* (2014.01)
  *H04N 19/593* (2014.01)

(56) References Cited

U.S. PATENT DOCUMENTS

| | | |
|---|---|---|
| 2005/0259729 A1 | 11/2005 | Sun |
| 2012/0026288 A1 | 2/2012 | Tourapis |
| 2012/0092452 A1 | 4/2012 | Tourapis |
| 2013/0106998 A1 | 5/2013 | Pahalawatta |
| 2013/0113884 A1 | 5/2013 | Leontaris |

OTHER PUBLICATIONS

T-REC-H.264 "Advanced Video Coding for Generic Audiovisual Services" Mar. 2010.

SMPTE 421M, "VC-1 Compressed Video Bistream Format and Decoding Process" Apr. 2006.

Bankoski, J et al. "Technical Overview of VP8, an Open Source Video Codecs for the Web", Google, Inc., Technical Report 2010.

Gao, Y et al. "Applications and Requirements for Color Bit Depth SVC" Document No. JVT-U049, Oct. 2006.

Gao, Y et al. "Bit Depth Scalability", Document No. JVT-V061, Jan. 2007.

Winken, M. et al "SVC Bit Depth Scalability", Document No. JVT-V078, Jan. 2007.

Wiegand, T. et al. "WD3: Working Draft 3 of High Efficiency Video Coding" ITU-T/ISO/IEC JCT-VC, Doc JCTVC-E603, Mar. 2011.

Bossen, F. et al. "JCT-VC AHG Report: Software Development and HM Software Technical Evaluation", Document No. JCTVCD003, Jan. 2011.

Segall, A. et al "System for Bit-Depth Scalable Coding" Document No. JVT-W113, Apr. 2007.

Vetro, A et al. "Overview of the Stereo and Multiview Video Coding Extensions of the H.264/MPEG-4 AVC Standard" Proc. of the IEEE, New York, vol. 99, No. 4, Apr. 1, 2011, pp. 626-642.

Tourapis, A et al. "A Frame Compatible System for 3D Delivery" MPEG meeting Geneva, Jul. 26, 2010.

* cited by examiner

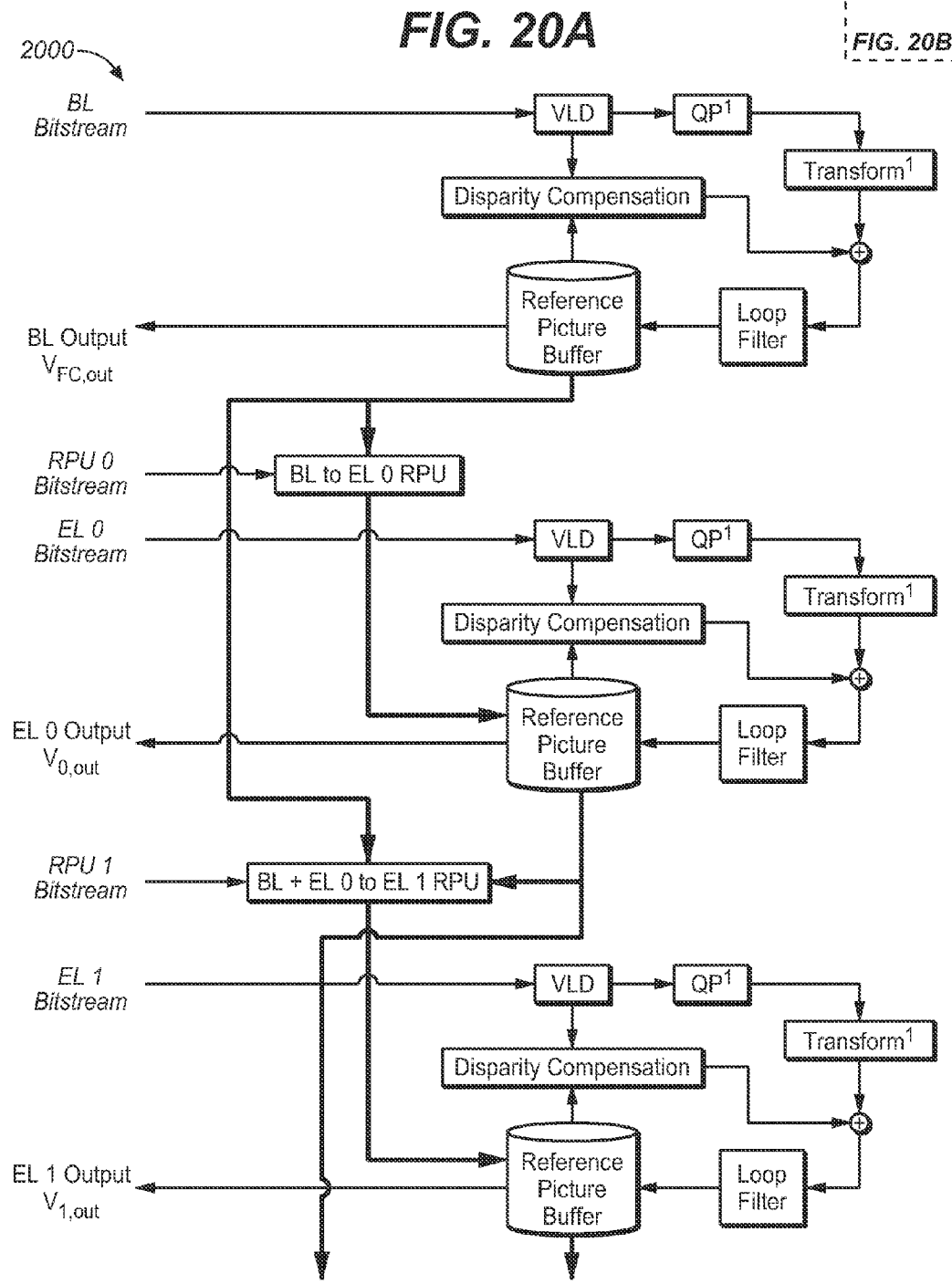

MULTIVIEW AND BITDEPTH SCALABLE VIDEO DELIVERY

CROSS-REFERENCE TO RELATED APPLICATIONS

This application claims priority to U.S. Provisional Application No. 61/529,548 filed 31 Aug. 2011, hereby incorporated by reference in its entirety.

TECHNOLOGY

The present disclosure relates to frame-compatible video encoding and decoding. Moreover, it relates to multiview and bitdepth scalable video delivery.

BACKGROUND

There has been considerable interest and traction in industry towards stereoscopic (3D) video delivery. Industry parties are investing considerable effort into the development and marketing of consumer 3D-capable displays (reference [1]). Delivery of 3D content can be equally critical. Content delivery can comprise several components, one of which can be compression. Stereoscopic delivery can be challenging, in part due to doubling of the amount of information. Furthermore, computational and memory throughput requirements can increase considerably as well. In general, can be two main consumer distribution channels for stereoscopic content: fixed media, such as BLU-RAY DISCS™, and streaming solutions where the content is delivered primarily to a set-top box and secondarily to a PC. The majority of the currently deployed BLU-RAY™ players and set-top boxes support codecs such as those based on the profiles of Annex A of the ITU-T/ISO/IEC H.264/14496-10 of reference [2], state-of-the-art video coding standard (also known as MPEG-4 Part 10/AVC), the VP8 video compression format of reference [4], the SMPTE VC-1 standard of reference [3], and the HEVC standard reference [18]. To deliver stereoscopic content, one may desire to transmit information for two views, a left view and a right view. To drive autostereoscopic displays that support multiple-views and viewing angles, one may need to transmit information for more than two views. It is also possible to transmit 2 or more views plus some stereo depth information and then synthesize intermediate views by exploiting the transmitted depth and view data. A simple and practical solution is to encode separate bitstreams, one for each view or depth information data, an approach also known as simulcast. However, compression efficiency can suffer since, for the case of 2 views, the left and right view sequences are coded independently from each other even though they are correlated. Thus, improvements can be made for compression efficiency for stereoscopic video while maintaining backwards compatibility. Compatibility is possible by adopting multi-layer codecs.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
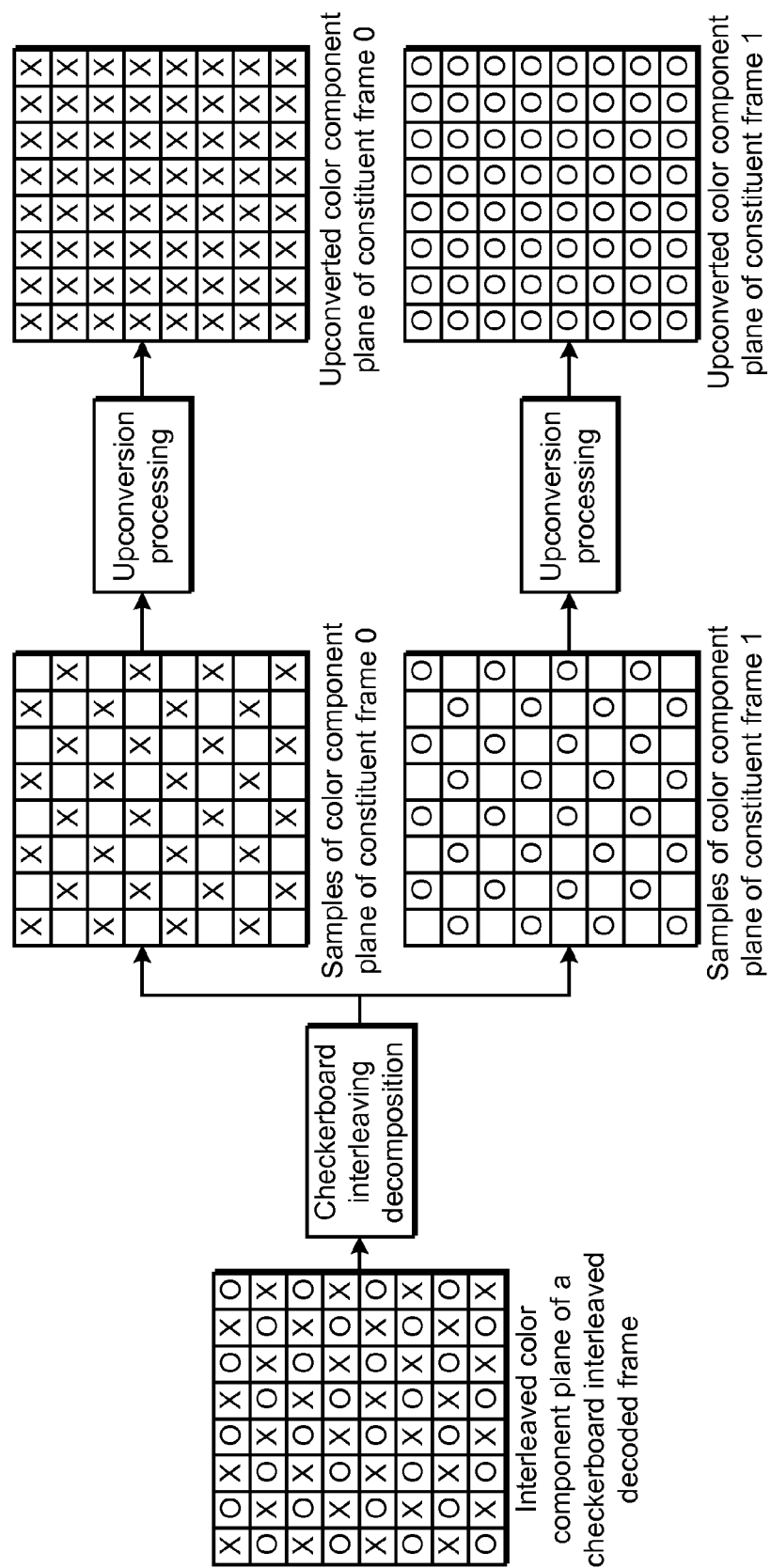
FIG. 1 shows a checkerboard interleaved arrangement for delivery of stereoscopic material.
Figure 2:
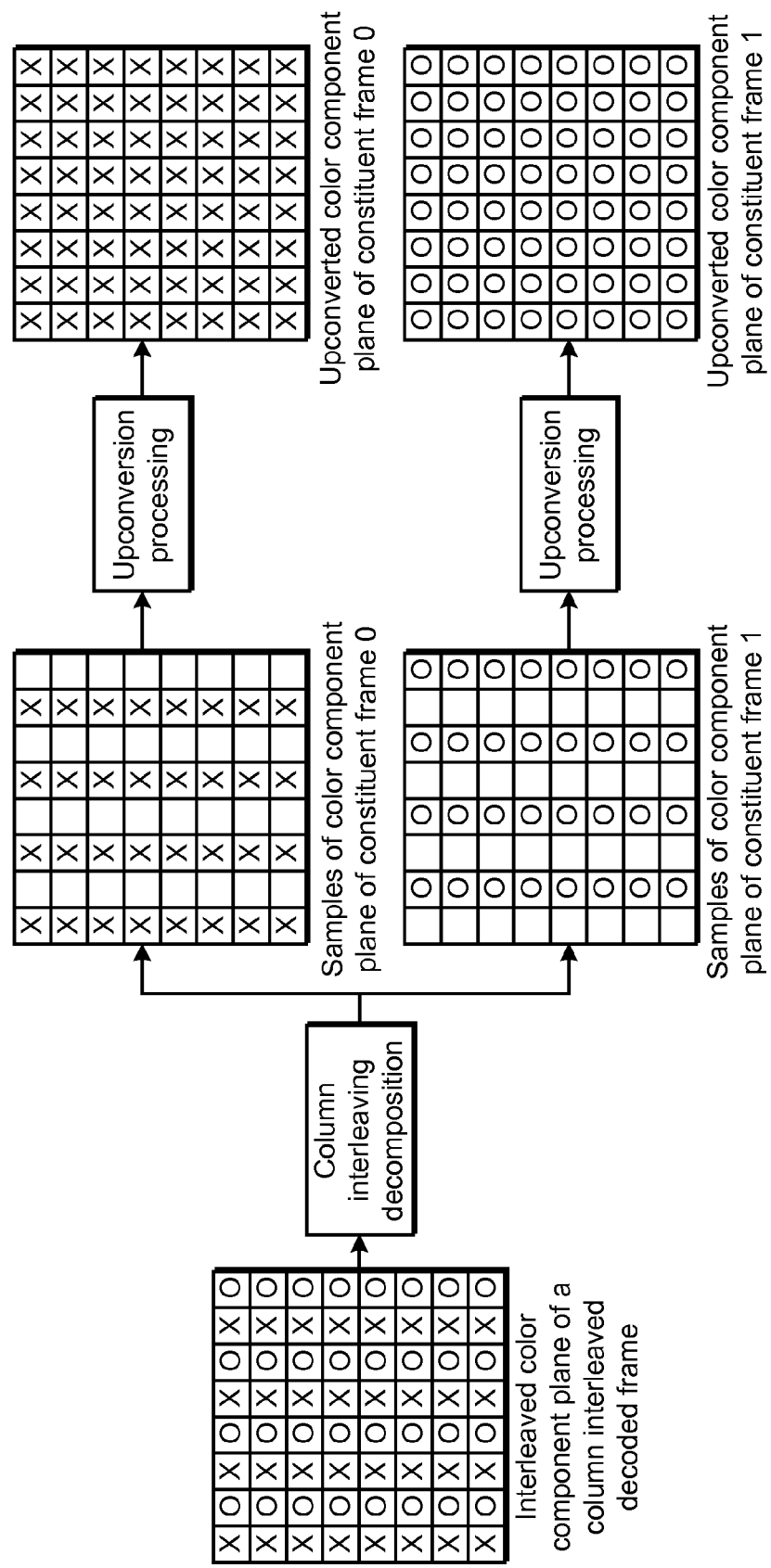
FIG. 2 shows a horizontal sampling/column interleaved arrangement for the delivery of stereoscopic material.
Figure 3:
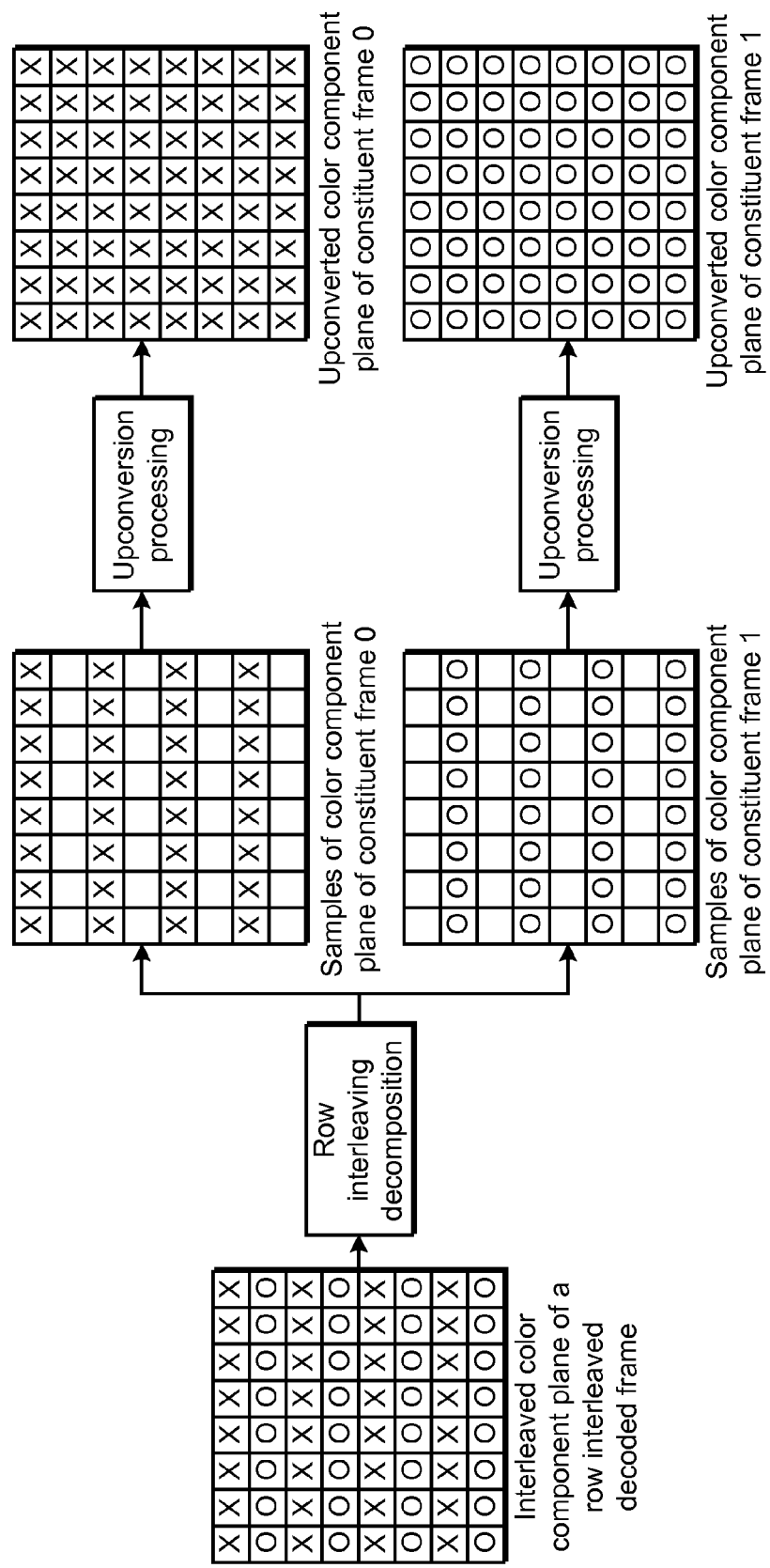
FIG. 3 shows a vertical sampling/row interleaved arrangement for the delivery of stereoscopic material.
Figure 4:
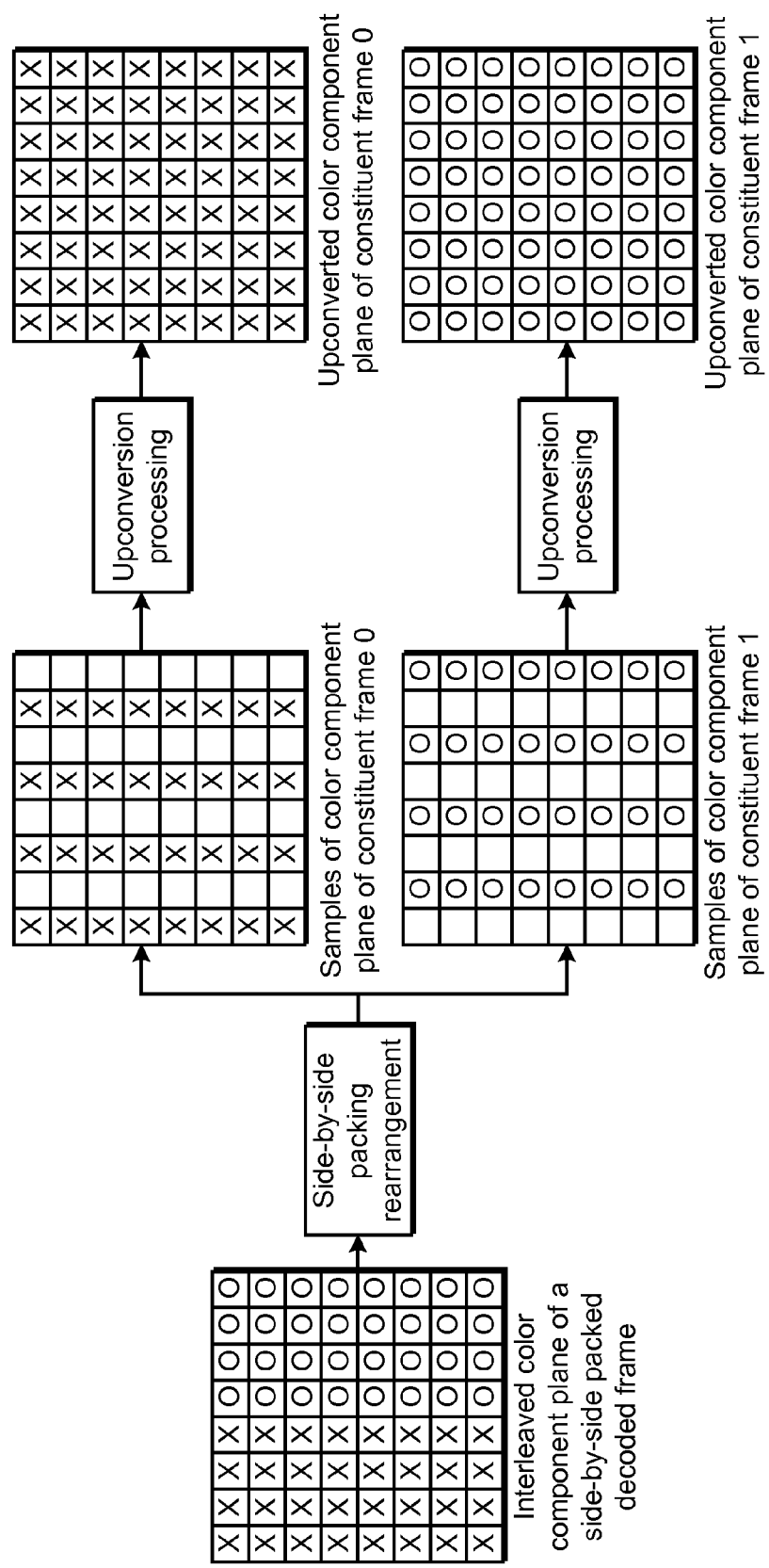
FIG. 4 show a horizontal sampling/side by side arrangement for the delivery of stereoscopic material.
Figure 5:
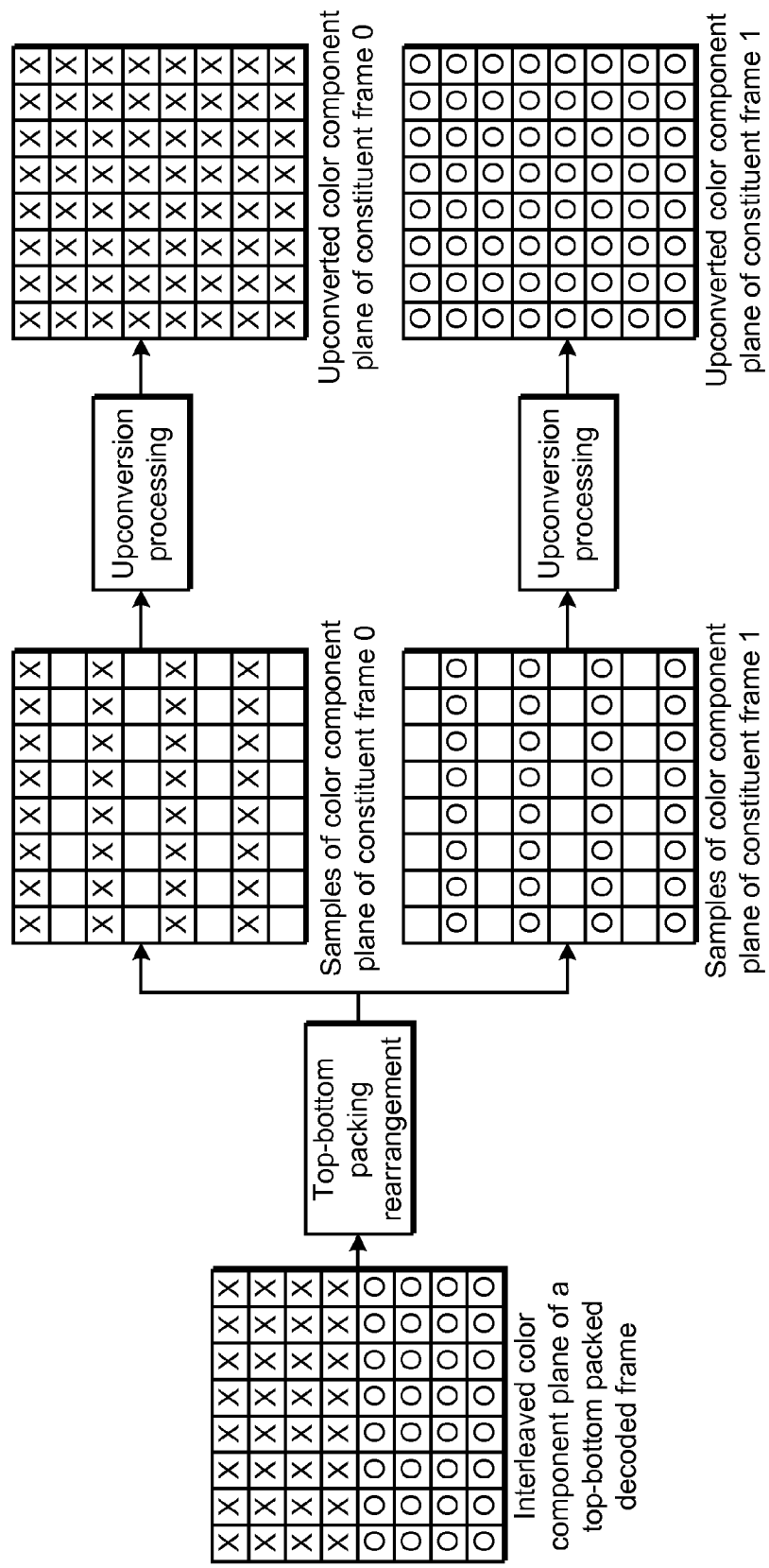
FIG. 5 shows a vertical sampling/over-under (top-and-bottom) arrangement for the delivery of stereoscopic material.
Figure 6:
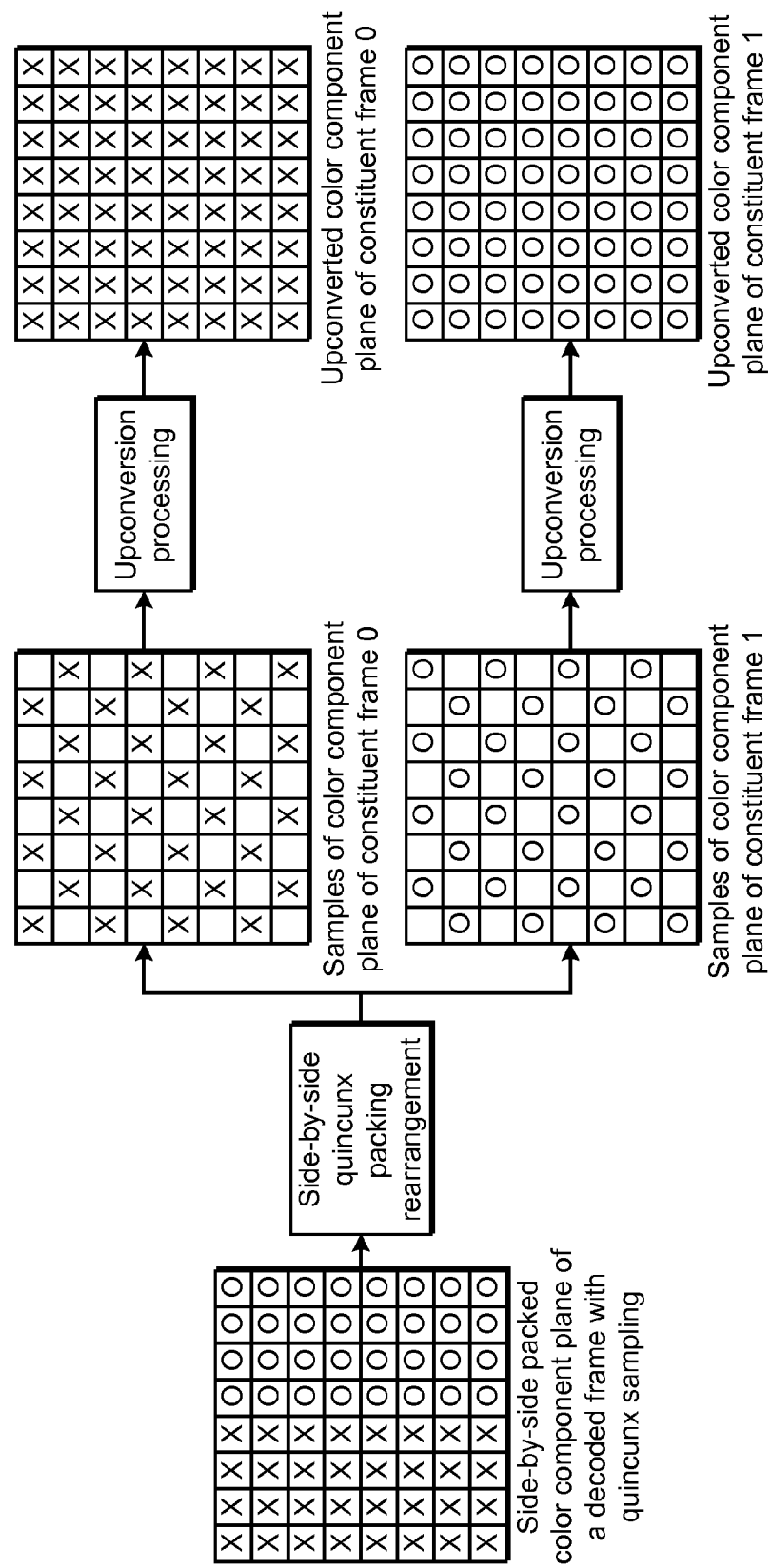
FIG. 6 shows a quincunx sampling/side by side arrangement for the delivery of stereoscopic material.

According to a first aspect a method of encoding input video data into bitstreams is described, the input video data comprising a plurality of video data categories, the method comprising: providing a first layer, wherein the first layer comprises a lower capability frame-compatible representation of the plurality of video data categories from the input video data; and providing a layer grouping, the layer grouping comprising at least one second, higher capability, layer, and one third, higher capability, layer, the second higher capability layer comprising a second layer frame-compatible representation of the plurality of video data categories from the input video data, and/or also on the basis of predictions from the first layer, and the high capability third layer comprising a third layer frame-compatible representation of the plurality of video data categories from the input video data, and/or also on the basis of predictions from the second layer, the third layer representation being complementary with respect to the second layer representation; encoding the first layer to generate a first layer bitstream; generating a first layer filtered reconstructed image based on the first layer bitstream in a first layer reference picture buffer; encoding the second higher capability layer to generate a second layer bitstream, wherein the second layer bitstream is generated by considering at least one selected from the group consisting of: a difference between the second layer representation and the first layer filtered reconstructed image, inter prediction of temporally decoded pictures of the second layer, and intra prediction of the second layer; generating a second layer filtered reconstructed image based on the second layer bitstream in a second layer reference picture buffer; and encoding the higher capability third layer to generate a third layer bitstream, wherein the third layer bitstream is generated by considering at least one selected from the group consisting of: a difference between the third layer representation and the second layer filtered reconstructed image, inter prediction of temporally decoded pictures of the third layer, and intra prediction of the third layer.

According to a second aspect, a method of encoding input video data into bitstreams is described, the input video data comprising a plurality of video data categories, the method comprising: providing a first layer, wherein the first layer comprises a frame-compatible representation of the plurality of video data categories from the input video data; providing a layer grouping, the layer grouping comprising at least one second, lower capability, layer and one third, lower capability, layer, the second lower capability layer comprising a second layer two-dimensional compatible representation of the plurality of video data categories from the input video data, and/or also on the basis of prediction from the first layer, and the third lower capability layer comprising a third layer two-dimensional compatible representation of the plurality of video data categories from the input video data, and/or also on the basis of prediction from the first layer; providing a further layer grouping, the further layer grouping comprising at least one fourth, higher capability, layer and a higher capability fifth layer, the fourth higher capability layer comprising a fourth layer representation of the plurality of video data categories from the input video data, and/or also on the basis of prediction from the second layer, and the fifth higher capability layer comprising a fifth layer representation of the plurality of video data categories from the input video data, and/or also on the basis of prediction from the third layer; encoding the first layer to generate a first layer bitstream; generating a first layer filtered reconstructed image based on the first layer bitstream in a first layer reference picture buffer; encoding the second lower capability layer to generate a second layer bitstream, wherein the second layer bitstream is generated by considering at least one selected from the group consisting of: a difference between the second layer frame-compatible representation and the first layer filtered reconstructed image, inter prediction of temporally decoded pictures of the second layer, and intra prediction of the second layer; generating a second layer filtered reconstructed image based on the second layer bitstream in a second layer reference picture buffer; encoding the third lower capability layer to generate a third layer bitstream, wherein the third layer bitstream is generated by considering at least one selected from the group consisting of: a difference between the third layer representation, the first layer filtered reconstructed image, and the second layer filtered reconstructed image, inter prediction of temporally decoded pictures of the third layer, and intra prediction of the third layer; generating a third layer filtered reconstructed image based on the third layer bitstream in a third layer reference picture buffer; encoding the fourth higher capability layer to generate a fourth layer bitstream, wherein the fourth layer bitstream is generated by considering at least one selected from the group consisting of: a difference between the fourth layer representation and the third layer filtered reconstructed image, inter prediction of temporally decoded pictures of the fourth layer, and intra prediction of the fourth layer; generating the fourth layer filtered reconstructed image based on the fourth layer bitstream in a fourth layer reference picture buffer; encoding the fifth higher capability layer to generate a fifth layer bitstream, wherein the fifth layer bitstream is generated by considering at least one selected from the group consisting of: a difference between the fifth layer representation, third layer filtered reconstructed image, and the fourth layer filtered reconstructed image, inter prediction of temporally decoded pictures of the fifth layer, and intra prediction of the fifth layer.

According to a third aspect, a method of encoding input video data into bitstreams is described, the input video data comprising a plurality of video data categories, the method comprising: providing a first layer, wherein the first layer comprises a frame-compatible representation of the plurality of video data categories from the input video data; providing a layer grouping, the further layer grouping comprising at least one second, lower capability, layer, the second lower capability layer comprising a second layer frame-compatible representation of the plurality of video data categories from the input video data, and/or also on the basis of prediction from the first layer, the second layer representation being a multiplexed second representation of a first data category and a second data category; providing a further layer grouping, the second group comprising at least one third, higher capability, layer, the third layer comprising a third layer frame-compatible representation of the plurality of video data categories from the input video data, and/or also on the basis of prediction from the second layer, the third layer representation being a multiplexed third layer representation of a third data category and a fourth data category; encoding the first layer to generate a first layer bitstream; generating a first layer filtered reconstructed image based on the first layer bitstream in a first layer reference picture buffer; encoding the second lower capability layer to generate a second layer bitstream, wherein the second layer bitstream is generated by considering at least one selected from the group consisting of: a difference between the second layer multiplexed representation and the first layer filtered reconstructed image, inter prediction of temporally decoded pictures of the second layer, and intra prediction of the second layer; generating a second layer filtered reconstructed image based on the second layer bitstream in a second layer reference picture buffer; and encoding the higher capability third layer to generate a third layer bitstream, wherein the third layer bitstream is generated by considering at least one selected from the group consisting of: a difference between the third layer multiplexed frame-compatible representation and the second layer filtered reconstructed image, inter prediction of temporally decoded pictures of the third layer, and intra prediction of the third layer.

According to a fourth aspect, a method of encoding input video data into bitstreams is described, the input video data comprising a plurality of video data categories, the method comprising: providing a first layer, wherein the first layer comprises a frame-compatible representation of the plurality of video data categories from the input video data; providing a layer grouping, the layer grouping comprising at least one second, lower capability, layer comprising a second layer frame-compatible representation of the plurality of video data categories from the input video data, and/or also on the basis of prediction from the first layer, the second layer representation being complementary with respect to the first layer representation; providing a further layer grouping, the second group comprising at least one third, higher capability, layer and a fourth, higher capability, layer, the third higher capability layer comprising a third layer representation of the plurality of video data categories from the input video data, and/or also on the basis of prediction from the first layer and the second layer, and the fourth layer comprising a fourth layer representation of the plurality of video data categories from the input video data, and/or also on the basis of prediction from the second layer and the third layer; encoding the first layer to generate a first layer bitstream; generating a first layer filtered reconstructed image based on the first layer bitstream in a first layer reference picture buffer; encoding the second lower capability layer to generate a second layer bitstream, wherein the second layer bitstream is generated by considering at least one selected from the group consisting of: a difference between the second layer representation and the first layer filtered reconstructed image, inter prediction of temporally decoded pictures of the second layer, and intra prediction of the second layer; generating a second layer filtered reconstructed image based on the second layer bitstream in a second layer reference picture buffer encoding the third higher capability layer to generate a third layer bitstream, wherein the third layer bitstream is generated by considering at least one selected from the group consisting of: a difference between the third layer representation, the first layer filtered reconstructed image, and the second layer filtered reconstructed image, inter prediction of temporally decoded pictures of the third layer, and intra prediction of the third layer; generating a third layer filtered reconstructed image based on the third layer bitstream in a third layer reference picture buffer; and encoding the fourth higher capability layer to generate a fourth layer bitstream, wherein the fourth layer bitstream is generated by considering at least one selected from the group consisting of: a difference between the fourth layer representation, the first layer filtered reconstructed image, the second layer filtered reconstructed image, and the third layer filtered reconstructed image, inter prediction of temporally decoded pictures of the fourth layer, and intra prediction of the fourth layer.

According to a fifth aspect, a method of encoding input video data into bitstreams is described, the input video data comprising a plurality of video data categories, the method comprising: providing a first layer, wherein the first layer comprises a first lower capability layer representation of a first video data category from the input video data; providing a layer grouping, the layer grouping comprising at least one second, lower capability, layer comprising a second layer representation of a second video data category from the input video data, and/or also on the basis of prediction from the first layer; providing a further grouping, the further grouping comprising at least one third, higher capability, layer and a fourth, higher capability layer, the third layer comprising a third layer representation of a third video data category from the input video data, and/or also on the basis of prediction from the first layer, and the fourth layer comprising a fourth layer representation of a fourth video data category from the input video data, and/or also on the basis of prediction from the second layer and the third layer; encoding the first layer to generate a first layer bitstream; generating a first layer filtered reconstructed image based on the first layer bitstream in a first layer reference picture buffer; encoding the second layer to generate a second layer bitstream, wherein the second layer bitstream is generated by considering at least one selected from the group consisting of: a difference between the second layer representation and the first layer filtered reconstructed image, inter prediction of temporally decoded pictures of the second layer, and intra prediction of the second layer; generating a second layer filtered reconstructed image based on the second layer bitstream in a second layer reference picture buffer; encoding the third layer to generate a third layer bitstream, wherein the third layer bitstream is generated by considering at least one selected from the group consisting of: a difference between the third layer representation and the first layer filtered reconstructed image, inter prediction of temporally decoded pictures of the third layer, and intra prediction of the third layer; generating a third layer filtered reconstructed image based on the third layer bitstream in a third layer reference picture buffer; and encoding the fourth layer to generate a fourth layer bitstream, wherein the fourth layer bitstream is generated by considering at least one selected from the group consisting of: a difference between the fourth layer representation, the second layer filtered reconstructed image, and the third layer filtered reconstructed image, inter prediction of temporally decoded pictures of the fourth layer, and intra prediction of the fourth layer.

According to a sixth aspect, a method of encoding input video data into bitstreams is described, the input video data comprising a plurality of video data categories, the method comprising: providing a first layer, wherein the first layer comprises a first lower capability layer representation of a first video data category from the input video data; providing a layer grouping, the layer grouping comprising at least one second, lower capability, layer comprising a second layer representation of a second video data category from the input video data, and/or also on the basis of prediction from the first layer; providing a further layer grouping, the further layer grouping comprising at least one third, higher capability, layer, the third higher capability layer comprising a third layer representation of the plurality of video data categories from the input video data, and/or also on the basis of prediction from the first layer and the second layer, the third layer representation being a frame-compatible multiplexed representation of a third data category and a fourth data category; encoding the first layer to generate a first layer bitstream; generating a first layer filtered reconstructed image based on the first layer bitstream in a first layer reference picture buffer; encoding the second lower capability layer to generate a second layer bitstream, wherein the second layer bitstream is generated by considering at least one selected from the group consisting of: a difference between the second layer representation and the first layer filtered reconstructed image, inter prediction of temporally decoded pictures of the second layer, and intra prediction of the second layer; generating a second layer filtered reconstructed image based on the second layer bitstream in a second layer reference picture buffer; encoding the third higher capability layer to generate a third layer bitstream, wherein the third layer bitstream is generated by considering at least one selected from the group consisting of: a difference between the third layer representation, the first layer filtered reconstructed image, and the second layer filtered reconstructed image, inter prediction of temporally decoded pictures of the third layer, and intra prediction of the third layer; and generating a third layer filtered reconstructed image based on the third layer bitstream in a third layer reference picture buffer.

Multi-layer or scalable bitstreams can be composed of multiple layers that can be characterized by pre-defined dependency relationships. One or more of those layers can be so-called base layers that need to be decoded prior to any other layer and can be independently decodable. The rest of the layers can usually be known as enhancement layers since their function is to improve content as provided when just the base layer or layers are parsed and decoded. They can also be dependent layers in that they all require some or all of the base layers since they adopt some kind of inter-layer prediction, and often one or more of them may also be dependent on the decoding of other higher priority enhancement layers. Thus, decoding may also be terminated at one of the intermediate layers. Multi-layer or scalable bitstreams enable scalability in terms of quality/signal-to-noise ratio (SNR), spatial resolution, bit-depth, color space representation, color sampling format, and/or temporal resolution, and/or even availability of additional views. For example, using codecs based on VC-1, VP8, or the Annex A profiles of H.264/MPEG-4 Part 10 produces bitstreams that are temporally scalable. A first base layer, if decoded, can provide a version of the image sequence at 15 frames per second (fps), while a second enhancement layer, if decoded in conjunction with the already decoded base layer, can provide a version of the same image sequence at 30 fps. SNR and spatial scalability are possible, for example, when adopting Scalable Video Coding (Annex G of the H.264/MPEG-4 Part 10 video coding standard as in reference [2]). In such a case, the base layer can generate a coarse quality version of the image sequence, while the enhancement layer or layers can provide additional increments in terms of visual quality. Similarly, the base layer can provide a low resolution version of the image sequence. The resolution can be improved by decoding additional enhancement layers. Furthermore, it is possible to have combined scalability support where additional layers can combine resolution with SNR enhancements. During the development of Annex G of reference [2], there had also been efforts (see references [11][12][13]) to provide bit-depth scalability in the same standard.

Scalable or multi-layer bitstreams are also useful for providing view scalability. The Stereo High Profile of the Multi View Coding (MVC) extension (Annex H) of H.264/AVC has been adopted as the video codec for the next generation of BLU-RAY DISCS™ (BLU-RAY 3D™) featuring stereoscopic content. This coding approach attempts to address the high bit rate requirements of a stereoscopic video stream. The Stereo High Profile utilizes a base layer that can be compliant with the High Profile of Annex A of H.264/AVC and which can compress one of the views termed the base view. An enhancement layer then compresses the other view, which is termed the dependent view. While the base layer can be independently decodable from the enhancement layer, the enhancement layer is not necessarily independently decodable from the base layer because the enhancement layer can utilize decoded pictures from the base layer as motion-compensated prediction references. As a result, the dependent view may benefit from inter-view prediction, especially for scenes with high inter-view correlation (i.e. low stereo disparity). Existing deployed set-top box and BLU-RAY™ H.264/AVC players may be able to decode and display the base view to view 2D content. Hence, coding each view as a separate layer with the MVC approach can retain 2D compatibility.

While 2D compatibility is desirable in various applications, deployment of consumer 3D can also be sped up by exploiting the installed base of set-top boxes, BLU-RAY™ players, and HDTV sets. Many display manufacturers offer HDTV sets that support 3D stereoscopic display. Therefore, both views can be displayed but is so formatted such that it fits within the confines of a single frame. By way of an automatic or manual means, the display can be made aware of this arrangement and switches to the proper display method. Such an approach that formats the stereo content so that it fits within a single picture or frame is called frame-compatible. The size of the frame-compatible representation does not necessarily have to be the same size as the target display resolution of each view. For example, the views may have been captured or created at 1920×1080 pixels, while the frame-compatible representation can be generated by resampling, with optional cropping, each view to 640×720 pixels and then packing it with the other view horizontally into a 1280×720 picture. The decoding and display devices may resample each view to 1280×720 or 1920×1080 depending on the display capabilities and/or user preferences.

A base layer can be provided such that it comprises a frame-compatible representation of multiple views using a multi-layer video delivery system, such as those described in Annex G and Annex H of the H.264/AVC standard. For the case of Annex H, the two views can be multiplexed into both layers using a module such as that shown in FIG. 9 in order to provide consumers with a base layer that is frame compatible, by carrying sub-sampled versions of both views and an enhancement layer, that when combined with the base layer, results to full resolution reconstruction of both views. Frame-compatible formats can include column sampling followed by side-by-side packing, row sampling followed by top-and-bottom (over-under) packing, and quincunx/checkerboard sampling followed by quincunx/checkerboard packing, among others. Some indicative examples are shown in FIGS. 1-6. For Annex G, the base layer can be identical as that in Annex H, while there can be multiple options on how to arrive to full resolution reconstruction. A first method can be to use a module to prepare the input to the enhancement layer such as that shown in FIG. 10 that avoids subsampling and thus retains the full resolution representations of the views in a single, but possibly in a larger frame. Spatial scalability, as standardized in Annex G, can then be used to efficiently predict this larger picture from the frame compatible base layer. Another method can involve two enhancement layers and the use of temporal scalability. The above and additional frame-compatible delivery solutions are described in further detail in reference [22].

Figure 7:
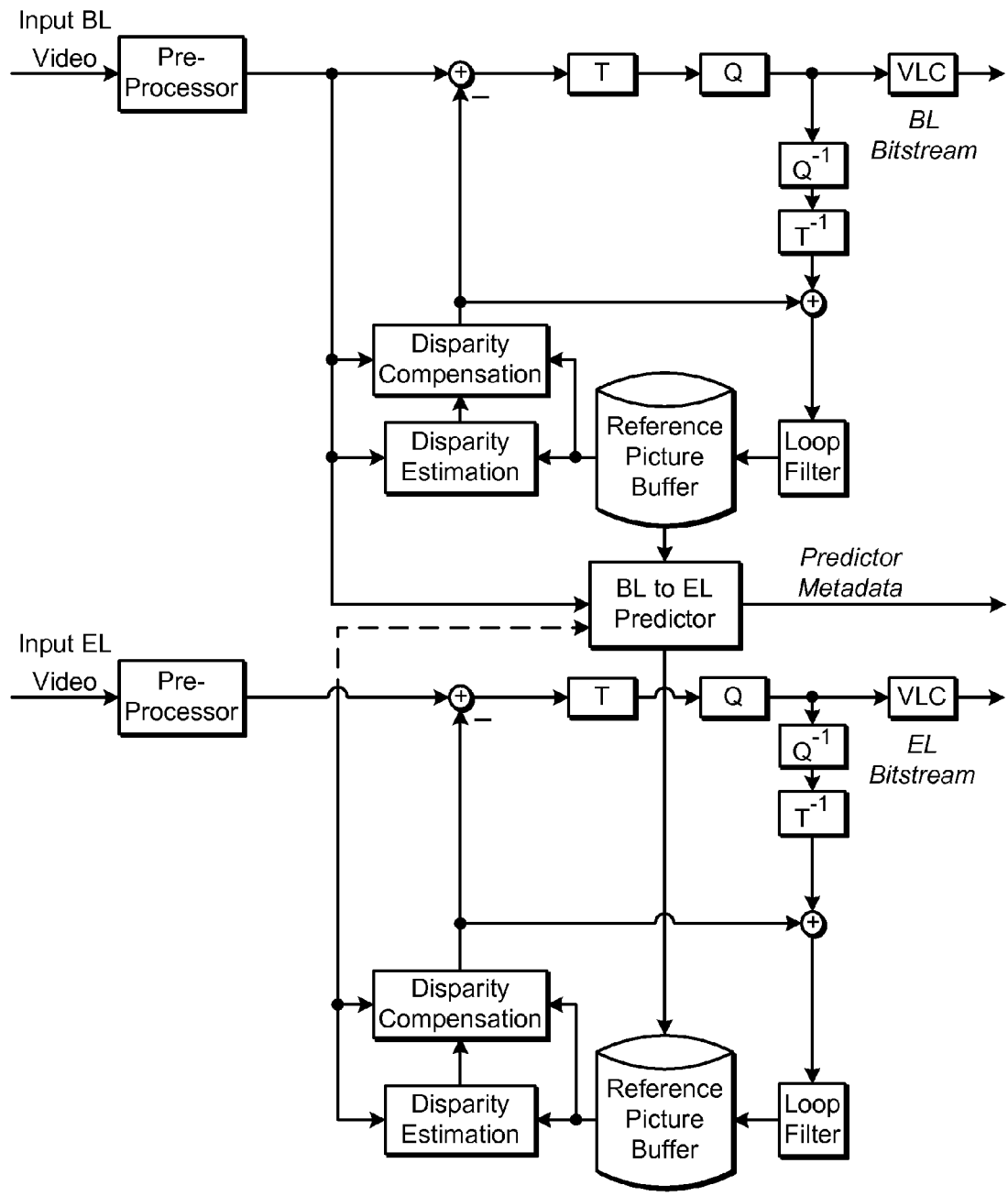
FIG. 7 shows a scalable video coding system with a reference processing unit for inter-layer prediction.

An exemplary stereoscopic frame-compatible 3D consumer delivery system (see reference [5]) features a base and an enhancement layer, similarly to Annex H of H.264/AVC. However, coding efficiency can be improved by employing an additional processing element, such as the reference processing unit (RPU), as introduced in reference [5], that can predict the enhancement layer frame given the base layer decoded frame, and optionally using the methods described in reference [7], prior to using it as a motion-compensated reference for prediction of the enhancement layer. Diagrams of an encoder and a decoder for the system proposed in reference [5] can be seen in FIGS. 7-8, respectively. A coding arrangement that codes each view in a separate layer (e.g., a 2D compatible system) can also be enhanced with a processing element, such as an RPU, that improves the reference taken from the base view prior to using it as a reference for prediction of the dependent view, also described in reference [5] and shown in FIG. 7.

Figure 8:
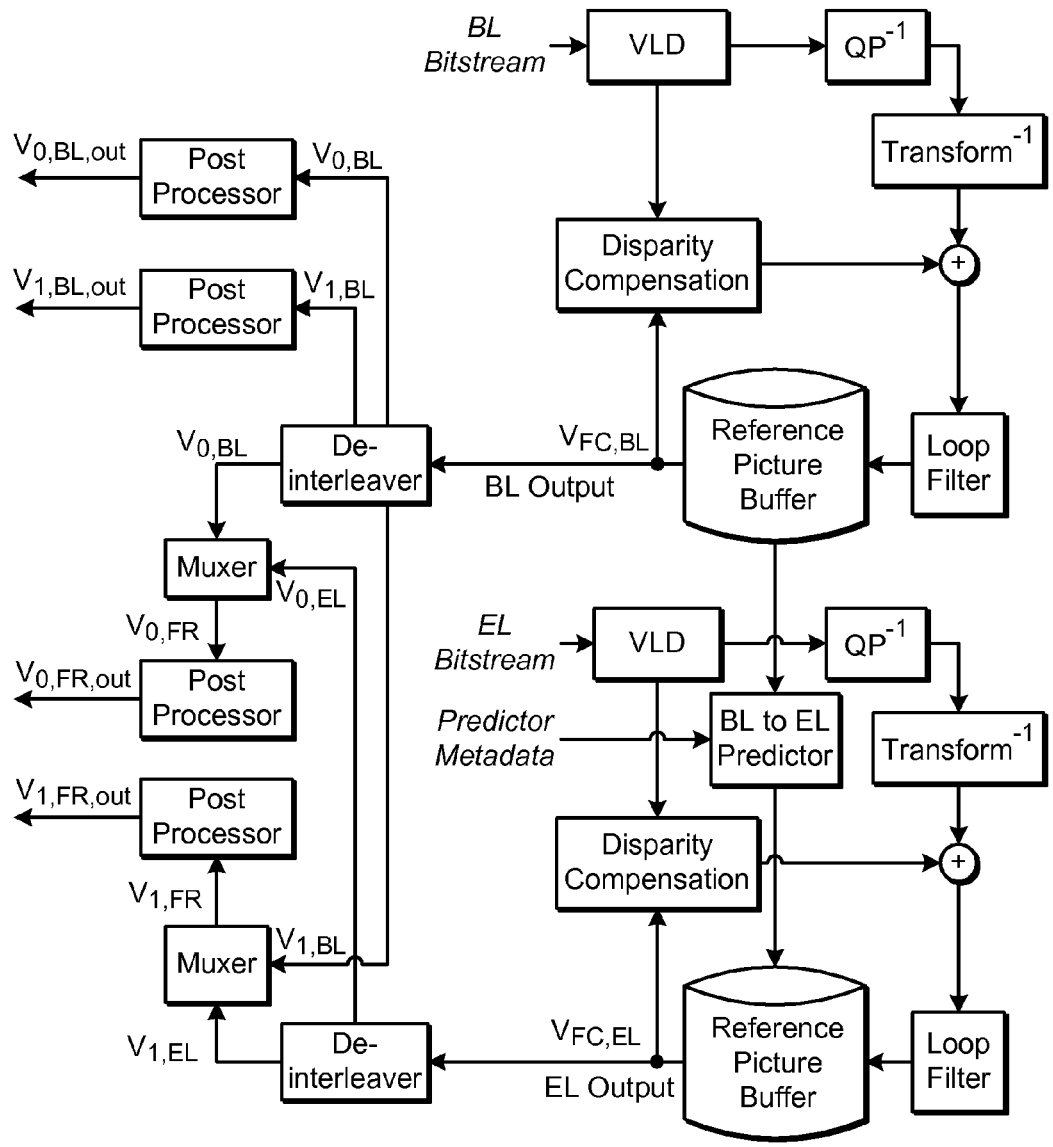
FIG. 8 shows a frame-compatible full-resolution 3D stereoscopic scalable video decoding system with reference processing for inter-layer prediction.

A method of full-resolution reconstruction for a frame-compatible system employing two layers, according to the one described in reference [5] can be seen toward the left side of FIG. 8. Two options are possible for the final reconstructed views based on the availability of the enhancement layer. They can be either interpolated using intelligent algorithms, as discussed in reference [7], from the frame compatible output of the base layer $V_{FC,BL,out}$ and optionally post-processed to yield $V_{0,BL,out}$ and $V_{1,BL,out}$, or they can be multiplexed with the proper samples of the enhancement layer to yield a higher representation reconstruction $V_{0,FR,out}$ and $V_{1,FR,out}$ of each view. Additional techniques that target full-resolution multi-layer stereoscopic 3D delivery are also described in reference [9]. A frame-compatible base layer is first coded that contains information from all coded views, and is followed by additional enhancement layers that code full- or higher-resolution representations of each view. The enhancement layers can use inter-layer prediction from higher priority enhancement layers and/or the base layer that is further augmented through the use of a reference processing unit.

Figure 9:
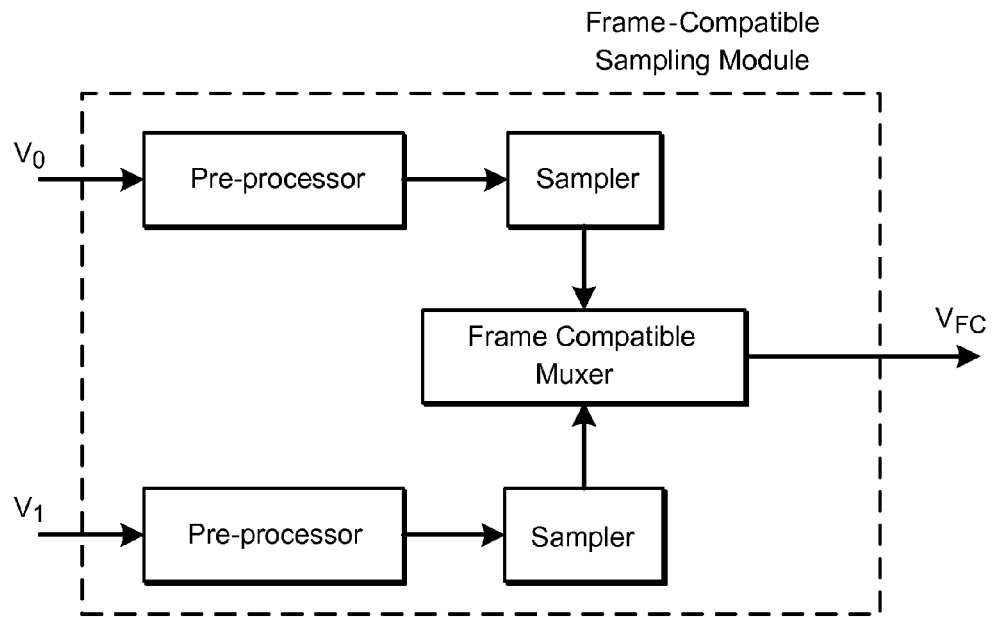
FIG. 9 shows a frame-compatible sampling and multiplexing module.
Figure 11:
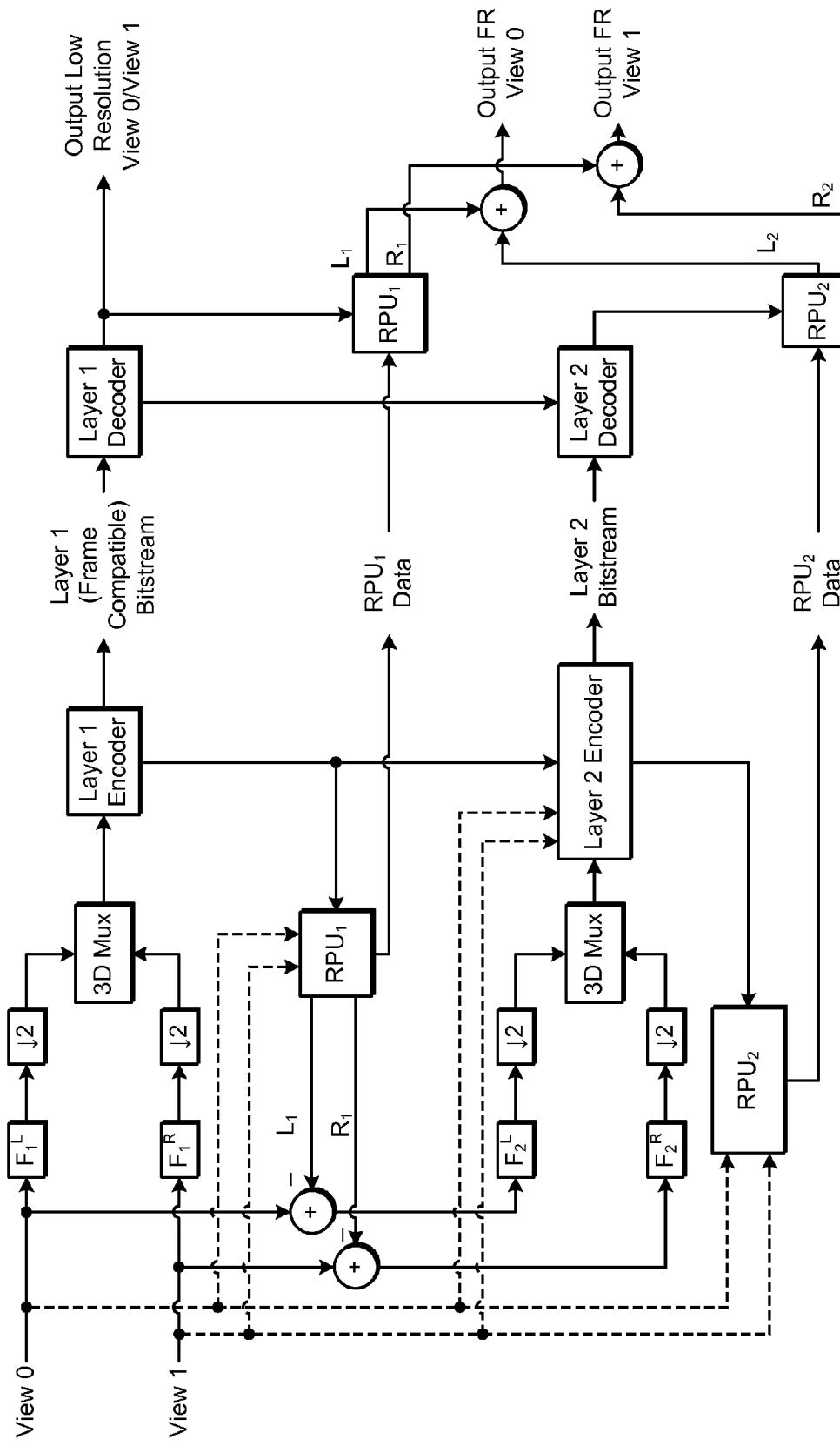
FIG. 11 shows a closed-loop frame-compatible multi-layer stereoscopic video delivery system that adopts complementary filtering.

According to an exemplary system for frame-compatible delivery as described in references [8] and [22], and shown in FIG. 11, unlike the system shown in reference [5] that is built around complementary sampling (e.g., the concept that the enhancement layer codes the samples that were not coded in the base layer) a different approach is adopted by separating the signals into low and high frequencies, similar to wavelet/filterbank decomposition. Such method is referred to as the complementary filtering method. In short, the enhancement layer codes the high spatial frequencies while the base layer codes the low spatial frequencies. The base layer can be conceptually similar to that of reference [5], yet differs primarily in the type of filters that process the input views prior to the downsampling step as shown in FIG. 9.

There can be a variety of methods that can generate the base and the enhancement layers. According to one exemplary open loop approach, the enhancement layer (EL) can be generated by applying high frequency equivalent filters of the ones used for the base layer (BL). Wavelets or filter-banks can also be used. Closed-loop approaches that consider the BL-coded information in order to derive the signal that is coded in the EL can also be used. The synthesis filters that derive the full-resolution views can be derived with an optimization step that can consider both the decoded BL and the decoded EL. These may signaled or not (e.g., can be inferred from the filters used for BL/EL generation).

According to an exemplary closed loop system, a reference processing element such as an RPU, can be used to predict the full resolution views given the base layer decoded frame-compatible frame. Such predicted views can then be subtracted from the original input views to form difference frames that can then be processed with a module similar to that in FIG. 9 to yield the input to the enhancement layer. A second processing element, such as an RPU, can then process the decoded picture of the enhancement layer to yield to full resolution difference pictures, such that when added to an output of the first processing element, it yields the full resolution reconstructions of each view. Motion information can be shared to reduce the motion overhead for the EL. The processing elements function as pre- and post-processors rather than as in-loop processors. A special case (e.g., open loop) of this approach is also described in reference [10].

Although the majority of today's digital video content can be delivered in 8-bit YUV 4:2:0 format, higher dynamic range (HDR) digital video content, represented in higher precision (e.g., fixed precision of higher than 8-bit, or floating point precision) and possibly also higher resolution chroma formats (e.g., YUV 4:2:2 and 4:4:4 or RGB 4:4:4) can provide improved video experience. Previously, various coding standards and/or standardization efforts had been created to address the question of efficient compression and delivery of such HDR digital video signal. For example, Annex A of reference [2] defines a number of advanced profiles that allow coding of video signal with up to 14-bit precision and different chroma formats including 4:2:0, 4:2:2, and 4:4:4. Further, during the development of Scalable Video Coding (SVC), or Annex G of reference [2], efforts were made by different organizations (e.g., references [11][12][13][20][21]) to provide bit-depth scalability. The bit-depth scalability feature is aimed at providing a base layer video bitstream (e.g., 8-bit YUV 4:2:0) that can be decoded by any legacy decoder and displayed by any legacy display device, and at least one enhancement layer bitstream that represents a video signal of higher capability (e.g., 10- or 12-bit precision). The bit-depth scalability feature in SVC uses a number of block-level coding tools that can exploit inter-layer prediction to improve coding efficiency.

By way of example, and not of limitation, inverse tone mapping can be applied to the reconstructed base layer video blocks (e.g., 8-bit signal) to obtain inter-layer prediction signal in higher dynamic range (e.g., higher than 8-bit or even floating point), and input video blocks in the enhancement layer can be predicted from such inter-layer prediction signal. Input video blocks in the enhancement layer can still be predicted using reconstructed enhancement layer signal (e.g., with motion compensated prediction using previously coded pictures, or with intra prediction using previously coded video blocks in the current picture). Such decisions as to whether to use inter-layer prediction or to use enhancement layer prediction can be signaled at the block level. Furthermore, when coding the enhancement layer video signal, other information from the base layer bitstream, such as the base layer motion information including motion vectors, reference picture index, etc, can also be used to predict enhancement layer motion information and thereby reducing the enhancement layer bit rate.

In addition to higher bit-depth (or a floating point representation) that allows the digital video signal to represent higher dynamic range, it is also of interest to consider higher chroma formats beyond YUV 4:2:0 (e.g., color formats such as YUV 4:2:2 and YUV 4:4:4) and various color-spaces beyond YCbCr (e.g., color spaces such as YCoCg, RGB that involve a linear transformation matrix, and also color spaces such as LogLUV that may involve a non-linear color transformation, etc).

Figure 45:
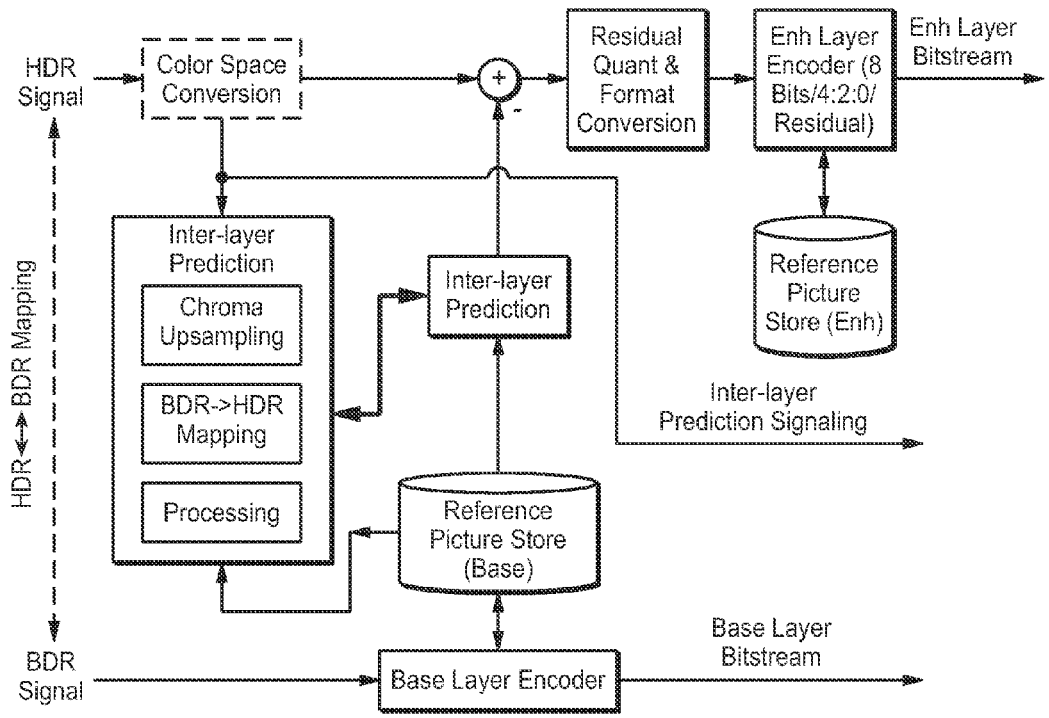
FIG. 45 shows a block diagram of a Dolby VDR codec version 1.x.

Another example of bit-depth and color format scalable coding system is the Dolby VDR (Visual Dynamic Range) codec as described in references [15][16][17]. There are two versions of the Dolby VDR, both of which deliver a backward compatible Basic Dynamic Range or BDR signal using an existing codec (H.264/AVC, VC-1, VP8, etc) in the base layer bitstream. The difference between the two codec versions lies in the enhancement layer coding. For VDR codec version 1.x (see FIG. 45), the inter-layer prediction signal (obtained by applying inter-layer prediction processes to the reconstructed base layer BDR signal) is subtracted from the enhancement layer HDR signal, the residual is then quantized and converted back into 8-bit 4:2:0 signal before being coded as conventional 8-bit 4:2:0 signal. The Dolby VDR codec version 1.x allows different color spaces to be used during inter-layer prediction and enhancement layer coding. As a first example, the base layer signal is in YUV4:2:0 8-bit and the enhancement layer signal is in RGB4:4:4 higher bit-depth (e.g. 12-bit). The base layer reconstructed signal may be converted into 8-bit RGB4:4:4 signal; then inter-layer prediction is carried out in RGB4:4:4 space to obtain higher bit-depth signal. The inter-layer prediction in RGB4:4:4 can then be subtracted from the enhancement layer RGB4:4:4 input. The residual signal, also in RGB4:4:4, will can then be quantized to 8-bit, and 2 out of its 3 color components can be subsampled to fit in 4:2:0. This can allow the enhancement layer coding to be performed with 8-bit 4:2:0 codecs.

Figure 46:
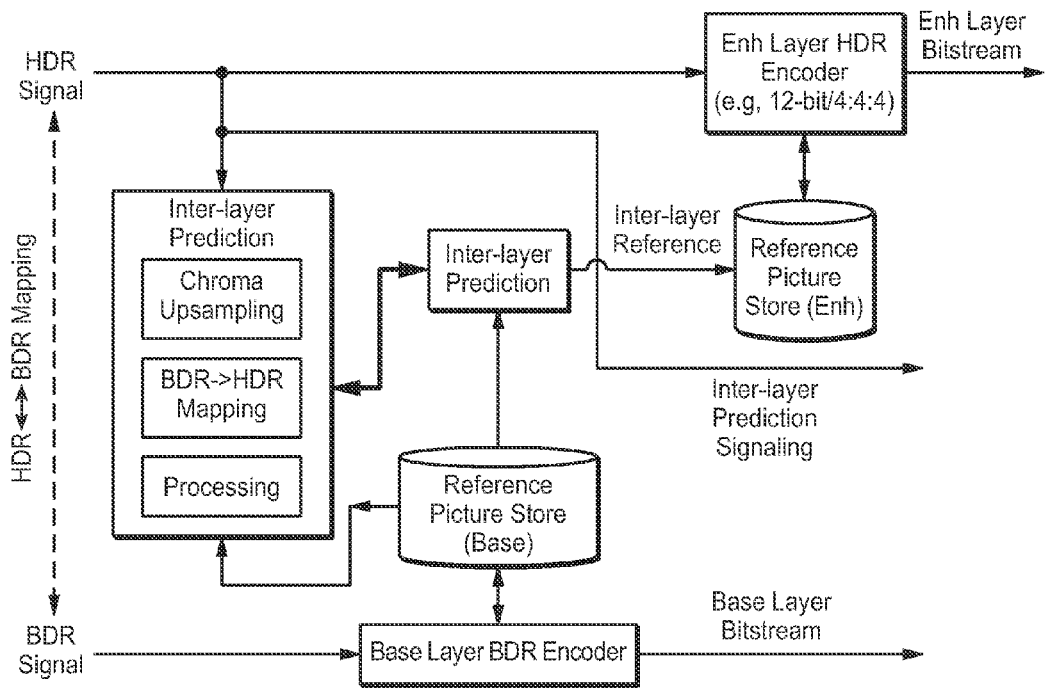
FIG. 46 shows a block diagram of a Dolby VDR codec version 2.x.

As a second example, both base and enhancement layer inputs can be in YUV4:2:0 format, with the base layer input in 8-bit and the enhancement layer input in higher bit depth (e.g., 12-bit). In this case, inter-layer prediction can be carried out in YUV4:2:0 color space. The residual signal, also in YUV4:2:0, can be quantized to 8-bit and sent to the enhancement layer codec. In either example, the Dolby VDR codec v1.x expects the enhancement layer signal to be in 8-bit 4:2:0 (that is, 2 out of 3 color components are subsampled) format such that conventional encoder and decoder can be applied. At the decoder side, the enhancement layer bitstream is decoded, then the decoded signal is converted back into residual, possibly followed by upsampling of some color components, and added to the inter layer prediction signal to obtain the reconstructed HDR signal. For VDR codec version 2.x (see FIG. 46), the inter-layer prediction signal (also obtained by applying inter-layer prediction processes to the reconstructed base layer BDR signal) can be inserted into the enhancement layer decoded picture buffer and used as an inter-layer reference picture to code the enhancement layer HDR signal directly. As such, the Dolby scalable VDR codecs can provide two different methods to deliver the HDR signal. For the remainder of this disclosure, when describing the various embodiments of coding an HDR enhancement layer signal, either one of the two methods can be employed (with one method coding the residual signal and the other method coding the input HDR signal directly).

In the present disclosure, video signals of higher capability (e.g., higher dynamic range through the use of either higher bit-depth with fixed-point precision or floating point precision, and higher chroma sampling format) can be referred to as HDR representation, while video signals of lower capability supported by legacy devices (e.g., most commonly in the form of 8-bit and 4:2:0 chroma sampling) is referred to as the BDR representation. According to some embodiments of the present disclosure, methods that enable frame-compatible and/or 2D-compatible video systems to achieve full resolution multi-view delivery of the HDR representation of the samples are described.

Figure 10:
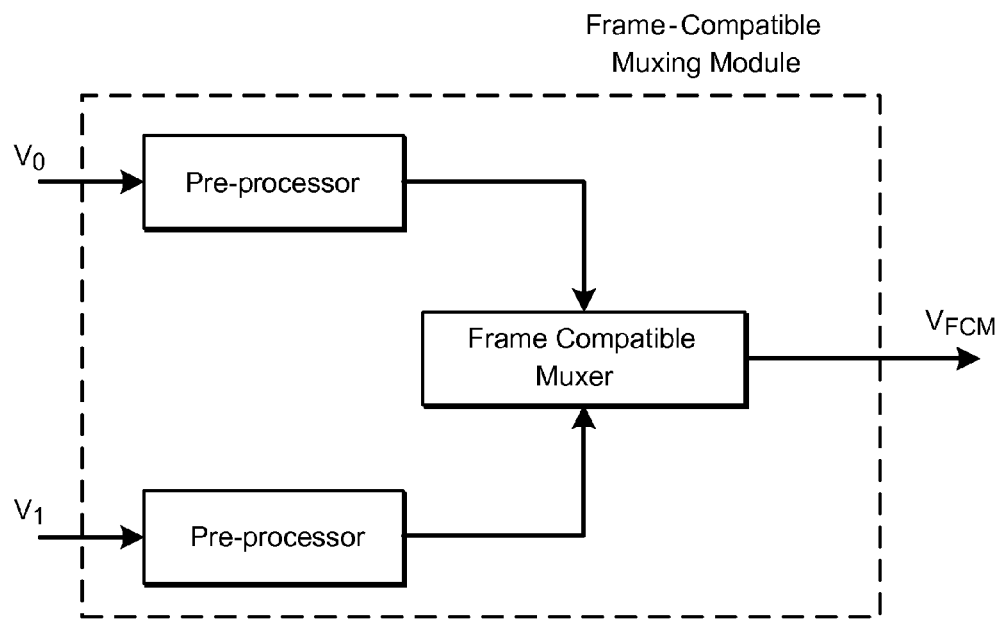
FIG. 10 shows a frame-compatible multiplexing module.

According to some embodiments, a BDR 2D or frame-compatible base layer can be accompanied by one or more enhancement layers, each of which can add multi-view or an HDR representation scalability or combinations of both, which build upon the embodiments as described in references [5][8][14][17]. The enhancement layers themselves can code a single view in a so-called enhancement resolution, code one or more depth maps, and/or provide some frame-compatible representation of more than one view. Complementary sampling as described in reference [5], or complementary filtering as described in reference [8], or multi-layer system described in [9] can be used to provide enhancement resolution in the ELs while transmitting a frame-compatible base layer. The enhancement resolution may not necessarily be identical to the full resolution of the original samples. Frame-compatible representations for either the base or the enhancement layer can be obtained with the modules shown in FIGS. 9-10. The difference between the two modules is that the first module involves subsampling the original samples since in practice, one would desire to fit, for example, two 1080p views into a single 1080p frame that contains information from both views. However, there can also be cases where sampling may not be required, and one may prefer to preserve all samples but still package them in a single frame (FIG. 10). Both processing operations may optionally involve a sort of preprocessing/filtering of the input views, since if there is downsampling, it can be desired to remove high frequencies in order to control and limit possible aliasing.

The processing operation can be spatio-temporal involving even motion compensation methods. Additional methods for processing frame-compatible data that are compressed by such arrangements are described in reference [6]. The terms "views" and "data categories" will be used interchangeably herein in the present disclosure.

According to one possible example, one of the data categories can refer to multi-view depth information. One may elect to code two views and one depth map and then interpolate the views between the two coded views using the depth map information. Since depth maps share correlation with the content coded in each view, reference processing can be used to improve inter-layer prediction from a depth map to a frame-compatible representation or a single view, or vice versa. The number of data categories can be two or more, reflecting coding, for example, three views, or two views and a depth map in one possible embodiment.

Method A

According to a first method, an encoding and decoding arrangement for a multiple-layer codec for compression of a video sequence that consists of frames belonging to multiple data categories for a given time instance is described. The base layer can provide a BDR frame-compatible representation of multiple data categories, where the frame-compatible representation can refer to sampling and multiplexing the different data categories into a single frame. Such frame may not have the same size as that of the frames comprising the original categories. The base layer can be implemented and encoded using any available video codec such as H.264/AVC, VP8, and VC-1, or any future video codec such as High Efficiency Video Coding or HEVC (see reference [18][19]). Prior to inputting data to the base layer, the data can be sampled and multiplexed accordingly. Such sampling can also comprise filtering. Furthermore, filtering can be asymmetric among the different data categories. For example, in some embodiments, one category can be filtered and sampled such that less than half of the information (e.g., frequency content) is retained. Another category can be filtered and sampled such that more than half of the information is retained. Exemplary indicative sampling and multiplexing arrangements for two categories of image data are shown in FIGS. 1-6.

According to some embodiments with two data categories (e.g., two views), for each frame-compatible representation of two data categories, there is also its complementary set of two data categories. The regular set of two data categories combined with the complementary representation should yield, after processing, an enhancement resolution (e.g., full-resolution representation of the data categories).

According to some embodiments, the representations can be complementary in terms of sampling shifts: one representation retains the even column samples of category 0 and the odd column samples of category 1 (side-by-side multiplexing). Its complementary frame-compatible representation can then carry the odd column samples of category 0 and the even column samples of category 1. When both are available, one can easily extract the enhancement-resolution representation. Such method is also applicable to other sampling arrangements such as over-under, etc. In such case, one can place even lines of one view in the frame-compatible representation, and the odd lines to its complementary representation, and so on, with the remaining view.

According to some embodiments, one frame-compatible representation can retain low-pass filtered coefficients (often decimated by half), while the complementary representation can carry the filtered coefficients that yield the missing frequency information. If both are available, with appropriate filtering, one can derive the full-resolution representation. The terms "frame-compatible" and "complementary frame-compatible" can refer to either the sampling-shift-based or frequency/filtering-based approach, herein in the present disclosure. Exemplary systems adopting complementary filtering can be shown in references [8][10].

A first group of additional enhancement layers carrying BDR data can be optionally coded. The number of the additional layers can depend on the number of categories of the frame data and the data already sampled and interleaved within the base layer. The data that is sampled and interleaved in an enhancement layer can be selected such that when combined with the data already in the base layer, it leads to an efficient BDR representation and reconstruction of data of most data categories.

According to some embodiments, in case of two categories of data, one enhancement layer is implemented in order to be able to code all original data, since the base layer can carry half the samples of each category and the enhancement layer can provide the other missing half samples of each data category. Furthermore, other embodiments where the base layer compresses one third of the samples of one category and the rest two thirds can be stored in the enhancement layer. The opposite is also possible. Similarly, as with the base layer, the data content of each category in an enhancement layer may not necessarily be the same as that of another data category, for example, due to different type of filtering or due to different number and arrangement of samples (e.g., quincunx vs. row-based sub-sampling). Consequently, the sampling operation that derives the samples that are input to be coded in the enhancement layer can also include filtering.

A second group of enhancement layers can be coded, which can optionally depend on the first group of enhancement layers as well as the base layer, and yields frame-compatible HDR representations (e.g., higher bit-depth with fixed-point precision or floating-point precision, and possible higher chroma format) of the samples. The number of the additional layers can depend on the number of categories of the frame data. The data that is sampled and interleaved in an enhancement layer of the second group is selected such that when combined with the data that is already in the rest of the enhancement layers of the second group, it leads to an efficient HDR representation and reconstruction of data of most categories.

According to some embodiments, for two categories of data, two enhancement layers can be implemented in order to be able to code all HDR samples, since a first enhancement layer in the second group can carry HDR enhancements to half the samples of each category and another enhancement layer in the group can provide HDR enhancements to the other missing half samples of each data category.

According to some embodiments, a first enhancement layer in the second group can compresses one third of the samples of one category, and the remaining two thirds can be stored in a second enhancement layer of the second group. The opposite is also possible. Similarly, as with the base layer, the data content of each category in an enhancement layer of this group may not necessarily be the same as that of another data category, due to, for example, different type of filtering or different number and arrangement of samples (e.g., quincunx vs. row-based sub-sampling). Consequently, the sampling operation that derives the samples that are input to be coded in the enhancement layer of this group can also include filtering.

Enhancement layers of both groups can adopt the hybrid video coding model that is also found in modern video codecs such as VC-1 and H.264/AVC, or a future video codec such as HEVC. The input data can be predicted either from neighboring samples in the same picture or frame (using intra prediction), or from samples from previously coded frames (inter prediction) that belong to the same layer and are buffered as motion-compensated prediction references within a so-called reference picture buffer. Inter-layer prediction is also possible if the decoded information from higher-priority layers (e.g., base layer or higher-priority enhancement layers in the same group or higher-priority layers in another group) is available to the enhancement layer. One method to obtain access to such information can be by considering decoded pictures from the higher-priority layer as references for motion compensation. After prediction (including intra prediction, inter prediction, and inter-layer prediction), the prediction residuals undergo transform and quantization and the quantized coefficients are then coded using entropy coding. The enhancement layer decoder reverses this process.

Consideration of decoded pictures from a higher-priority layer (e.g., base or enhancement) as references for motion compensation for the current enhancement layer of the first group can include reference processing operations, such as those performed by an RPU as described in references [5][7]. A reference processing element can take as input frame-compatible or two dimensional decoded pictures from the reference picture buffer of, by way of example and not of limitation, the base layer, and then process the samples to estimate the complementary frame-compatible samples coded in an enhancement layer of the first group. Reference picture processing can comprise filtering, upscaling, motion or disparity compensation, interpolation of missing samples, and also recovery or estimation of frequency content. Recovery or estimation frequency content can be possible, for example, when the base layer codes, for example, low frequencies and the enhancement layer codes high frequencies. Such reference pictures can then be placed and used as additional motion-compensated prediction references in the reference picture buffers of the enhancement layer.

A reference processing module at the encoder can generate information on the techniques used for prediction/up-sampling and communicates this information (e.g., RPU bitstream) to an identical reference processing element that can be located at the decoder module so that the encoder prediction operation can be duplicated at the decoder. Such decoder module can be part of a layer encoder and decoder, or can be a separate module implemented separately from the layer encoders and decoders. Interpolation and prediction using such module can comprise methods described in reference [7]. The generated bitstream can comprise a stream separate from those generated from the layer encoder, or it can be a part of the layer encoder bitstream. In the latter case, it can even be stored in the base layer. Furthermore, it may be stored as part of the sequence or picture-level parameter sets, or as part of the header information, among others. The processing element at the encoder can also consider the original samples that are being coded in the current enhancement layer in order to derive the operations that are implemented to process the input decoded base layer or higher-priority layer picture so that it may be used as an additional motion-compensated reference picture for the pictures coded in the current enhancement layer. Such concept of a generalized reference processing element will be henceforth be referred to as an "RPU", also described in reference [7]. Throughout the present disclosure, capabilities of the generalized RPU concept may be expanded to encompass additional prediction methods as required by the methods we describe, especially as required to deal with layers that differ in terms of bit-depth, among others. An RPU can process a single frame but may have multiple output processed frames, for example, each predicting reference pictures for a different layer picture buffer.

According to some embodiments, similar RPUs can be used to enhance inter-layer prediction between enhancement layers belonging to the same group. For the case of two data categories (e.g., two views), an estimation of the complementary frame-compatible representation in the reference picture buffers of a first layer of the group, given the original frame-compatible representation of samples in the reference picture buffer of a second, higher-priority, layer of the group can be implemented. The RPU can use a range of tools as described in the previous paragraph. The opposite can also be possible if the complementary representation layer has higher priority.

According to some embodiments, RPUs can be used to enhance inter-layer prediction between layers in the second group and higher priority layers (e.g., either layers in the first group, assuming the first group has higher priority, or the base layer). An RPU can be utilized to process samples from the base layer and place them in the buffer of one or more of the enhancement layers of the second group. The RPU can perform all of the operations mentioned above, in addition to performing color space transformations, non-linear transformations, bit-depth conversions, inverse mapping operations (see references [20][21]), and possibly upsampling of at least some of the color components in order to arrive at an efficient estimation of the HDR representation from the BDR representation of the lower layers. Such RPU operations can be collectively referred to as BDR to HDR prediction and/or BDR to HDR estimation hereafter. In addition, an RPU can similarly enhance the BDR samples in the reference picture buffer of a layer in the first group to the level of HDR representation prior to placing them in the reference picture buffer of a layer in the second group.

Figure 12:
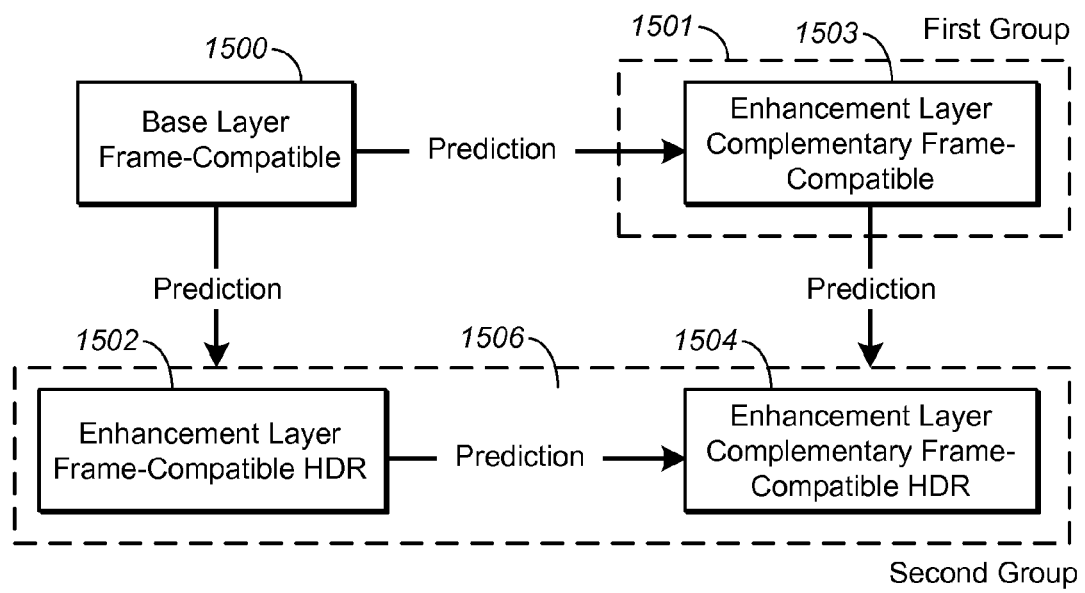
FIG. 12 shows a scalable 3D+HDR delivery system that can provide a frame-compatible base layer, a first enhancement layer with the complementary frame-compatible samples, a second enhancement layer with a frame-compatible HDR representation, and a third enhancement layer with the complementary frame-compatible HDR representation.
Figure 13:
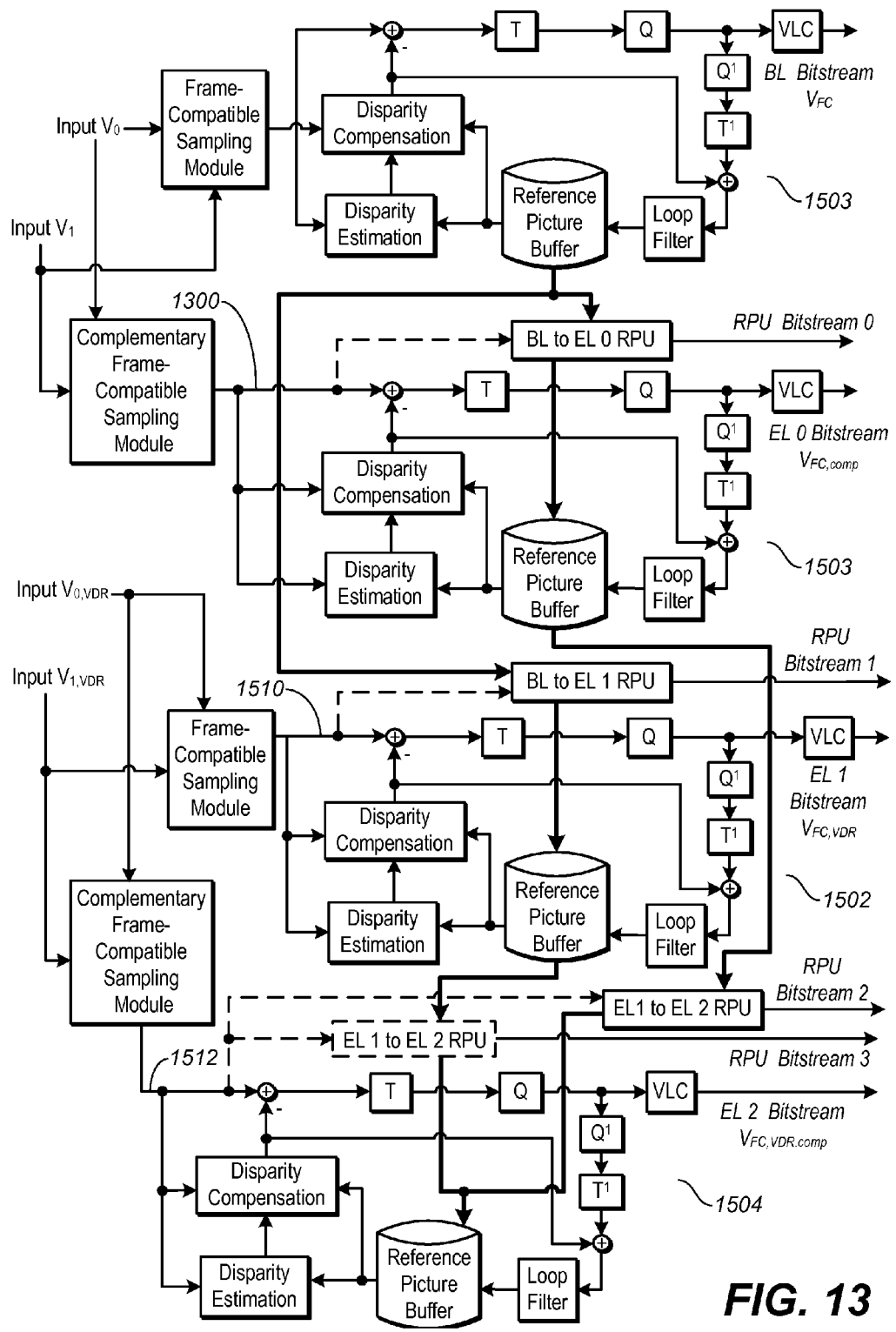
FIG. 13 shows an encoder that provides a frame-compatible base layer, a first enhancement layer with the complementary frame-compatible samples, a second enhancement layer with a frame-compatible HDR representation, and a third enhancement layer with the complementary frame-compatible HDR representation.
Figure 14:
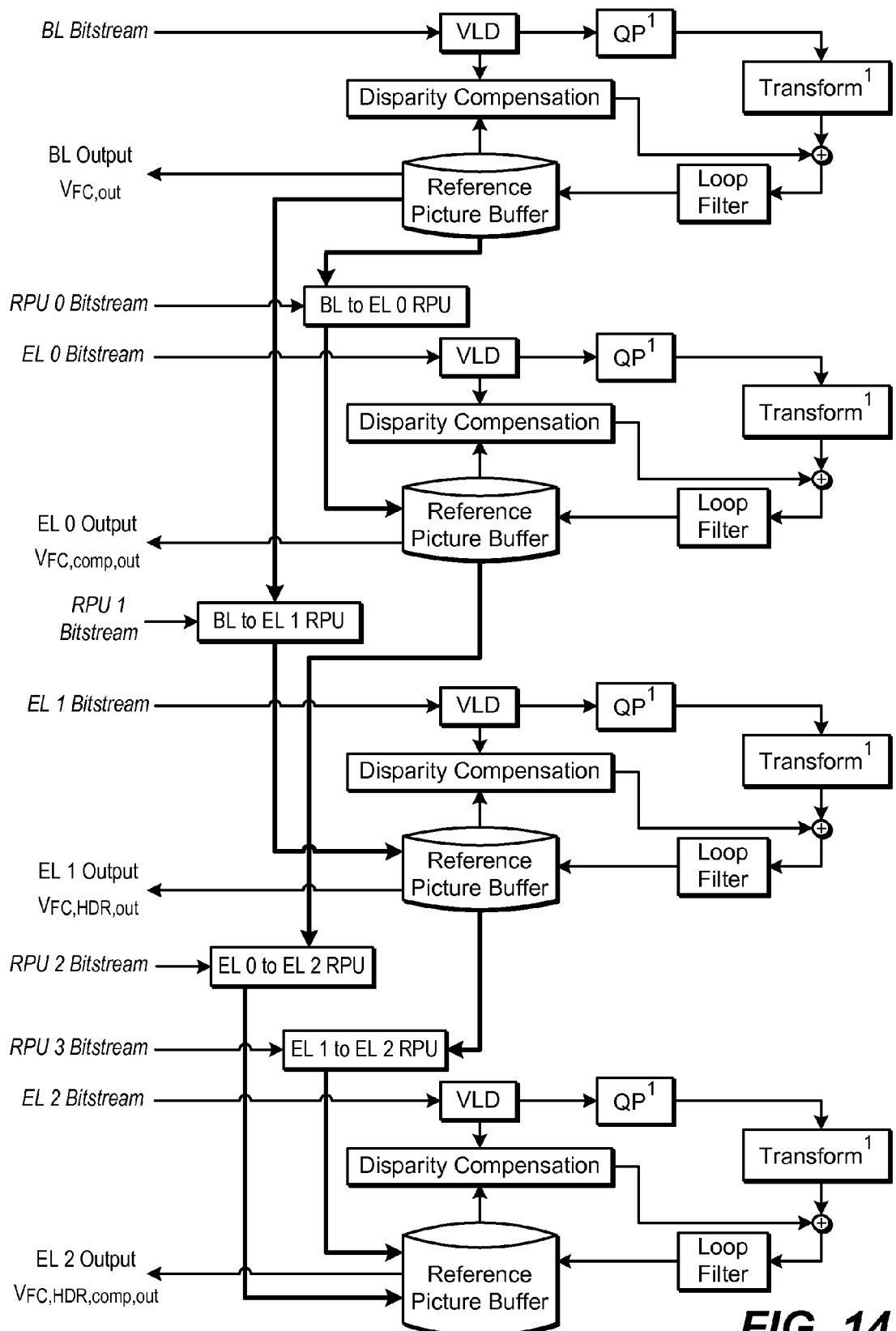
FIG. 14 shows a decoder that provides a frame-compatible base layer, a first enhancement layer with the complementary frame-compatible samples, a second enhancement layer with a frame-compatible HDR representation, and a third enhancement layer with the complementary frame-compatible HDR representation.

A high level diagram of a system that implements the method for two views in a stereoscopic 3D format is shown, for example, in FIG. 12. Such system can provide a frame-compatible base layer (1500), a first-group enhancement layer (1501) with the complementary frame-compatible samples (1300), a second-group enhancement layer (1506) with a frame-compatible HDR representation (1510), and a second-group enhancement layer with the complementary frame-compatible HDR representation (1512). Encoder and decoder diagrams of an embodiment that considers two views in a stereoscopic 3D format are shown, for example, in FIGS. 13-14. The first group can comprise "EL 0", while the second group can comprise "EL 1" and "EL 2".

Figure 15:
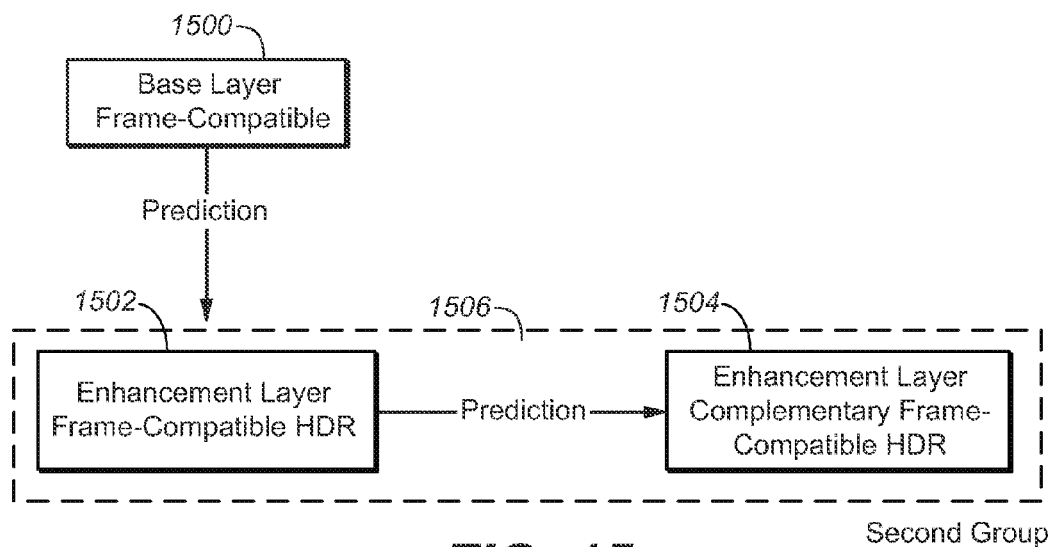
FIG. 15 shows a scalable 3D+HDR delivery system that provides a frame-compatible base layer, a first enhancement layer with a frame-compatible HDR representation, and a second enhancement layer with the complementary frame-compatible HDR representation.
Figure 16:
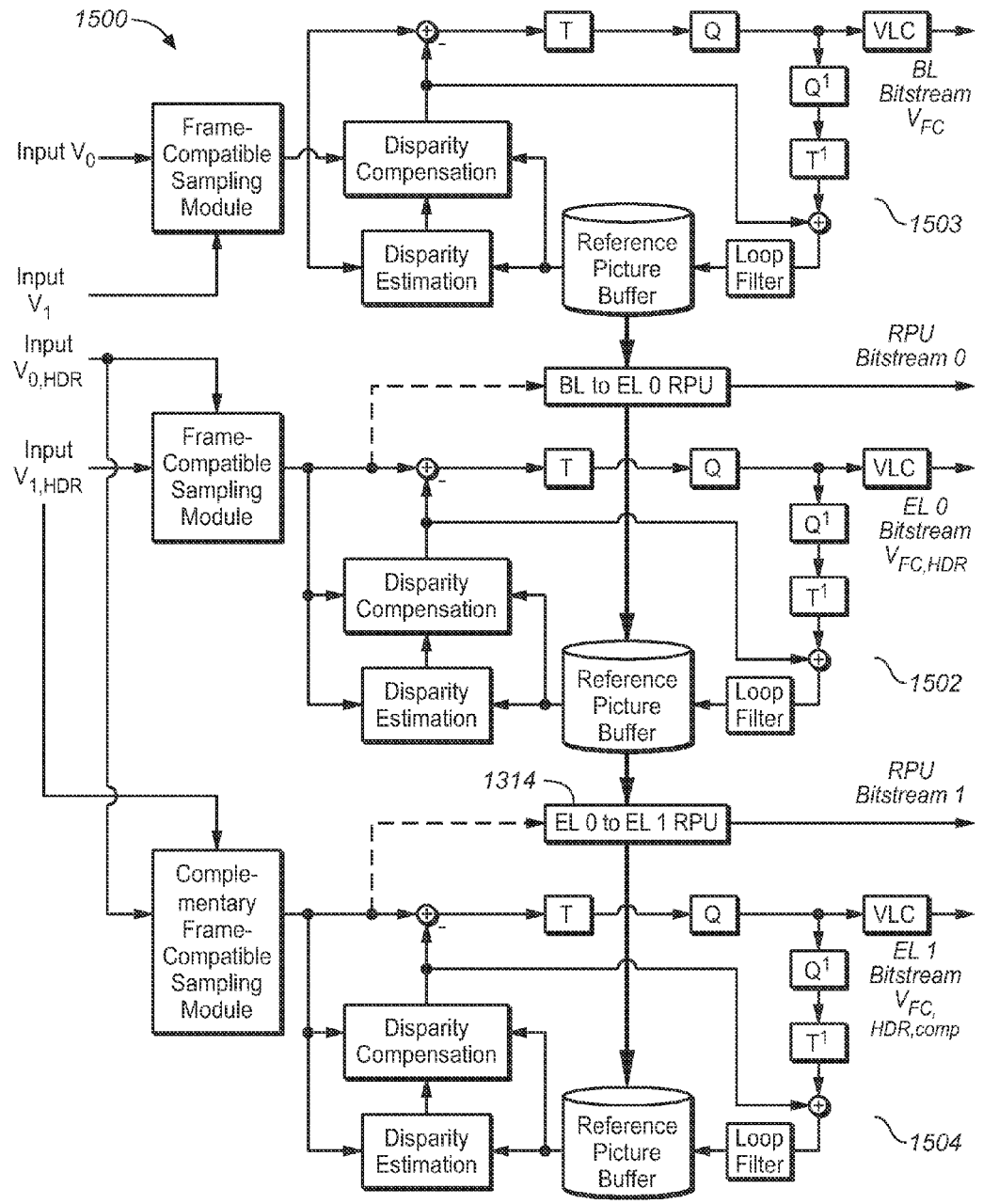
FIG. 16 shows an encoder that provides a frame-compatible base layer, a first enhancement layer with a frame-compatible HDR representation, and a second enhancement layer with the complementary frame-compatible HDR representation.
Figure 17:
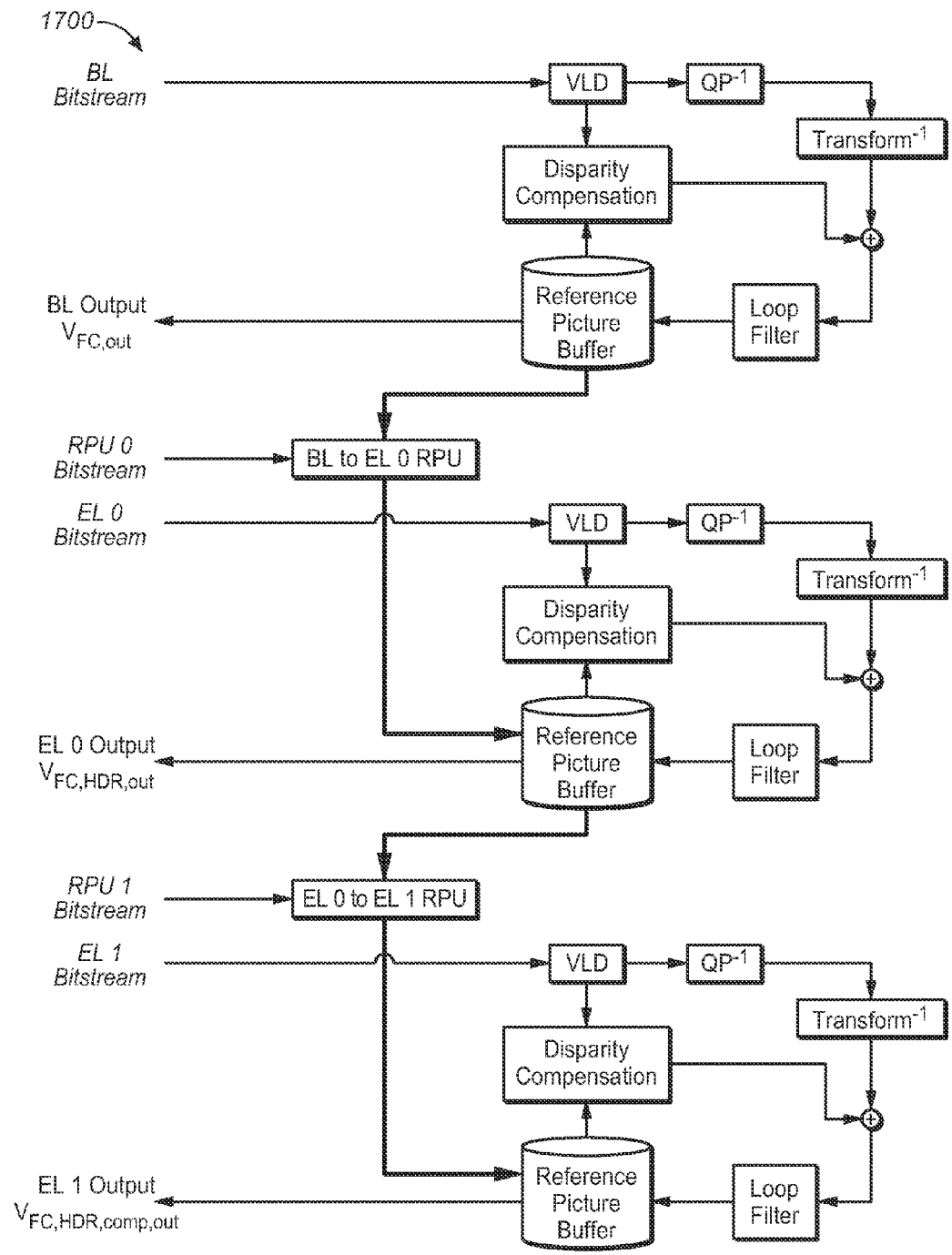
FIG. 17 shows a decoder that provides a frame-compatible base layer, a first enhancement layer with a frame-compatible HDR representation, and a second enhancement layer with the complementary frame-compatible HDR representation.

A high level diagram of a similar system is shown, for example, in FIG. 15. Unlike the system in FIG. 12, this is a special case where there is no first group of enhancement layers. Encoder (1600) and decoder (1700) diagrams of an embodiment that considers two views in a stereoscopic 3D format is shown, for example, in FIG. 16-17.

According to some embodiments, the base layer can code a representation with a first range of frequency content. A single enhancement layer belonging to the second group can be coded such that the second group comprises both missing high frequencies and also the necessary data to reconstruct the HDR representation of the samples. In such embodiment, the RPU (1314) can be inverse tone-mapped, among other processes described in the previous paragraphs, and can then be combined in a single step with the EL to recreate the full resolution HDR signal. Such embodiment can be realized by applying the methods of complementary filtering as described in reference [8] and shown for the case of two layers in FIG. 11.

Method B

The base layer can be configured identically to that of method A described in the previous paragraphs. A BDR frame-compatible representation of the signal can be coded in the base layer. An optionally coded first group of enhancement layers can provide enhancement resolution BDR representations of each view. Each layer can code a single view; thus, for two views, there will be two layers.

According to some embodiments, one layer of the first group can be used to code both enhancement resolution views by packaging two views in a frame compatible format (e.g., using the input module in FIG. 10) and skipping the subsampling operation. It is also possible by utilizing Annex G of the H.264/AVC standard: for two views, a frame-compatible base-layer can be followed by an enhancement layer that is twice the size in terms of number of samples, since it packages both views without resorting to subsampling.

A second group of enhancement layers that provide enhancement resolution HDR representations of each view can also be coded. For two views of a stereoscopic delivery system, one can code each view as a separate layer in this group, or one can elect to use a frame-compatible multiplexing module (1000) such as the one shown in FIG. 10 to represent both views in one layer.

The architecture of the enhancement layers (similar to H.264/AVC and VC1) can follow that of those for method A in that they adopt the hybrid coding model (e.g., VC-1, H.264/AVC, VP8, HEVC, etc.) and they can benefit from inter-layer prediction that includes using as motion-compensate reference pictures from the reference picture buffers of the base layer and also the other higher-priority enhancement layers. Furthermore, inter-layer prediction can similarly benefit from reference processing. The difference in between method B, compared to how the RPU is used in method A that each layer can code a single view or two multiplexed, but not sampled, views, instead of a frame-compatible, multiplexed and sampled, signal.

According to some embodiments, RPUs can be used to process reference pictures at the base layer picture buffer in order to enhance inter-layer prediction for one or more of the enhancement layers. If the enhancement layer belongs to the first group, then the RPU interpolates the missing samples since the base layer only codes a frame-compatible representation. The estimation process can use one of the methods that have been previously described (e.g., method A above). If, however, the enhancement layer belongs to the second group, then it is also necessary to include additional reference processing operations to carry out BDR to HDR prediction, such as color space conversion, local or global inverse mapping (see references [20][21]) to achieve higher bit-depth of the targeted HDR representation, and possibly resampling of at least some of the color components.

According to some embodiments, RPUs can also be used to process pictures in the reference picture buffers of higher-priority enhancement layers that belong to the same group in order to enhance inter-layer prediction for one or more of the enhancement layers (assuming the group comprises at least two enhancement layers) in that group. For example, a second view can have substantial correlation with a first view, if the stereoscopic disparity is low. Such an RPU can additionally employ stereo disparity compensation techniques that may involve transmission of disparity vector information to the corresponding decoder RPU. Other intra-prediction methods such as inpainting can also be considered by such an RPU to account for high disparity and occlusion. Global motion compensation schemes using the warping method can also be employed. Other possible methods can include illumination compensation and color balancing. Such operations may be performed locally or globally.

In some embodiments, RPUs can also be used to process pictures in the enhancement layer picture buffers of the first group in order to enhance inter-layer prediction for one or more layers of the second group. In an embodiment where the spatial resolution of each group can differ, the RPU performs both rescaling and BDR to HDR prediction. In another embodiment where the resolution stays the same, the RPU performs BDR to HDR prediction operations in order to yield good prediction references for layers of the second group.

Figure 18:
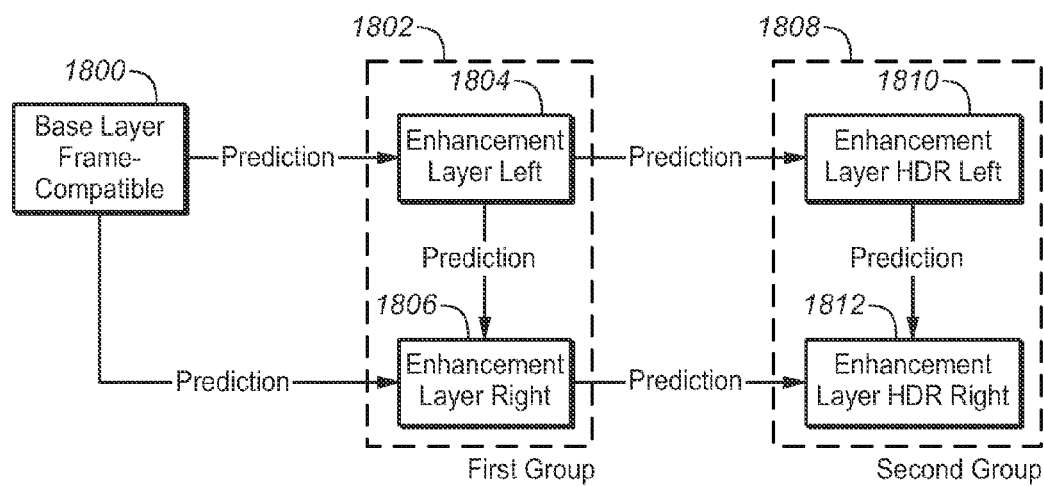
FIG. 18 shows a scalable 3D+HDR delivery system that provides a frame-compatible base layer, a first enhancement layer with the samples of a first view, a second enhancement layer with the samples of a second view, a third enhancement layer with a HDR representation of the samples in a first view, and a fourth enhancement layer with the HDR representation of the samples of a second view.
Figures 19, 19A, 19B:
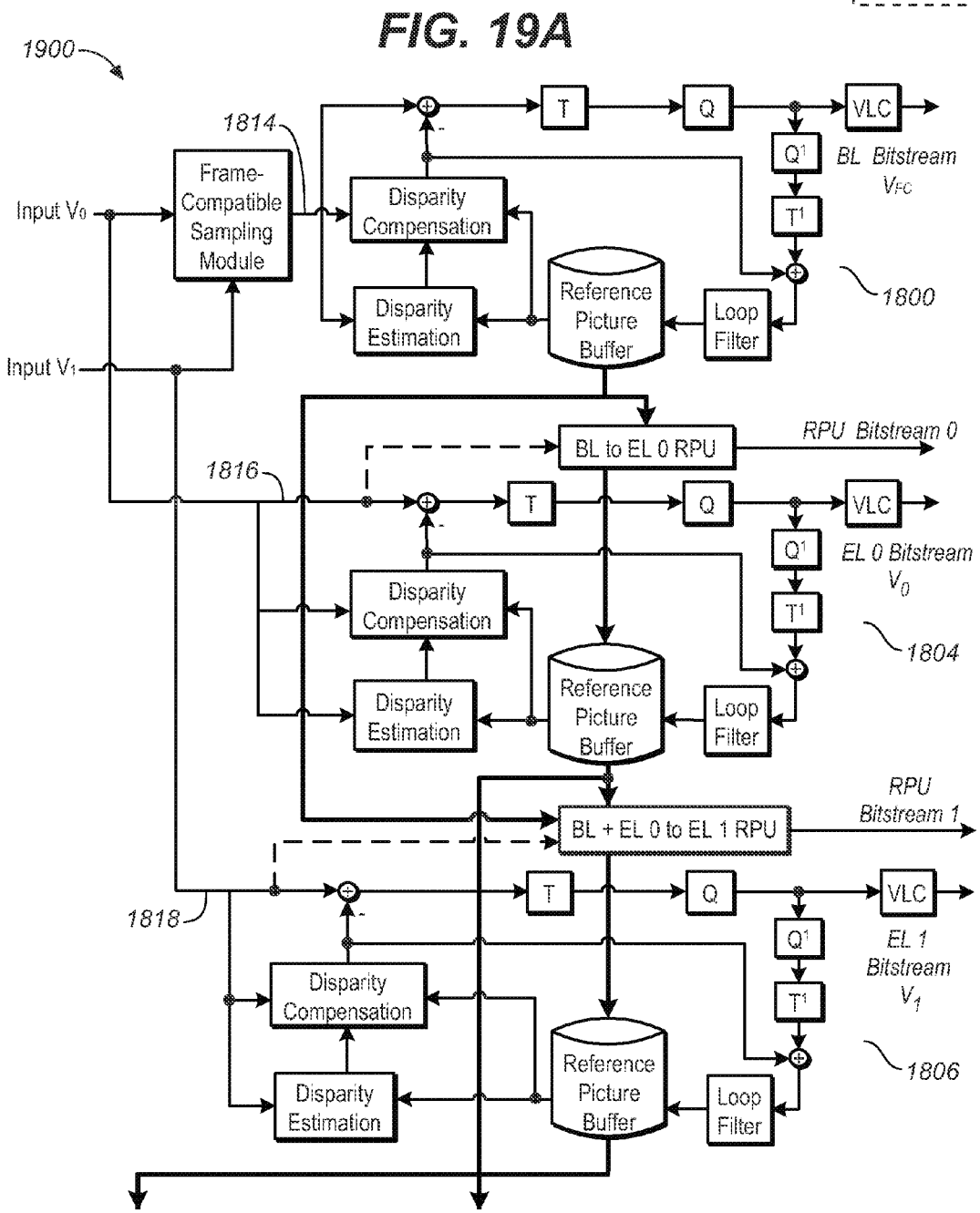
FIG. 19 shows an encoder that provides a frame-compatible base layer, a first enhancement layer with the samples of a first view, a second enhancement layer with the samples of a second view, a third enhancement layer with a HDR representation of the samples in a first view, and a fourth enhancement layer with the HDR representation of the samples of a second view.
Figure 19B:
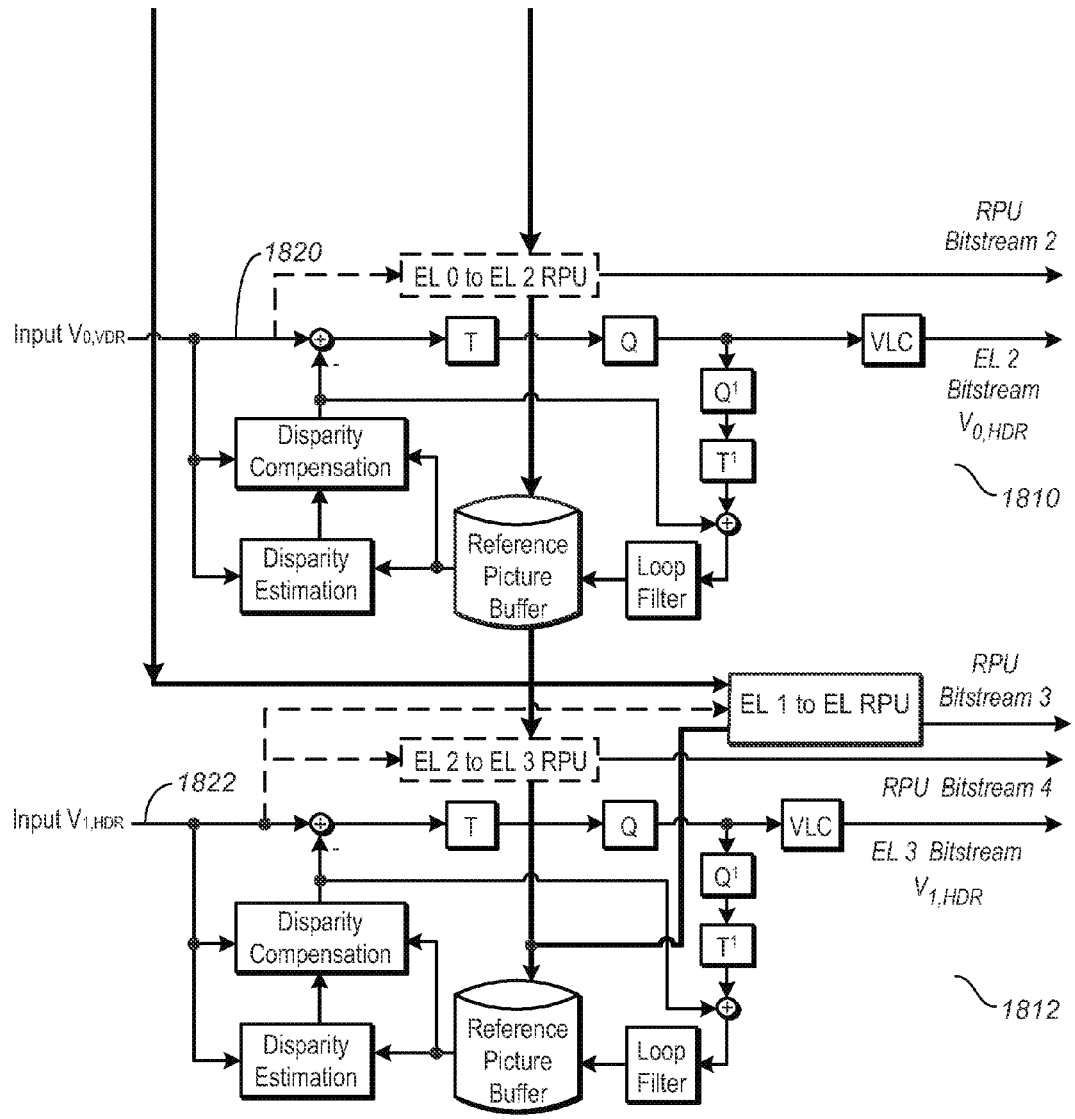
Figure 20B:
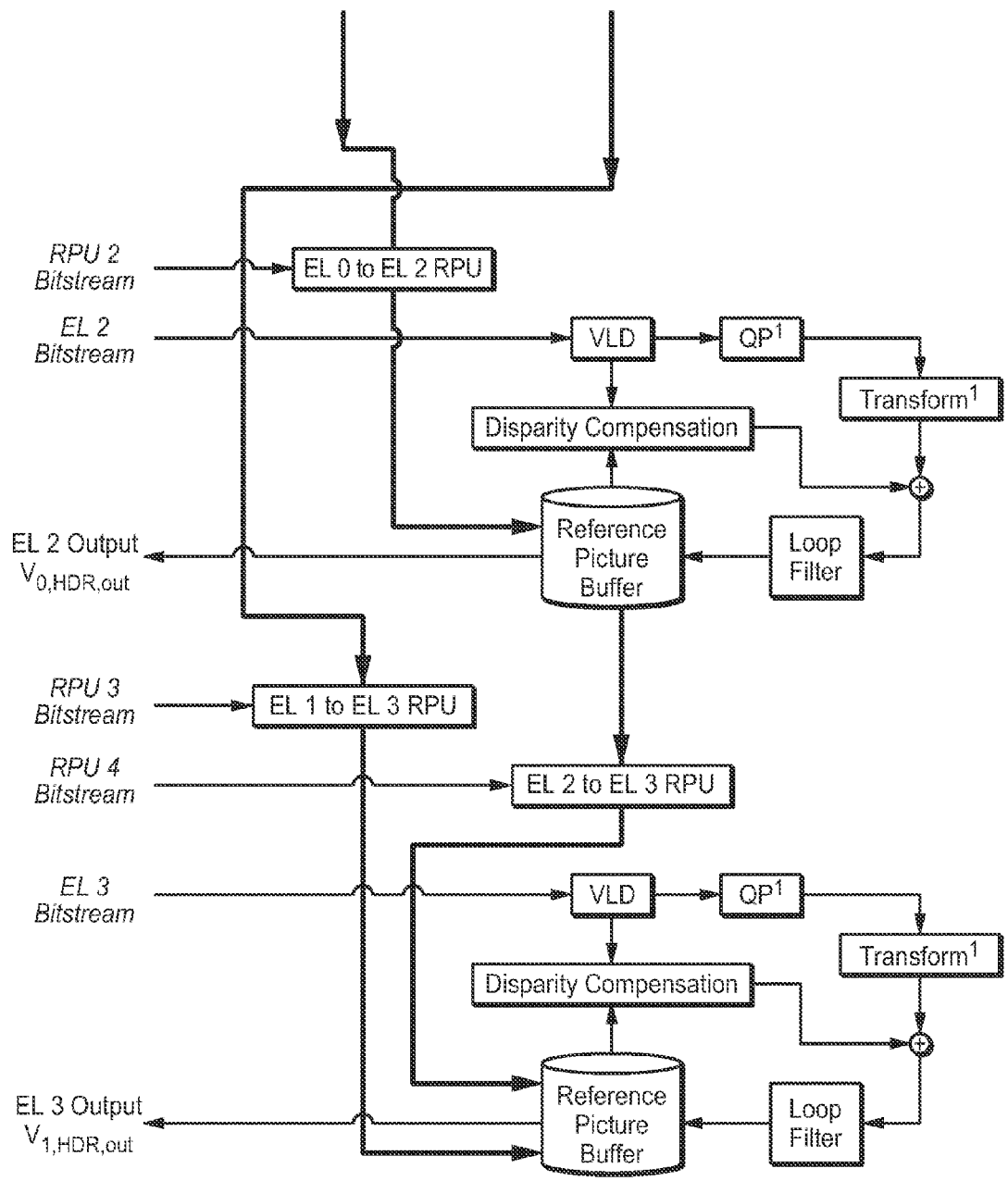
FIG. 20 shows a decoder that provides a frame-compatible base layer, a first enhancement layer with the samples of a first view, a second enhancement layer with the samples of a second view, a third enhancement layer with a HDR representation of the samples in a first view, and a fourth enhancement layer with the HDR representation of the samples of a second view.

A high level diagram of a system having two views in a stereoscopic 3D format can be found in FIG. 18. The system provides a frame-compatible base layer (1800), a first-group (1802) enhancement layer (1804) with the samples of a first view (1814), a first-group (1802) enhancement layer (1806) with the samples of a second view (1816), a second-group (1808) enhancement layer (1810) with a HDR representation of the samples in a first view (1820), and a second-group (1808) enhancement layer (1812) with the HDR representation of the samples of a second view (1822). Encoder (1900) and decoder (2000) diagrams of an embodiment that considers two views in a stereoscopic 3D format can be found in FIGS. 19-20. The first group comprises "EL 0" and "EL 1", while the second group comprises "EL 2" and "EL 3".

Figure 24:
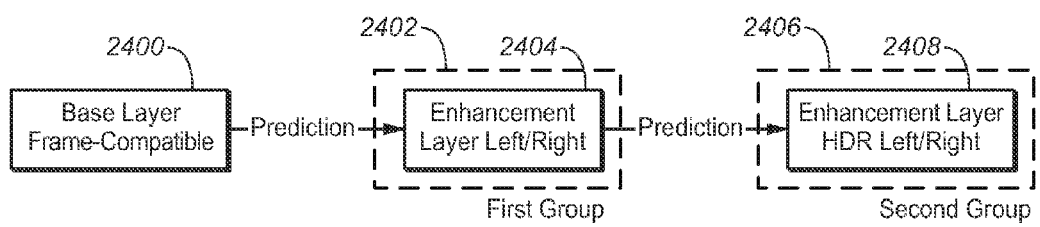
FIG. 24 shows a scalable 3D+HDR delivery system that provides a frame-compatible base layer, a first enhancement layer with the multiplexed samples of both views, and a second enhancement layer with the HDR representation of the multiplexed samples of both views.
Figure 25:
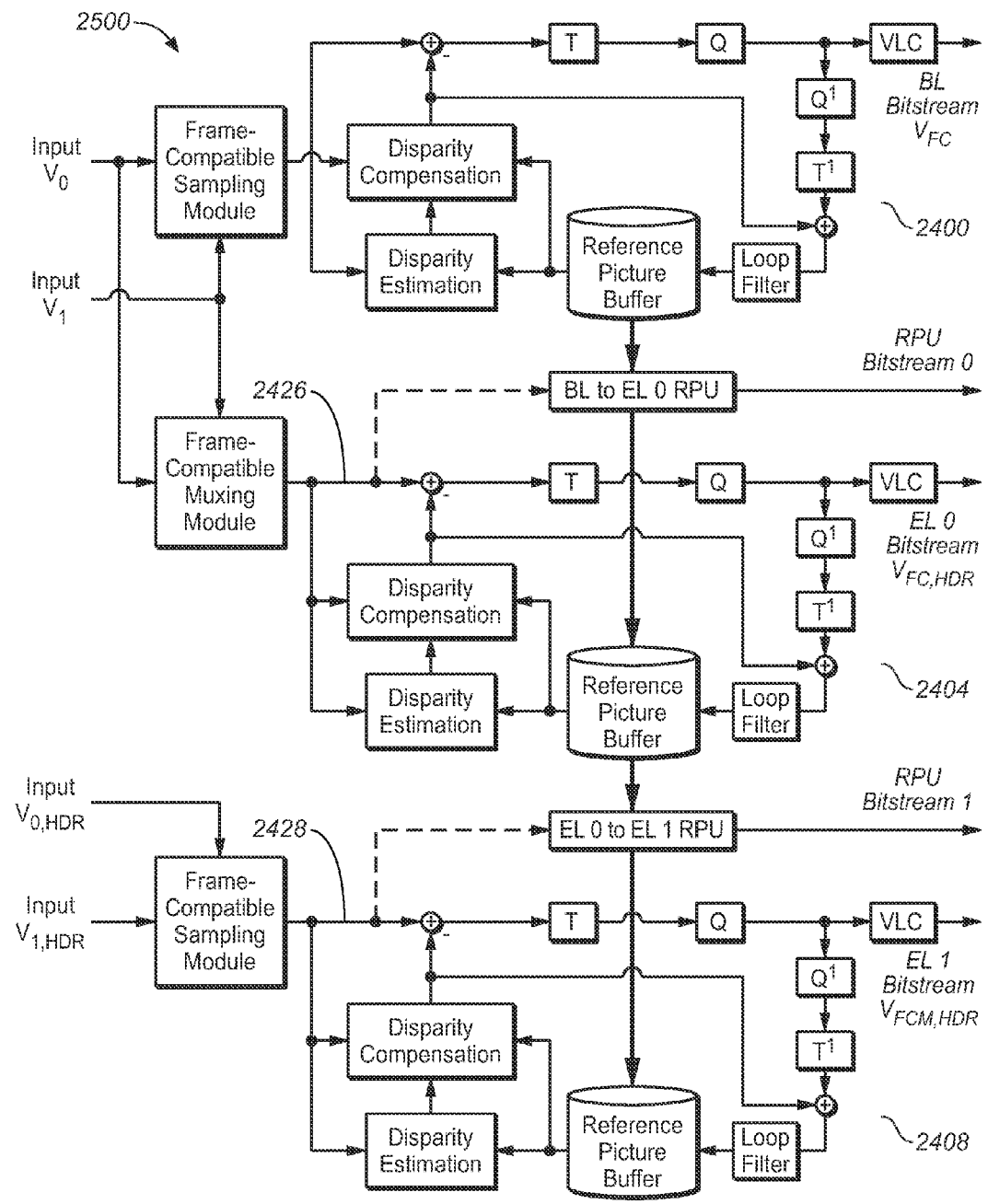
FIG. 25 shows an encoder that provides a frame-compatible base layer, a first enhancement layer with the multiplexed samples of both views, and a second enhancement layer with the HDR representation of the multiplexed samples of both views.
Figure 26:
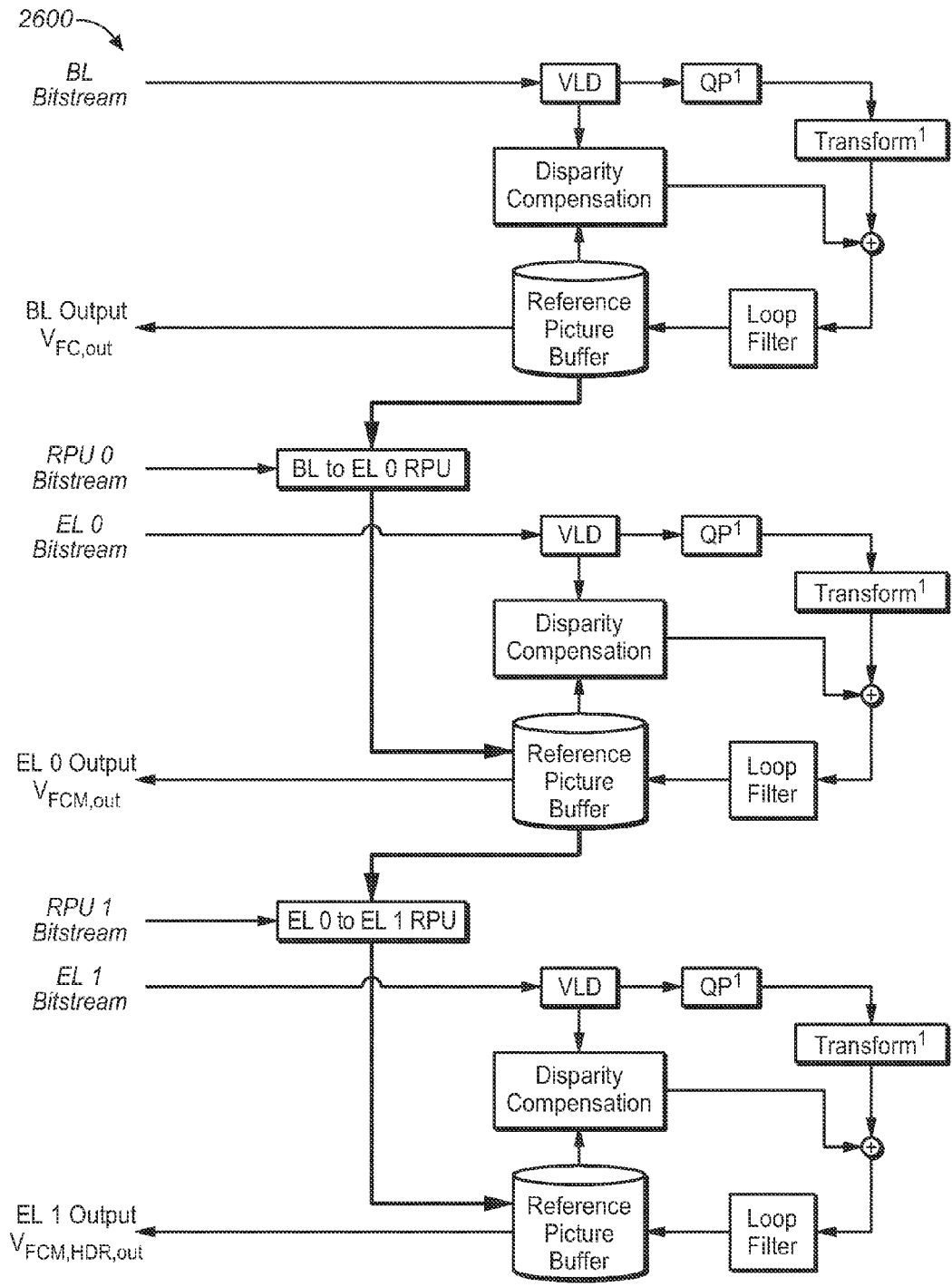
FIG. 26 shows a decoder that provides a frame-compatible base layer, a first enhancement layer with the multiplexed samples of both views, and a second enhancement layer with the HDR representation of the multiplexed samples of both views.

A high level diagram of a similar system that packages both views in a single frame for the enhancement layers for a stereoscopic 3D format can be found in FIG. 24. The system provides a frame-compatible base layer (2400), a first-group (2402) enhancement layer (2404) with the multiplexed samples of both views (2426), and a second-group (2406) enhancement layer (2408) with the HDR representation of the multiplexed samples of both views (2428). Encoder (2500) and decoder (2600) diagrams of an embodiment that considers two views in a stereoscopic 3D format can be found in FIGS. 25-26. The first group comprises "EL 0", while the second group comprises "EL 1".

Figure 21:
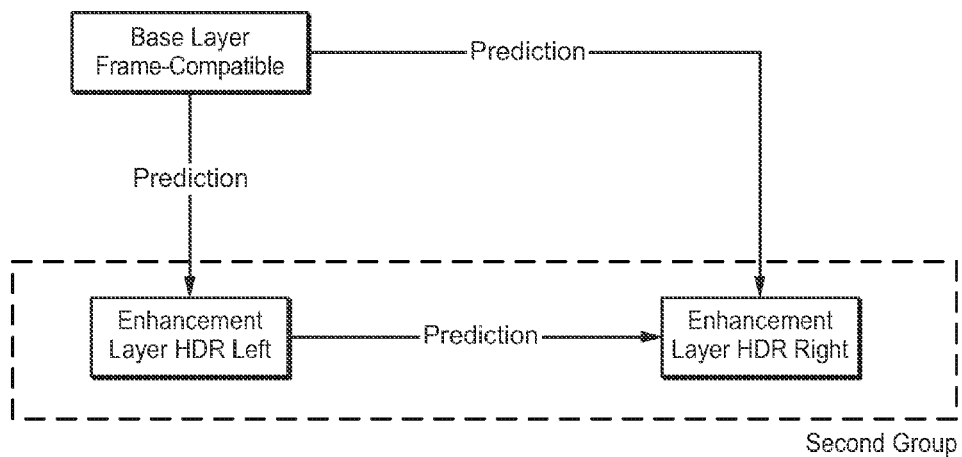
FIG. 21 shows a scalable 3D+HDR delivery system that provides a frame-compatible base layer, a first enhancement layer with the HDR representation of the samples of a first view, and a second enhancement layer with the HDR representation of the samples of a second view.
Figure 22:
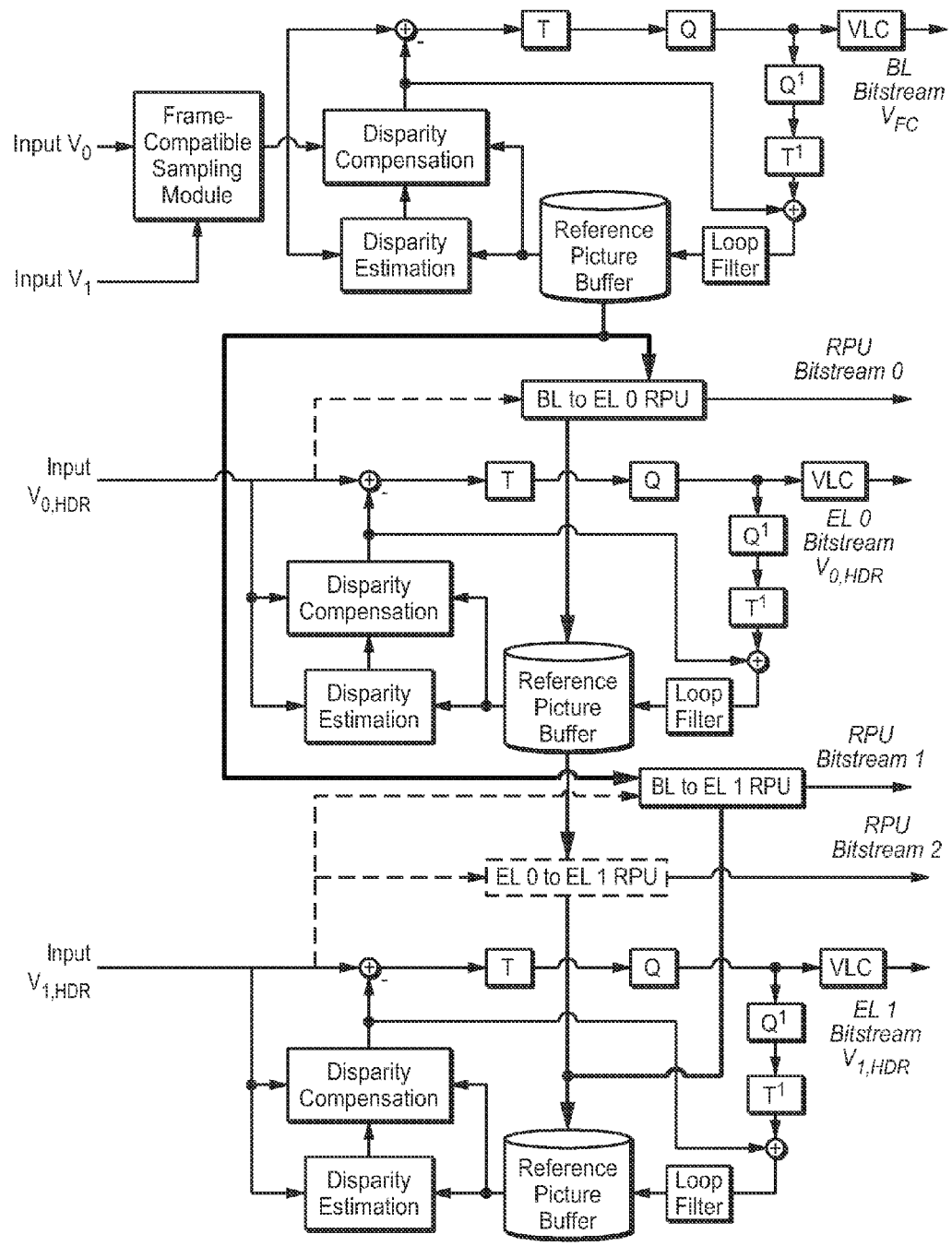
FIG. 22 shows an encoder that provides a frame-compatible base layer, a first enhancement layer with the HDR representation of the samples of a first view, and a second enhancement layer with the HDR representation of the samples of a second view.
Figure 23:
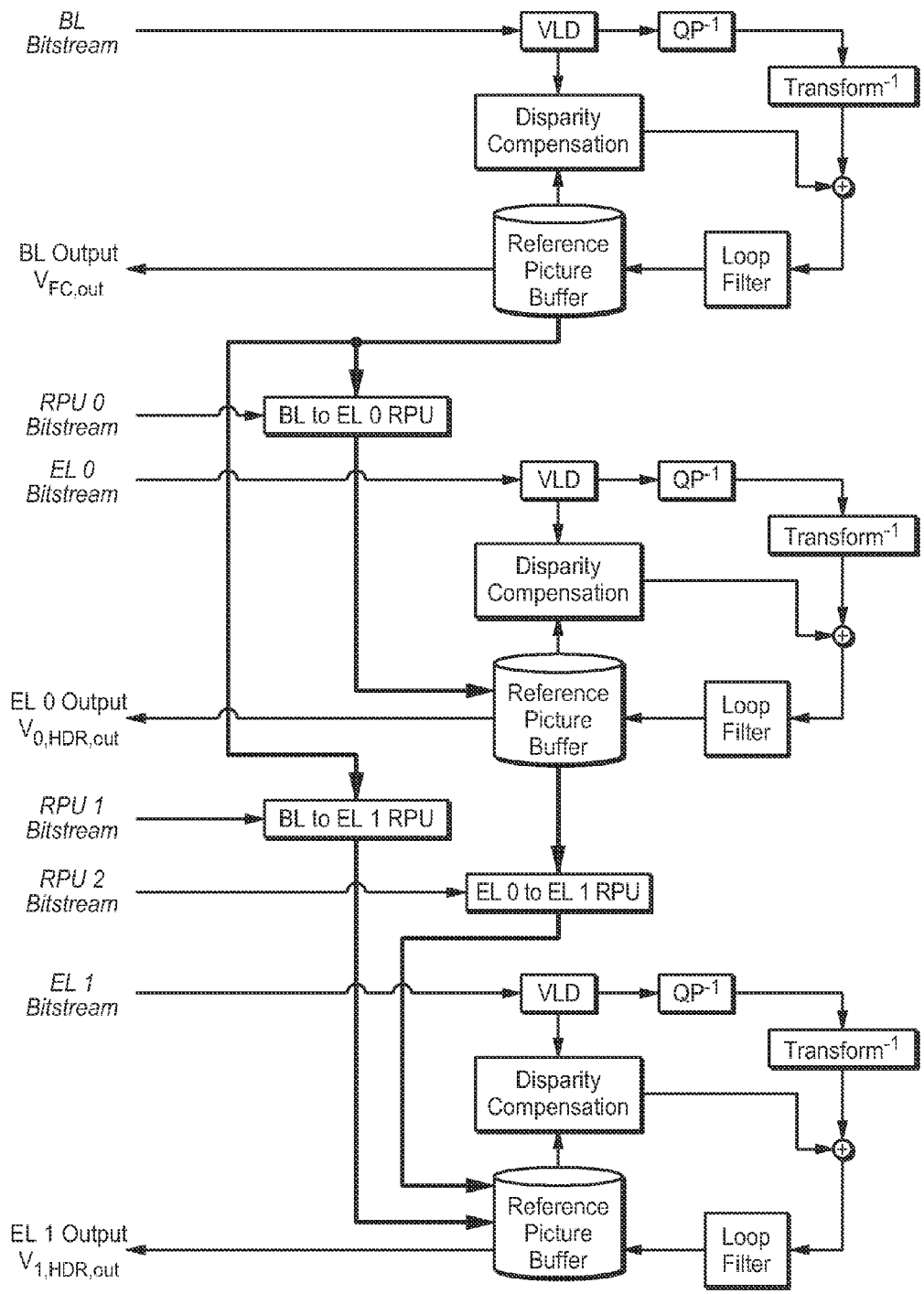
FIG. 23 shows a decoder that provides a frame-compatible base layer, a first enhancement layer with the HDR representation of the samples of a first view, and a second enhancement layer with the HDR representation of the samples of a second view.

A high level diagram of a system similar to that in FIG. 18 can be found in FIG. 21. Different from the system in FIG. 18, the system shown in FIG. 21 does not have a first group of enhancement layers. Encoder and decoder diagrams of an embodiment that considers two views in a stereoscopic 3D format can be found in FIGS. 22-23.

Figure 27:
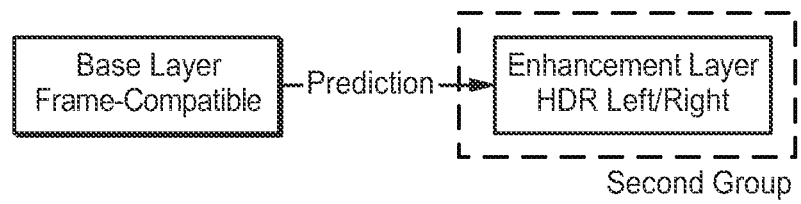
FIG. 27 shows a scalable 3D+HDR delivery system that provides a frame-compatible base layer and an enhancement layer with the HDR representation of the multiplexed samples of both views.
Figure 28:
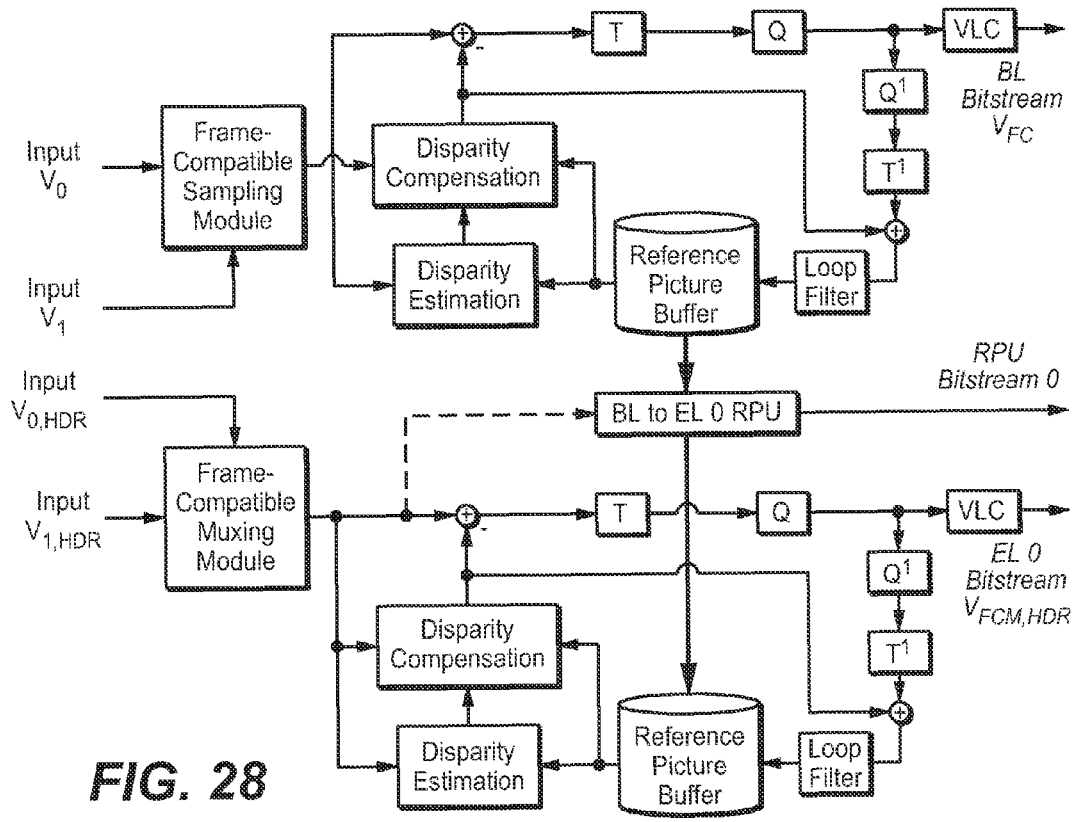
FIG. 28 shows an encoder that provides a frame-compatible base layer and an enhancement layer with the HDR representation of the multiplexed samples of both views.
Figure 29:
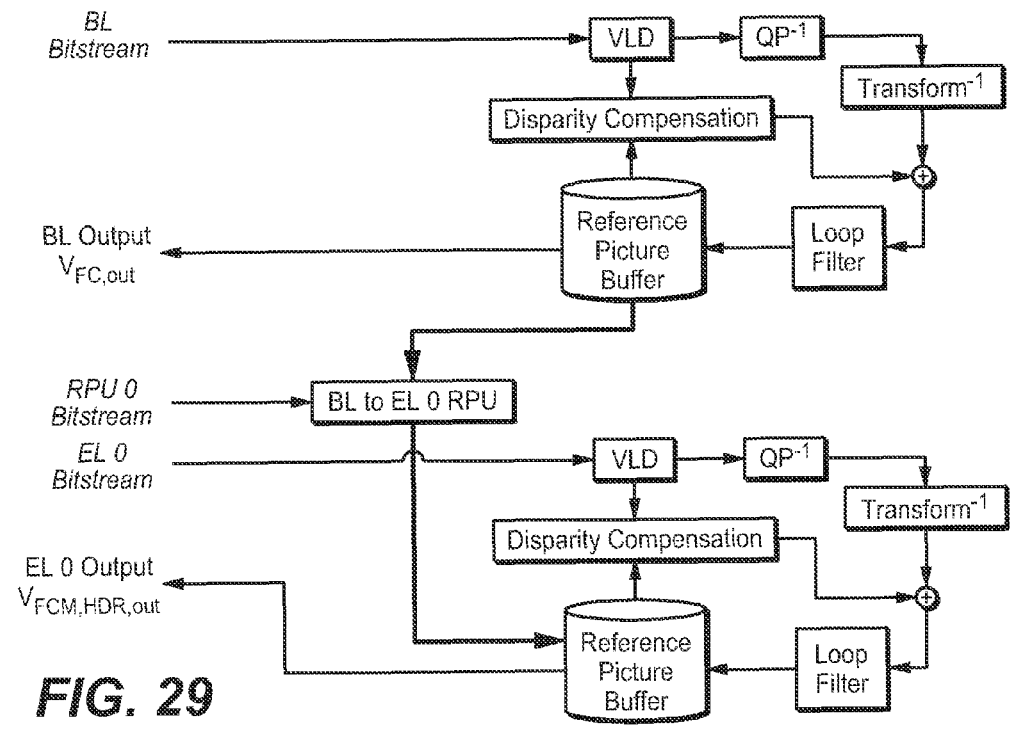
FIG. 29 shows a decoder that provides a frame-compatible base layer and an enhancement layer with the HDR representation of the multiplexed samples of both views.

A high level diagram of a system similar to that in FIG. 24 can be found in FIG. 27. Differently from the system in FIG. 24, the system shown in FIG. 27 does not have a first group of enhancement layers. Encoder and decoder diagrams of an embodiment that considers two views in a stereoscopic 3D format can be found in FIGS. 28-29.

In some embodiments, for the arrangements that code each view in a separate enhancement layer (e.g., the layer does not code a frame-compatible representation), the frame coded in the base layer or the enhancement layers can have the same number of samples or spatial dimensions as that of the frames belonging to each data category.

Method C

In some embodiments, the first group of enhancement layers can consist of complementary BDR frame-compatible signals that, in conjunction with the BDR frame-compatible signal coded in the base layer, can jointly provide enhancement resolution for each view. The first group of enhancement layers is similar to that of the first group of enhancement layers in method A. As an example embodiment for two views, the base layer can provide the frame-compatible representation of the BDR data, while the only enhancement layer of the first group can provide the complementary frame-compatible representation of the BDR data. The second group of enhancement layer can be identical to the second group of enhancement layers in method B. In an embodiment with two stereoscopic views, a first layer of the second group provides the HDR representation of a first view and the second layer of the second group provides the HDR representation of a second view.

Inter-layer prediction for the enhancement layers of the first group can benefit from RPU processing of the decoded pictures in the base layer picture buffer. As with method A, an RPU/pre-processor can take as input, frame-compatible decoded pictures from the reference picture buffer of the base layer, and then process the samples to estimate the complementary frame-compatible samples coded in one or more of the enhancement layers of the first group. This method, as described later, differs from the methods described previously in the use of RPUs to enhance inter layer prediction for the second group of enhancement layers.

Inter-layer prediction for the enhancement layers of the second group can benefit from reference picture processing using an RPU to process decoded pictures of the base layer, or the first group enhancement layers buffers prior to using them for motion-compensated prediction for one or more of the layers (each of which corresponds to a different view) of the second group.

In some embodiments, an RPU can take as input, either the base layer decoded picture or one of the first group enhancement layer decoded pictures, extract the multiplexed samples that correspond to the target view, interpolate the missing samples, and also predict the HDR representation from the reconstructed BDR representation, including considerations for color-space, inverse mapping for bit-depth expansion, and possibly color sampling format, etc. The BDR to HDR prediction process can be performed in a plurality of steps using more than one enhancement layer. For example, a first enhancement layer can be used to convert an 8-bit 4:2:0 BDR signal into an intermediate signal with higher bit-depth, but still in 4:2:0 format. A second enhancement layer can be used to convert the intermediate signal into the desired HDR signal in higher bit-depth and in 4:4:4 format. Other combinations of using more than one enhancement layer to achieve bit-depth expansion, color space conversion, and color sampling format conversion are also possible. The processed picture can then be placed into the reference picture buffer of the layer in the second group that corresponds to this view.

In some embodiments, an RPU can take as input, decoded pictures from the buffers of the base layer and one or more first group enhancement layers, extract the samples corresponding to the target view from each of the considered picture, and multiplex them to reconstruct an internal BDR representation of the target view. This reconstruction can optionally entail interpolation. The representation internal to the RPU (in BDR format) can then undergo BDR to HDR prediction to obtain the HDR representation. The processed picture can then be placed into the reference picture buffer of the layer in the second group that corresponds to this view.

In some embodiments, for stereoscopic transmission of two views where half of the samples of each view are coded in the frame-compatible base layer and the other half of the samples of each view are coded in the complementary frame-compatible first group enhancement layer, the BDR representation internal to the RPU of each view can simply be accomplished by demultiplexing the frame-compatible pictures of each layer into the target view or views. Interpolation is not performed since all samples are available. However filtering can be applied to the internal view reconstruction, for example, to compensate for quantization of quality differences of the multiplexed samples. As described in the previous paragraphs, the BDR representation can then undergo a BDR to HDR prediction.

In some embodiments, RPUs can be used to improve inter-layer prediction between layers in the second group. Pictures in one enhancement layer corresponding to one view can be processed by an RPU prior to placing them into the reference picture buffer of one or more lower priority enhancement layers of the same group that correspond to another view. Such an RPU can additionally perform stereo disparity compensation processes that can involve transmission of disparity vector information to the corresponding decoder RPU. Other intra-prediction methods such as inpainting can also be considered by such an RPU to account for high disparity and occlusion. Global motion compensation schemes such as using the warping method can also be performed. Other possible methods can include illumination compensation and even color balancing. Such operations may be performed locally or globally.

Figure 30:
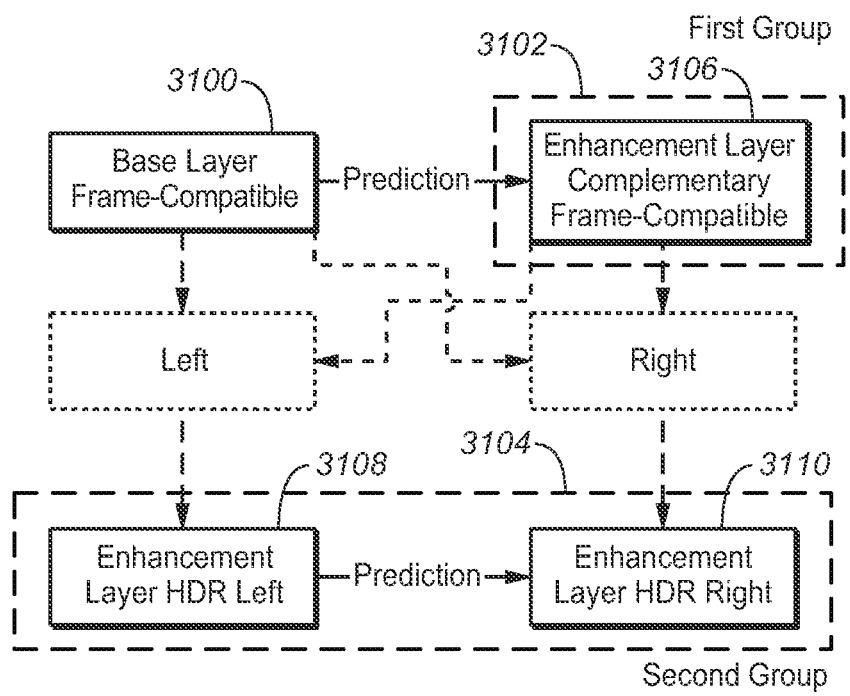
FIG. 30 shows a scalable 3D+HDR delivery system that provides a frame-compatible base layer, a first enhancement layer with the complementary frame-compatible samples, a second enhancement layer with the HDR representation of the samples of a first view, and a third enhancement layer with the HDR representation of the samples of a second view.
Figures 31, 31A:
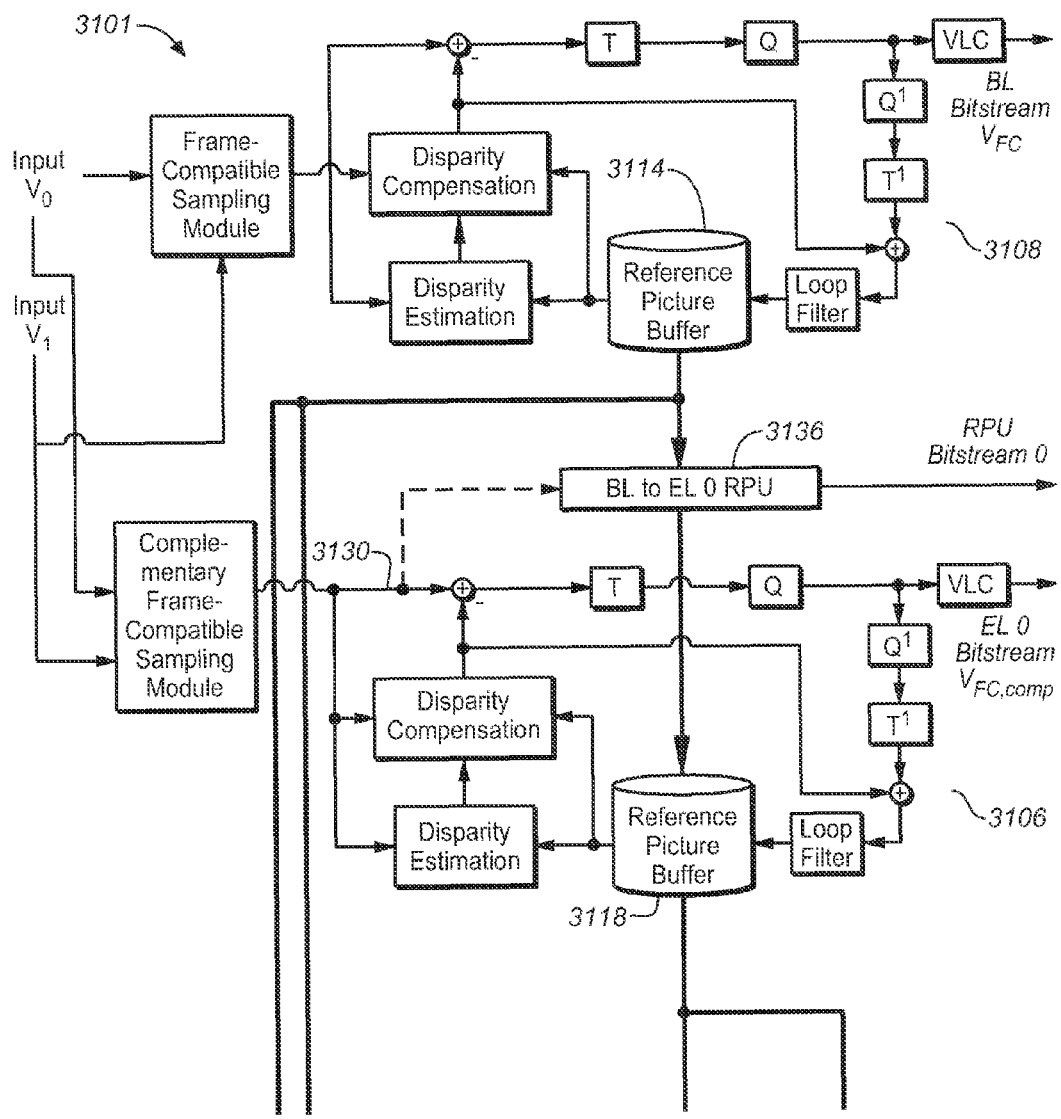
FIG. 31 shows an encoder that provides a frame-compatible base layer, a first enhancement layer with the complementary frame-compatible samples, a second enhancement layer with the HDR representation of the samples of a first view, and a third enhancement layer with the HDR representation of the samples of a second view.
Figure 31B:
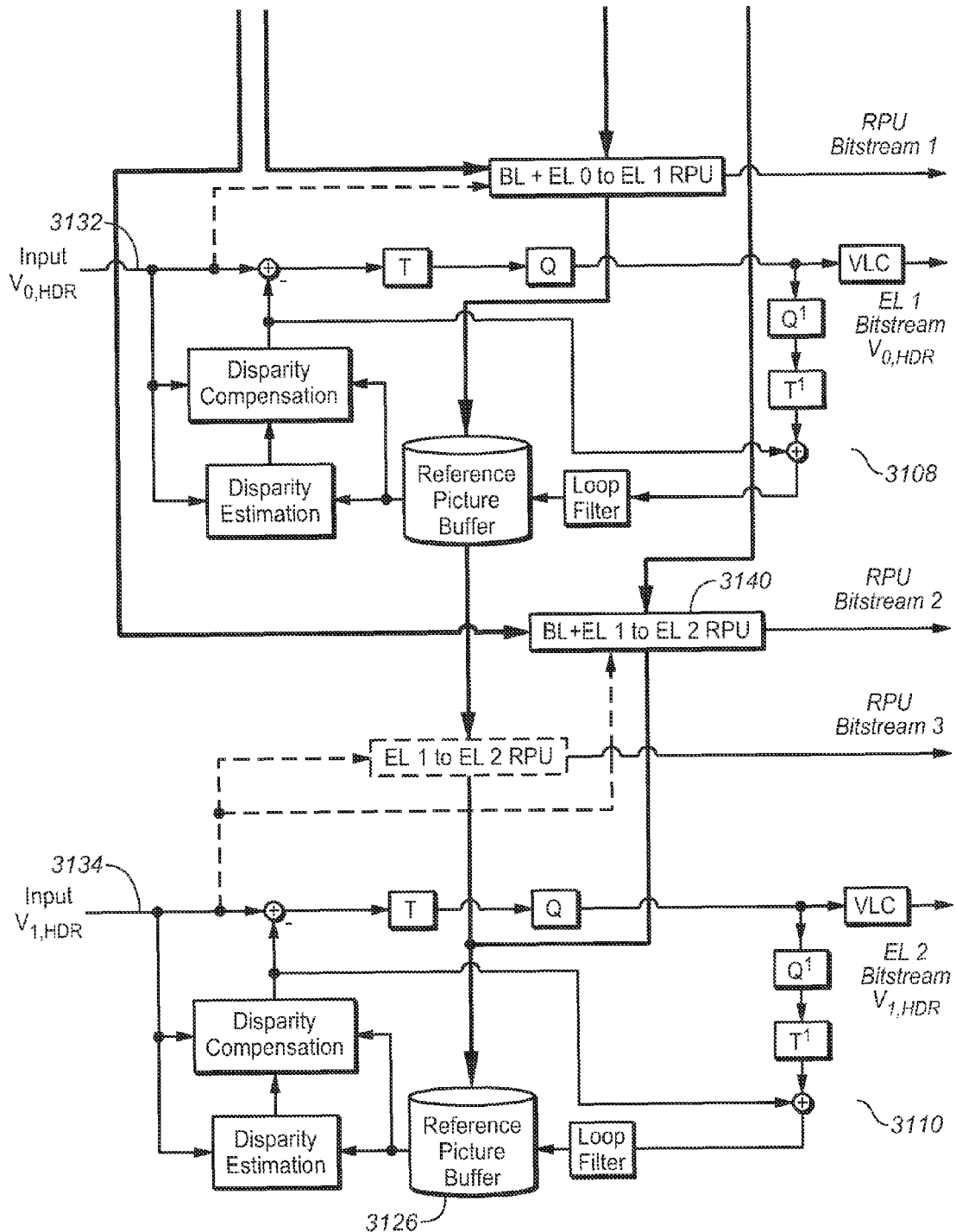
Figure 32:
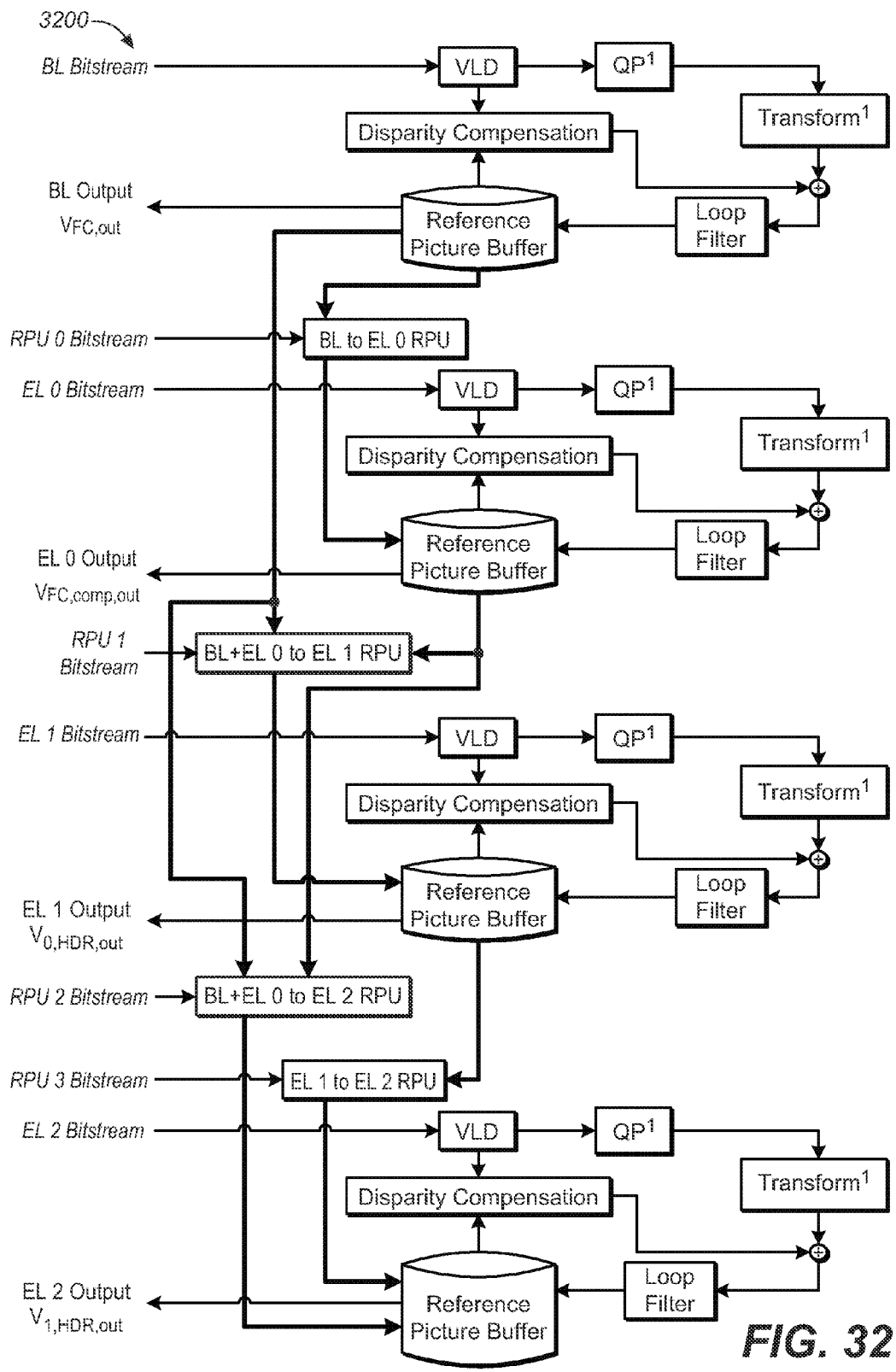
FIG. 32 shows a decoder that provides a frame-compatible base layer, a first enhancement layer with the complementary frame-compatible samples, a second enhancement layer with the HDR representation of the samples of a first view, and a third enhancement layer with the HDR representation of the samples of a second view.

A high level diagram of a system that can implement such method for two views in a stereoscopic 3D format can be found in FIG. 30. The system can provide a frame-compatible base layer (3100), a first-group (3102) enhancement layer (3106) with the complementary frame-compatible samples (3130), a second-group (3104) enhancement layer (3108) with the HDR representation of the samples of a first view (3132), and a second-group (3104) enhancement layer (3150) with the HDR representation of the samples of a second view (3134). Encoder (3100) and decoder (3200) diagrams of an embodiment that considers two views in a stereoscopic 3D format can be found in FIGS. 31-32. The first group comprises "EL 0", while the second group comprises "EL 1" and "EL 2".

Figures 44, 44A:
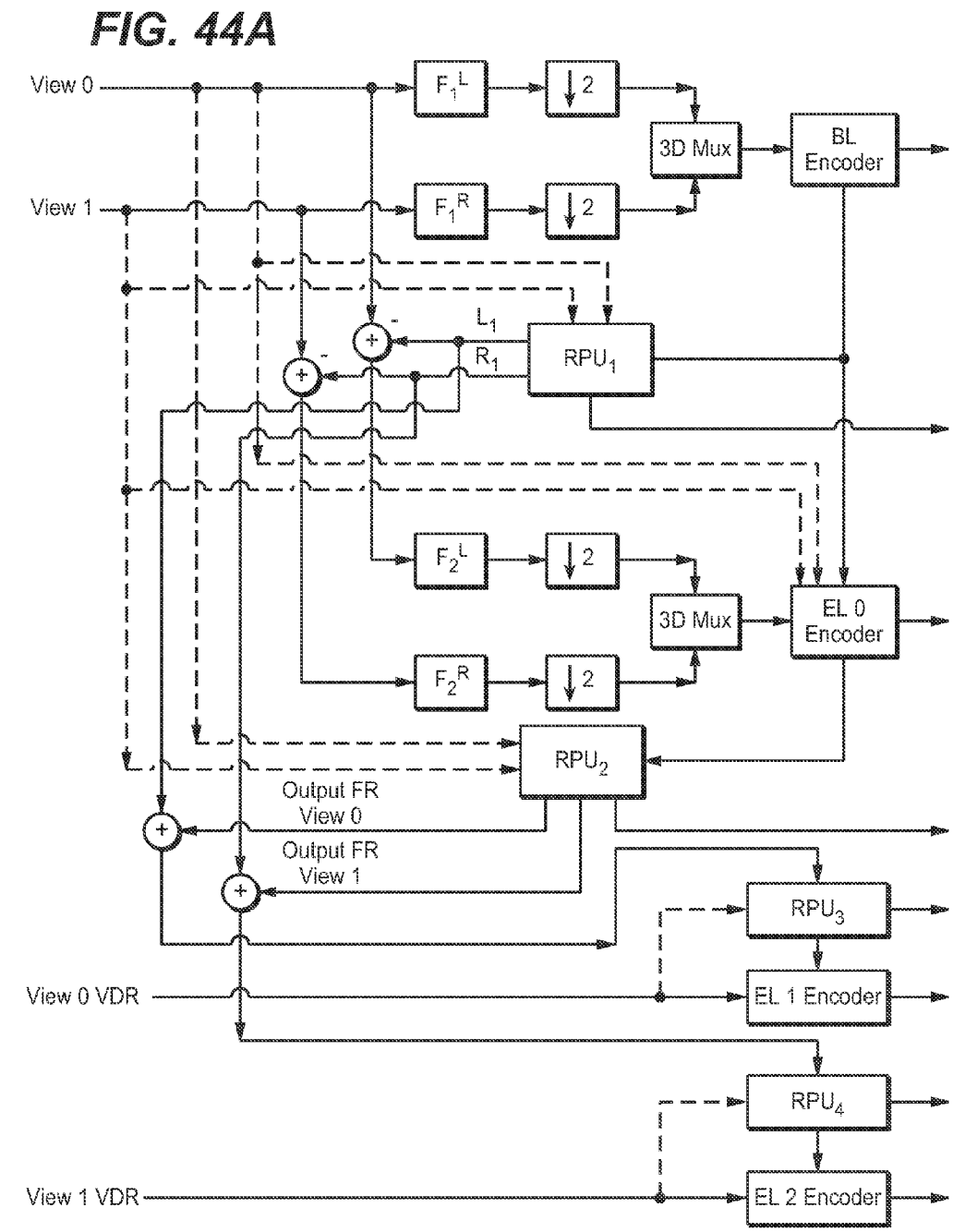
FIG. 44 shows a closed-loop frame-compatible multi-layer stereoscopic and high-bit-depth (HDR) video delivery system that adopts complementary filtering for the base layer and EL 0.
Figure 44B:
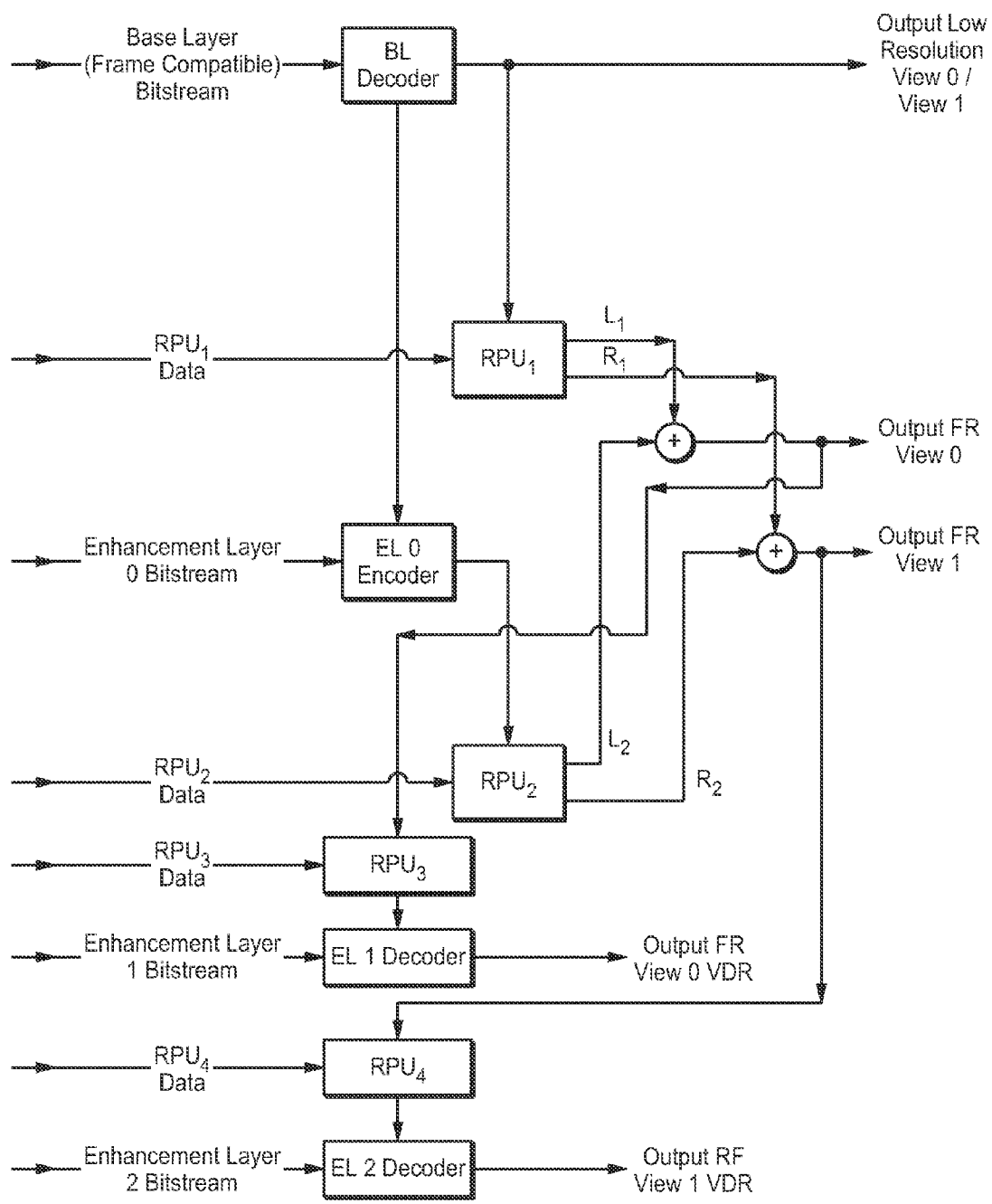

In some embodiments, the base layer can code a representation with a first range of frequency content, while the additional enhancement layers of the first group can provide a second range of frequency content. Their output can be combined at the decoder to provide a better representation of the original BDR data categories. A possible arrangement that can use schemes from reference [8] can be seen in FIG. 44.

Method D

In this method a multi-layer stereoscopic HDR plus 3D delivery system is described wherein a base layer codes one of the views corresponding to a 2D-compatible BDR base layer, and an optional first group of enhancement layers codes the remaining views (one for the case of stereoscopic delivery) in BDR representation, and a second group of enhancement layers code the views in HDR representation. Similarly to method C, in an embodiment with two stereoscopic views, a first layer of the second group provides the HDR representation of a first view and a second layer of the second group provides the HDR representation of a second view.

In some embodiments, RPUs (3136) can benefit inter-layer prediction between the base layer and the enhancement layers of the first group. Pictures in the reference picture buffer (3114) of the base layer corresponding to one view can be processed by an RPU (3136) prior to placing them into the reference picture buffer (3118) of one or more first-group (3102) enhancement layers that correspond to another view. The RPU can perform stereo disparity estimation and compensation, and utilize tools such as global motion compensation and warping methods. Other possible tools can include illumination compensation and even color balancing. Such operations can be performed locally or globally.

In some embodiments, RPUs (3140) can benefit inter-layer prediction between an enhancement layer (3108) of the second group (3104) and another enhancement layer (3110) of the same group. Pictures in the reference picture buffer (3122) of a first enhancement layer (3108) in the second group (3104) corresponding to one view may be processed by an RPU (3140) prior to placing them into the reference picture buffer (3126) of one or more lower-priority enhancement layers (3110) in the second group (3104) corresponding to other views. The RPU may perform stereo disparity estimation and compensation, and utilize tools such as global motion compensation and warping methods. Other possible tools include illumination compensation and even color balancing. These operations may be performed locally or globally.

In some embodiments, inter-layer prediction between the base layer and a second group enhancement layer corresponding to the same view can benefit from RPU processing. The decoded picture in the base layer can be processed to estimate the HDR representation. Such processing operations can include various BDR to HDR prediction methods, including but not limited to color-space conversion, inverse mapping to achieve bit-depth expansion, and possibly conversion to a different color sampling format. The processed picture can then be placed into the reference picture buffer of the layer in the second group that corresponds to this view.

Similarly, in some embodiments, inter-layer prediction between an enhancement layer in the first group and an enhancement layer in the second group, both corresponding to the same view, can benefit from the RPU processing. The decoded picture in the first group enhancement layer can be processed to estimate the HDR representation. Such processing operations can include various BDR to HDR prediction methods, including but not limited to color-space conversion, inverse mapping to achieve bit-depth expansion, and possibly conversion to a different color sampling format. The processed picture can then be placed into the reference picture buffer of the layer in the second group that corresponds to this view.

Figure 33:
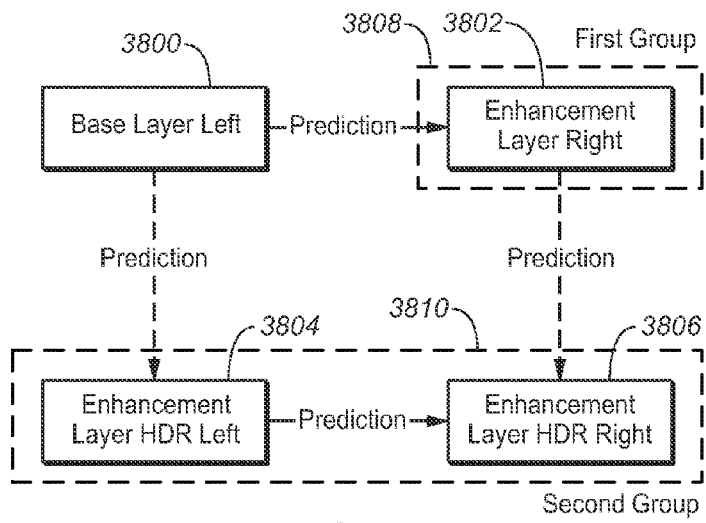
FIG. 33 shows a scalable 3D+HDR delivery system that provides a 2D-compatible base layer with the samples of a first view, a first enhancement layer with the samples of a second view, a second enhancement layer with a HDR representation of the samples in a first view, and a third enhancement layer with the HDR representation of the samples of a second view.
Figure 34:
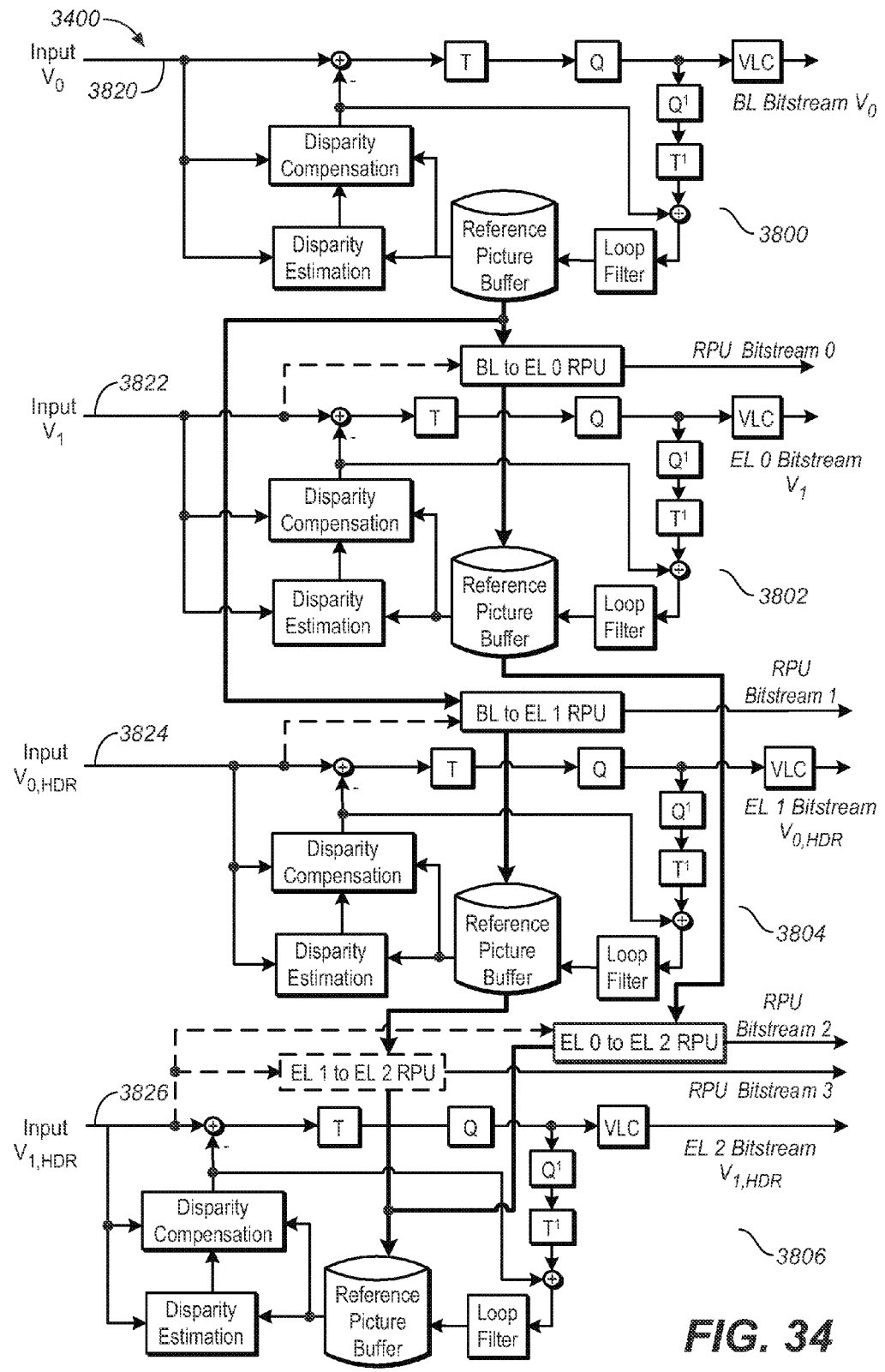
FIG. 34 shows an encoder that provides a 2D-compatible base layer with the samples of a first view, a first enhancement layer with the samples of a second view, a second enhancement layer with a HDR representation of the samples in a first view, and a third enhancement layer with the HDR representation of the samples of a second view.
Figure 35:
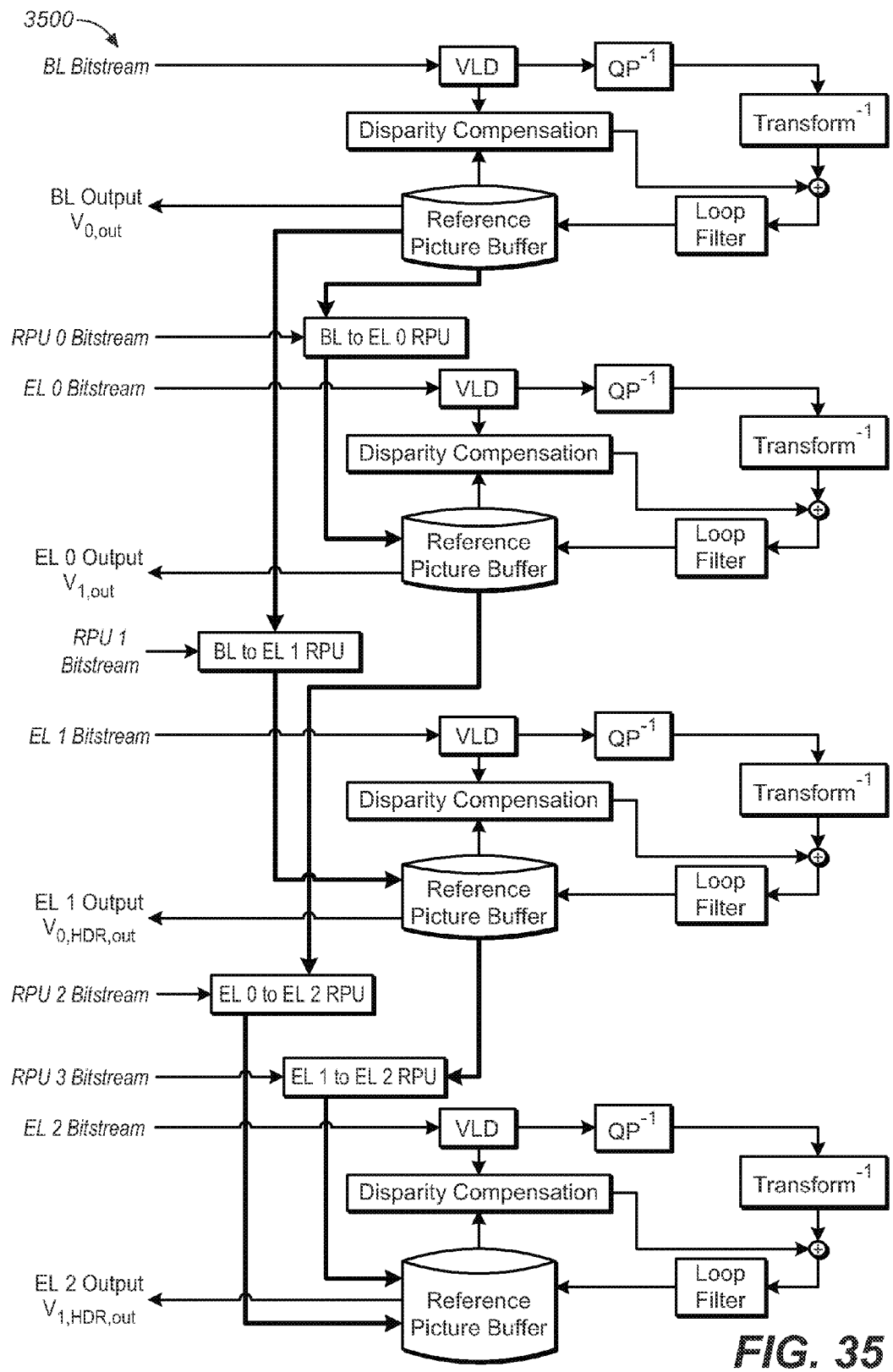
FIG. 35 shows a decoder that provides a 2D-compatible base layer with the samples of a first view, a first enhancement layer with the samples of a second view, a second enhancement layer with a HDR representation of the samples in a first view, and a third enhancement layer with the HDR representation of the samples of a second view.

A high level diagram of a system that implements such method for two views in a stereoscopic 3D format can be found in FIG. 33. The system can provide a base layer (3800) with the samples of a first view (3820), an enhancement layer (3802) in the first group (3808) with the samples of a second view (3822), a first enhancement layer (3804) in the second group (3810) with a HDR representation of the samples in a first view (3824), and a second enhancement layer (3806) in the second group (3810) with the HDR representation of the samples of a second view (3826). Encoder (3400) and decoder (3500) diagrams of an embodiment that considers two views in a stereoscopic 3D format can be found in FIGS. 34-35. The first group comprises "EL 0", while the second group comprises "EL 1" and "EL 2".

Figure 36:
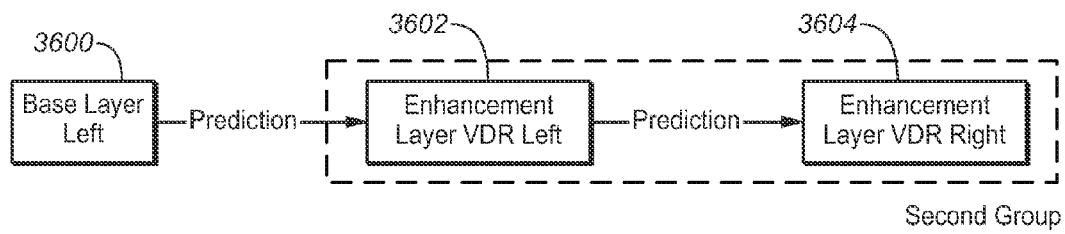
FIG. 36 shows a scalable 3D+HDR delivery system that provides a 2D-compatible base layer with samples of a first view, a first enhancement layer with a HDR representation of the samples in the base layer, and a second enhancement layer with the HDR representation of the samples of a second view.
Figure 37:
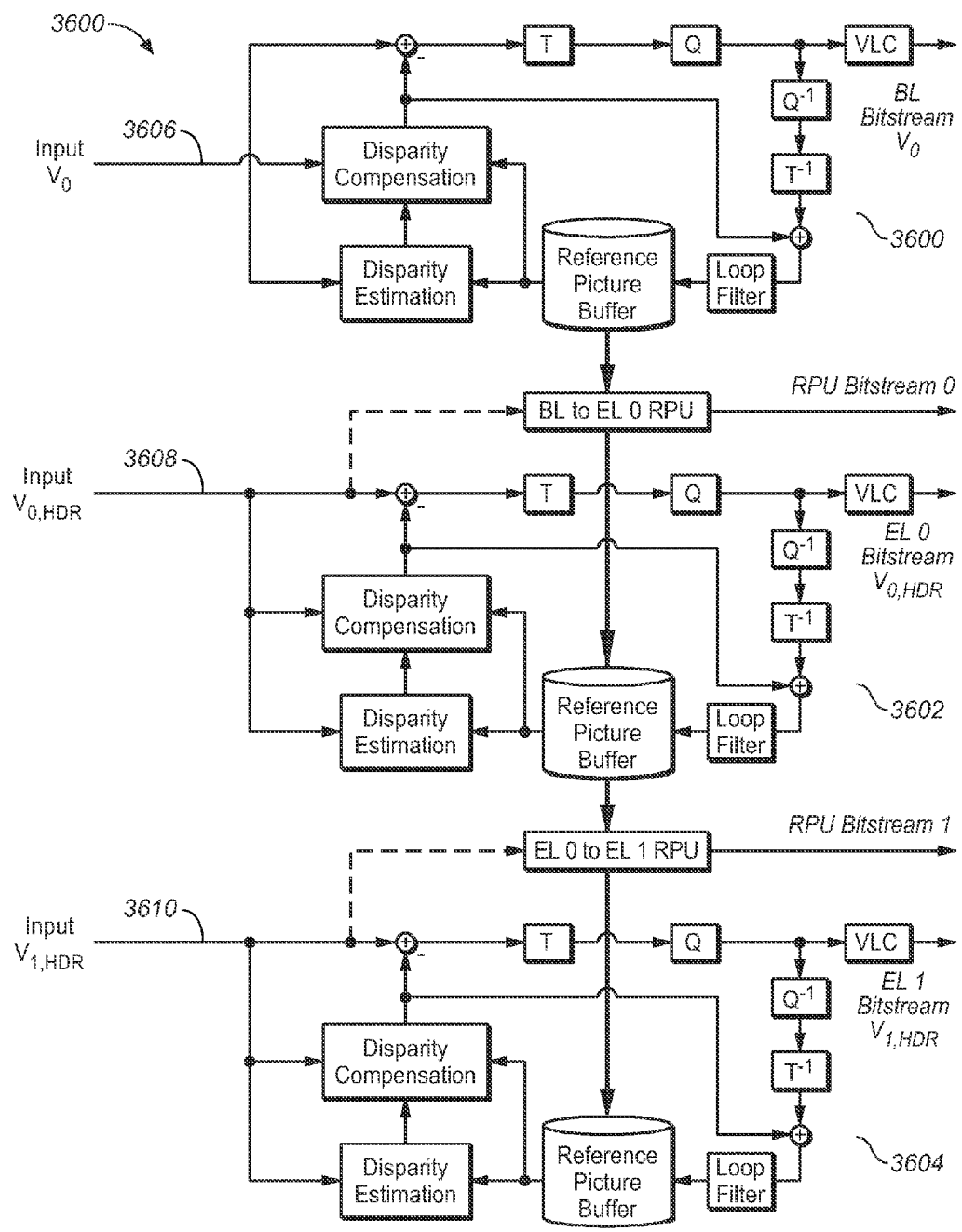
FIG. 37 shows an encoder that provides a 2D-compatible base layer with samples of a first view, a first enhancement layer with a HDR representation of the samples in the base layer, and a second enhancement layer with the HDR representation of the samples of a second view.
Figure 38:
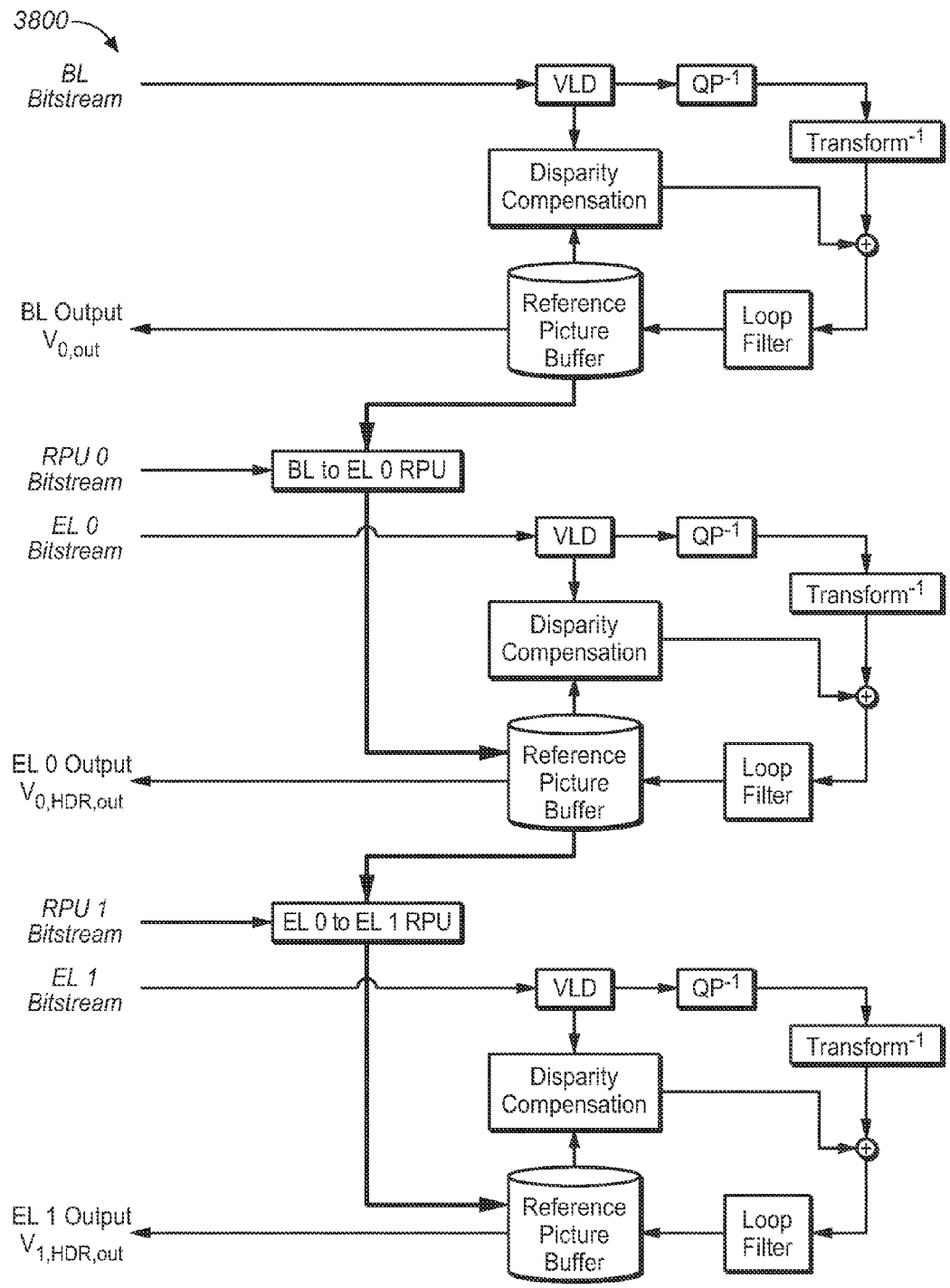
FIG. 38 shows a decoder that provides a 2D-compatible base layer with samples of a first view, a first enhancement layer with a HDR representation of the samples in the base layer, and a second enhancement layer with the HDR representation of the samples of a second view.

A high level diagram of a similar system that implements this method for two views in a stereoscopic 3D format can be found in FIG. 36. Differently from the system of FIG. 33, there are no first group enhancement layers. The system can provide a 2D-compatible base layer (3600) with samples of a first view (3606), a first enhancement layer (3602) with a HDR representation of the samples (3606) in the base layer, and a second enhancement layer (3604) with the HDR representation of the samples of a second view (3610). Encoder (3700) and decoder (3800) diagrams of an embodiment that considers two views in a stereoscopic 3D format can be found in FIG. 37-38.

Method E

In this method a multi-layer stereoscopic HDR plus 3D delivery system is described wherein the base layer codes one of the views corresponding to an BDR 2D-compatible base layer, a first group of enhancement layers codes the remaining views (one for the case of stereoscopic delivery) in BDR representation, and a second group that consists of a single enhancement layer codes the views in a frame-compatible HDR representation.

In some embodiments, RPUs can benefit inter-layer prediction between the base layer and the enhancement layers of the first group. Pictures in the reference picture buffer of the base layer corresponding to one view can be processed by an RPU prior to being placed into the reference picture buffer of one or more first-group enhancement layers that corresponds to other views. The RPU may perform stereo disparity estimation and compensation, and utilize tools such as global motion compensation and warping methods. Other possible method can include illumination compensation and even color balancing. These operations can be performed locally or globally.

In some embodiments, inter-layer prediction between the layers comprising individual views (base layer and first group of enhancement layers) and the second group enhancement layer can benefit from RPU processing. The decoded picture in one of the individual view layers that contain samples of a first view is sampled and multiplexed to estimate the first view samples of the frame-compatible representation coded in the second group enhancement layer. The samples for the second view or views can be estimated, for example, by using stereo disparity information when coding the base layer and the first enhancement layer as described in the previous paragraph, or replaced with those of the first view. The resulting frame-compatible picture can be further processed to estimate the HDR representation. Such processing operations can include the BDR to HDR prediction methods, including color space conversion, inverse mapping to achieve bit-depth expansion, and possibly conversion to a different color sampling format. The processed picture can then be placed into the reference picture buffer of the layer in the second group.

In some embodiments, inter-layer prediction between the layers comprising individual views (base layer and a first group of enhancement layers) and the second-group enhancement layer can benefit from RPU processing. The decoded pictures of all individual view layers can be sampled and multiplexed (e.g. using the module of FIG. 9) to create a frame that adopts the frame-compatible representation coded in the second group enhancement layer. Then this frame can be further processed to estimate the HDR representation. Such processing operations include the BDR to HDR prediction technique, including color space conversion, inverse mapping to achieve bit-depth expansion, and possibly conversion to a different color sampling format. The processed picture is then placed into the reference picture buffer of the layer in the second group.

Figure 39:
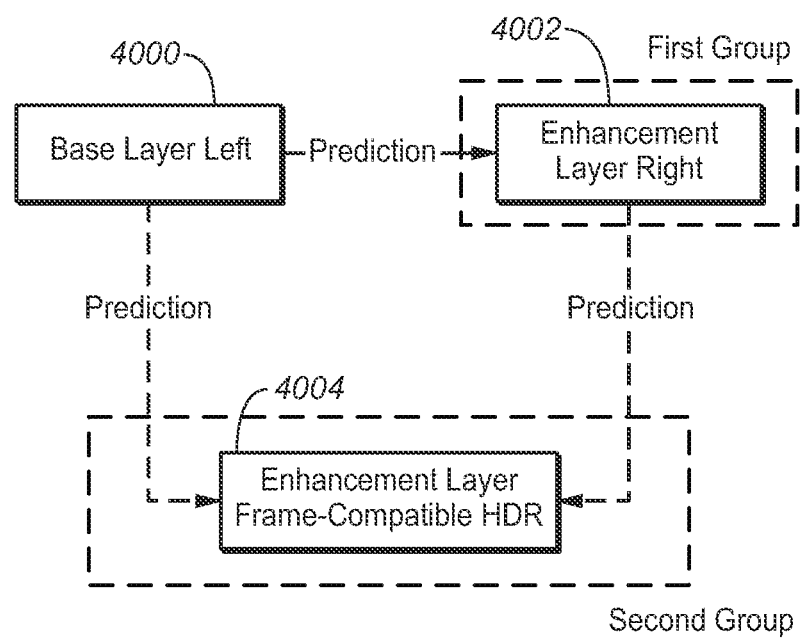
FIG. 39 shows a scalable 3D+HDR delivery system that provides a 2D-compatible base layer with the samples of a first view, a first enhancement layer with the samples of a second view, and a second enhancement layer with a frame-compatible HDR representation.
Figure 40:
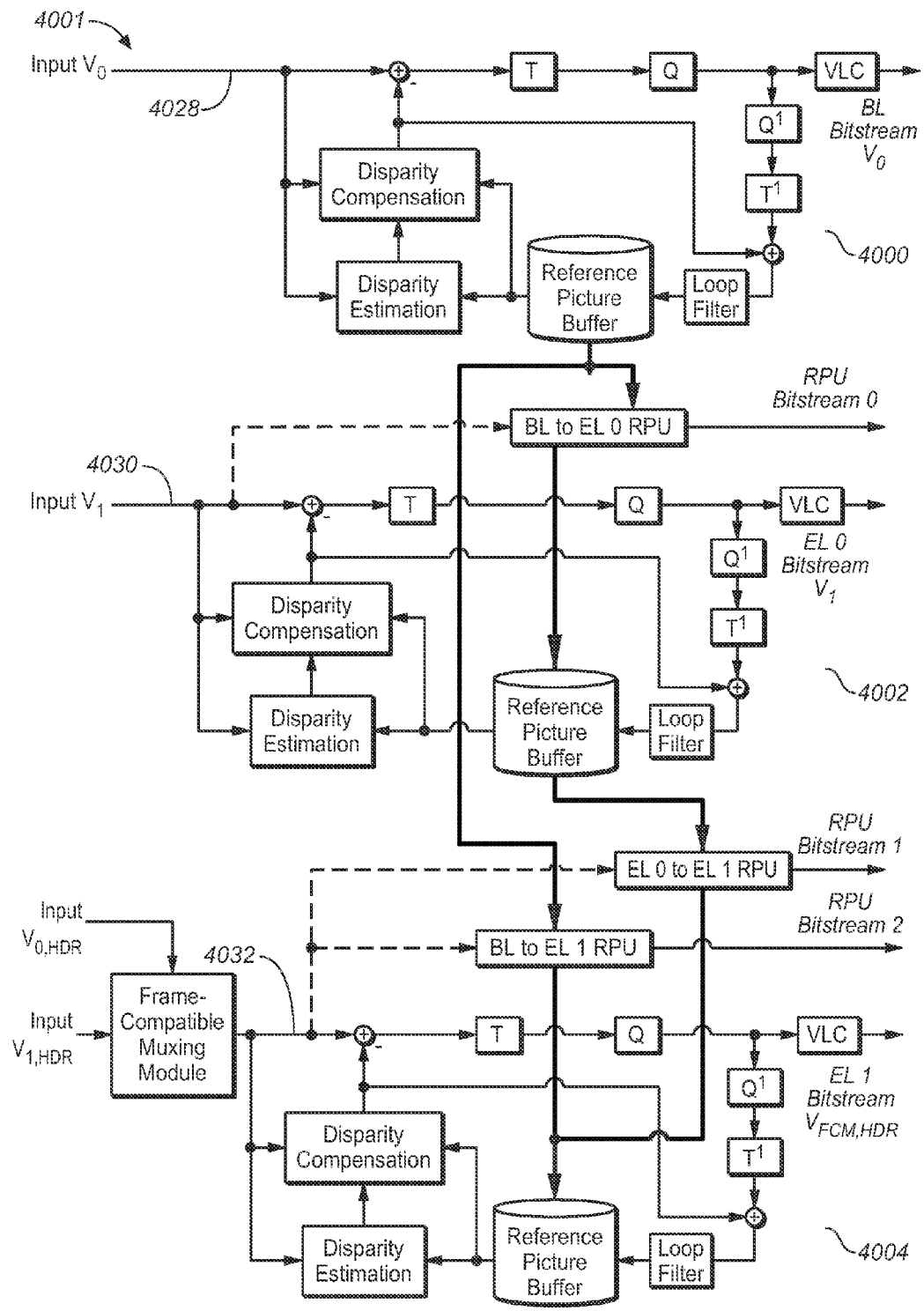
FIG. 40 shows an encoder that provides a 2D-compatible base layer with the samples of a first view, a first enhancement layer with the samples of a second view, and a second enhancement layer with a frame-compatible HDR representation.
Figure 41:
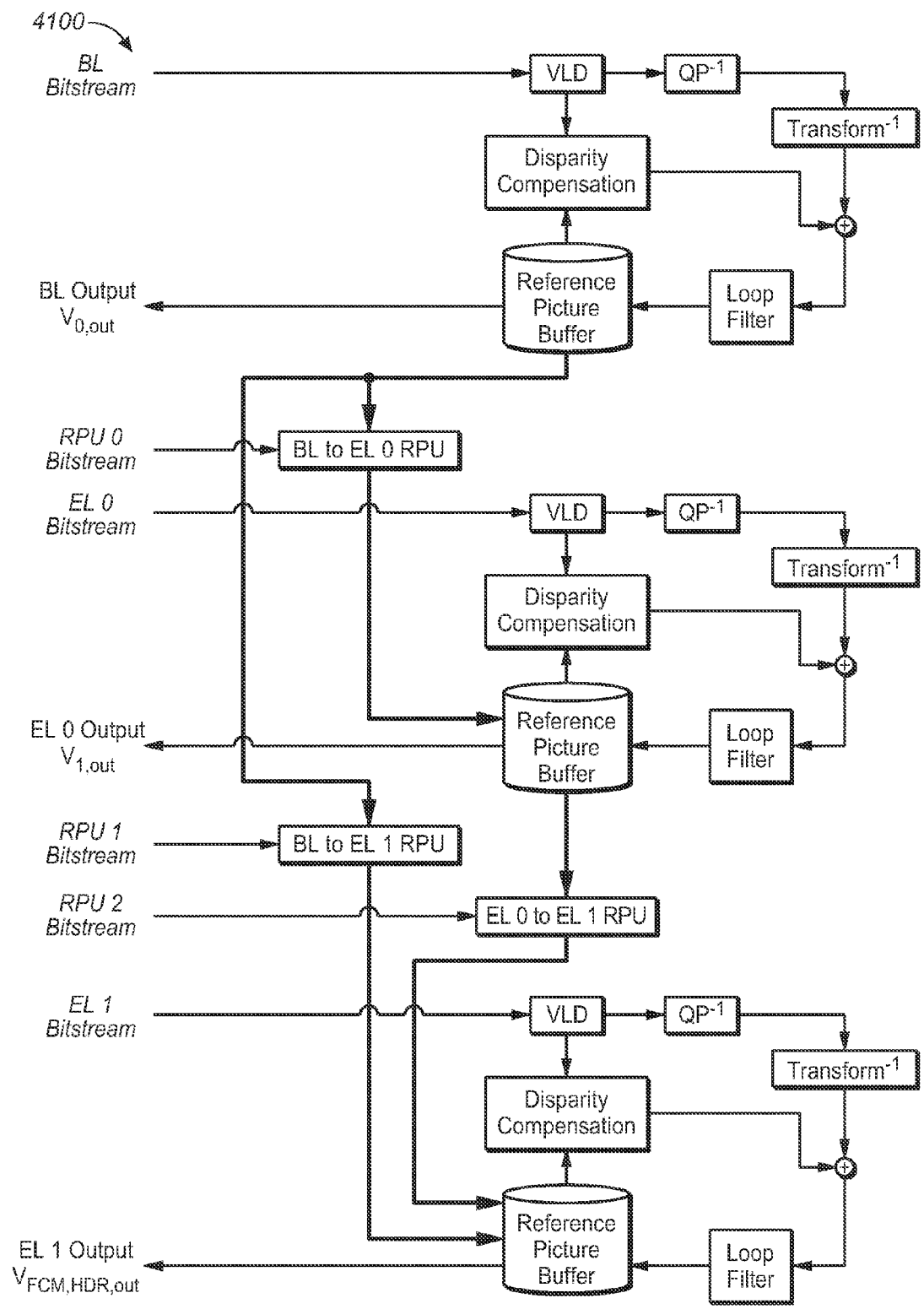
FIG. 41 shows a decoder that provides a 2D-compatible base layer with the samples of a first view, a first enhancement layer with the samples of a second view, and a second enhancement layer with a frame-compatible HDR representation.

A high level diagram of a system can implement the method for two views in a stereoscopic 3D format can be found in FIG. 39. The system can provide a base layer (4000) with the samples of a first view (4028), a first-group (4006) enhancement layer (4002) with the samples of a second view (4030), and a second-group (4008) enhancement layer (4004) with a frame-compatible HDR representation (4032). Encoder (4001) and decoder (4100) diagrams of an embodiment that considers two views in a stereoscopic 3D format can be found in FIGS. 40-41. The first group can comprise "EL 0", while the second group can comprise "EL 1".

In some embodiments, the frame coded in the base layer or the enhancement layers can have the same number of samples or spatial dimensions, as those of the frames belonging to each data category (e.g., view).

In some embodiments, the frame compatible format can comprise the even or odd columns from the first view and the odd or even columns from the second view, while the complementary frame compatible format can comprise the odd or even columns from the first view and the even or odd columns from the second view, in that order. A similar embodiment is also possible for an over-under frame-compatible representation by alternating the parity of the sampled lines.

In some embodiments, the layers can code frames at different spatial resolutions, in which case a system with spatial scalability can be implemented. In such case, the RPU can perform rescaling/resampling, and it is possible that the sampling grid of one layer can be sampled with fractional pixel offsets and that also the sampling ratio may not necessarily be an integer. The RPU can consider both the offsets and the ratio differences between the higher and the lower priority layer prior to estimating the samples of the lower priority layer. For example, consider the case where a side-by-side frame-compatible base layer at 1280×720 and second group frame-compatible enhancement layers that can reconstruct both views at HDR representation at 1920×1080 are desired. The embodiments of the present disclosure can be applied to solve such problem by specializing the operation of the RPUs.

The reference processing units first de-multiplex the frame-compatible data into separate data categories (e.g., views), and the resulting frame is then resealed (e.g., from 640×720 to 960×1080) by considering the sampling offsets used to derive the base and the target enhancement layers. In addition to spatial interpolation aimed at achieving higher spatial resolution, additional RPU operations involve BDR to HDR prediction as mentioned before, namely, color space conversion, inverse tone mapping to achieve higher bit-depth (see references [20][21]), and possibly also resampling of at least some of the color components. Consequently, the resealed frame is placed in the reference picture buffer of the target enhancement layer.

In some embodiments, the multiple reference picture buffers in the enhancement layers can be controlled using memory management control operations (MMCO) or similar operations, if available, such as those defined in reference [2], but also in future standards such as HEVC. MMCO operations can control how reference pictures are being added and removed from the buffers.

In some embodiments where MMCO operations are transmitted for the enhancement layers, either the sets corresponding to each reference picture buffer are the same, or that a single set of operations is signaled and it applies to the reference picture buffers associated with all layers.

In some embodiments, the sets can differ. For example, layers that benefit more from inter-layer prediction can be assigned additional inter-layer references. Others that do not can remove inter-layer references earlier from their picture buffers, and useful reference pictures could be held longer in the buffer for specific layers. Similar constraints can also be enforced in some embodiments with respect to reference picture list modification/reordering signaling, such as methods defined, but not limited to as that described in reference [2]. The signaling information can control the generation of the reference picture lists that point to reference pictures in the buffers. Such lists can then be used during motion-compensated prediction.

In some embodiments, the modification information can be constrained to be identical for the reference picture lists of each data category (e.g., view). Alternatively, a single set can be transmitted and can be applied to the lists of all of the enhancement layers.

In some embodiments, the information can differ and depend on the particular layer, since certain references can benefit the particular layer more than others. Such embodiments can apply to any codec that utilizes signaling to control the content of the reference picture buffers and to control the initialization and modification of its reference picture lists, such as the H.264/AVC codec in reference [2] or other codecs such as HEVC.

In some embodiments, the second group of enhancement layers can have higher priority than the first group. Therefore, after coding the optionally frame-compatible, base layer, one codes the HDR representation, which can then be followed by the regular BDR representation. Inter-layer RPU prediction between the first and second group of layers can be performed since the signals can have different color spaces, sampling formats, and/or bit-depths, among other characteristics. However, the prediction is performed in the opposite direction, such as HDR to BDR prediction. At the same time, RPU prediction for a second group layer from the base layer can also consider that the base layer is in BDR representation and the second group layer in the HDR representation. The RPU can thus additionally consider conversion between different color spaces, color sampling formats, and/or bit-depths, among others. Therefore, an RPU that performs prediction from the base layer to a second group layer includes BDR to HDR prediction operations.

In some embodiments, assuming there is sufficient correlation in motion parameters used in the multiple disparity/motion estimation and compensation modules, constraints can be imposed for those motion parameters to enable efficient prediction of parameters of one module from parameters of a second module that belongs to some higher-priority layer. In one such embodiment, a single set of parameters for all enhancement layers can be sent. The set can be derived for one of the layers. The rest of the layers can process this set to derive their final sets according to the multiplexing and sampling configuration.

Alternatively, a single set can be derived by jointly considering all layers and then having each layer process this set to derive its final parameters according to multiplexing and sampling configurations and optional metadata that describe the relationships among the layers. Other embodiments can send a number of sets that are more than one, but less than the number of layers. If the original/final set was for a frame-compatible signal and the final/original for a single view, the values may be scaled and offset. When predicting parameters for a single view from another view, disparity compensation can be helpful.

In some embodiments, a set for each module can be signaled. Further motion parameters of the current module can be predicted from neighboring or collocated parameters signaled from disparity estimation/compensation modules that belong to higher priority layers. Such embodiments can be implemented by introducing new coding modes in the bitstream or by signaling information on a picture or a local, macroblock, level that suggests the prediction process that should be applied. In the latter case, the information could be part of the syntax of an existing coding mode.

In some embodiments, enhancement layers of the first group can code a difference signal instead of the view or frame-compatible representation. The difference signal can be derived by subtracting the prediction of the view or frame-compatible representation that corresponds to the layer from the original view or frame-compatible representation. The prediction can be the decoded picture from some other higher-priority layer that can additionally be processed with a reference processing element, such as an RPU. A similar RPU is used in a post-processing operation at the decoder in order to add the prediction to the coded difference signal and thus derive the reconstructed view or frame-compatible representation.

Figure 42:
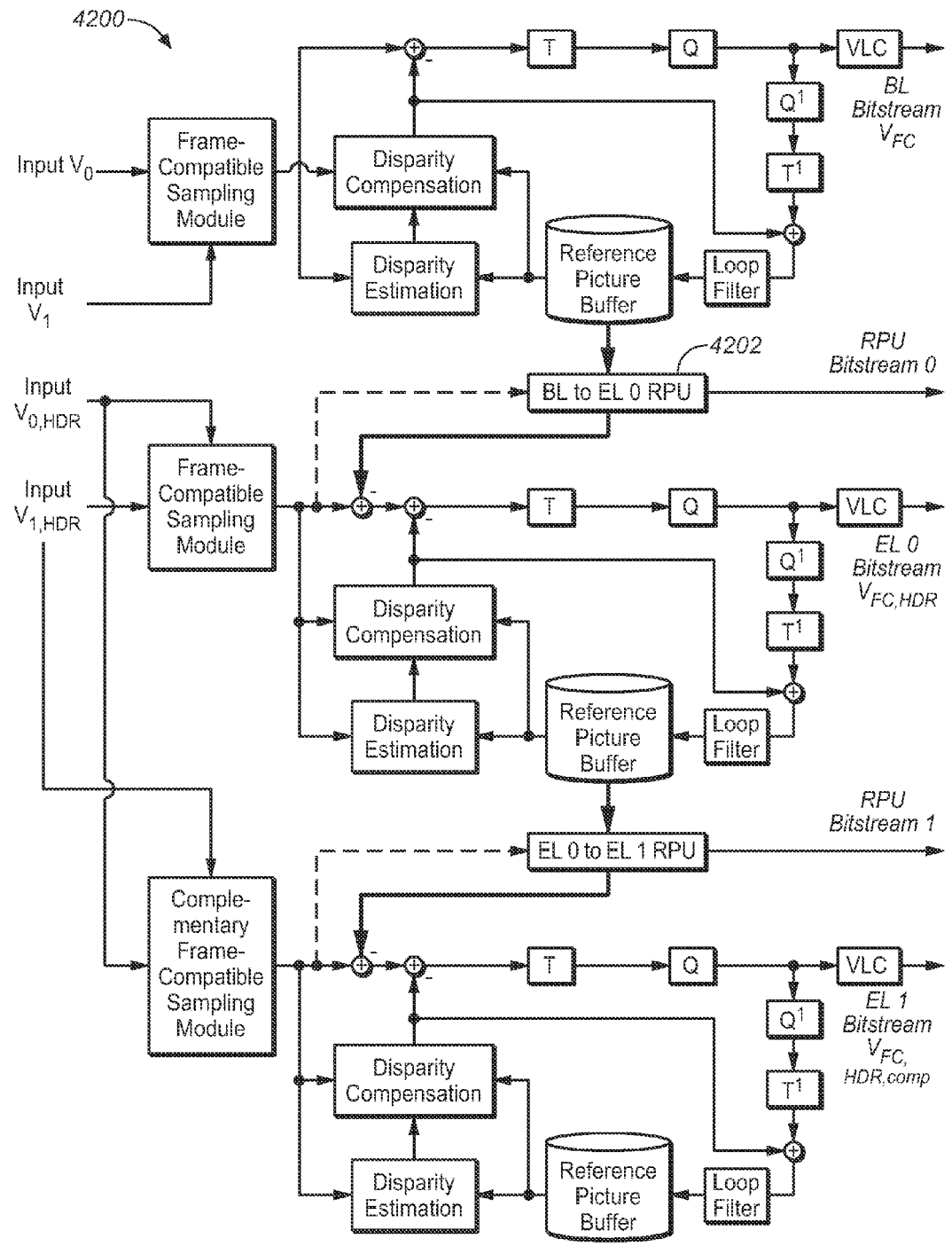
FIG. 42 shows an encoder that provides a frame-compatible base layer, a first enhancement layer with a frame-compatible HDR representation difference signal, and a second enhancement layer with the complementary frame-compatible HDR representation difference signal.
Figure 43:
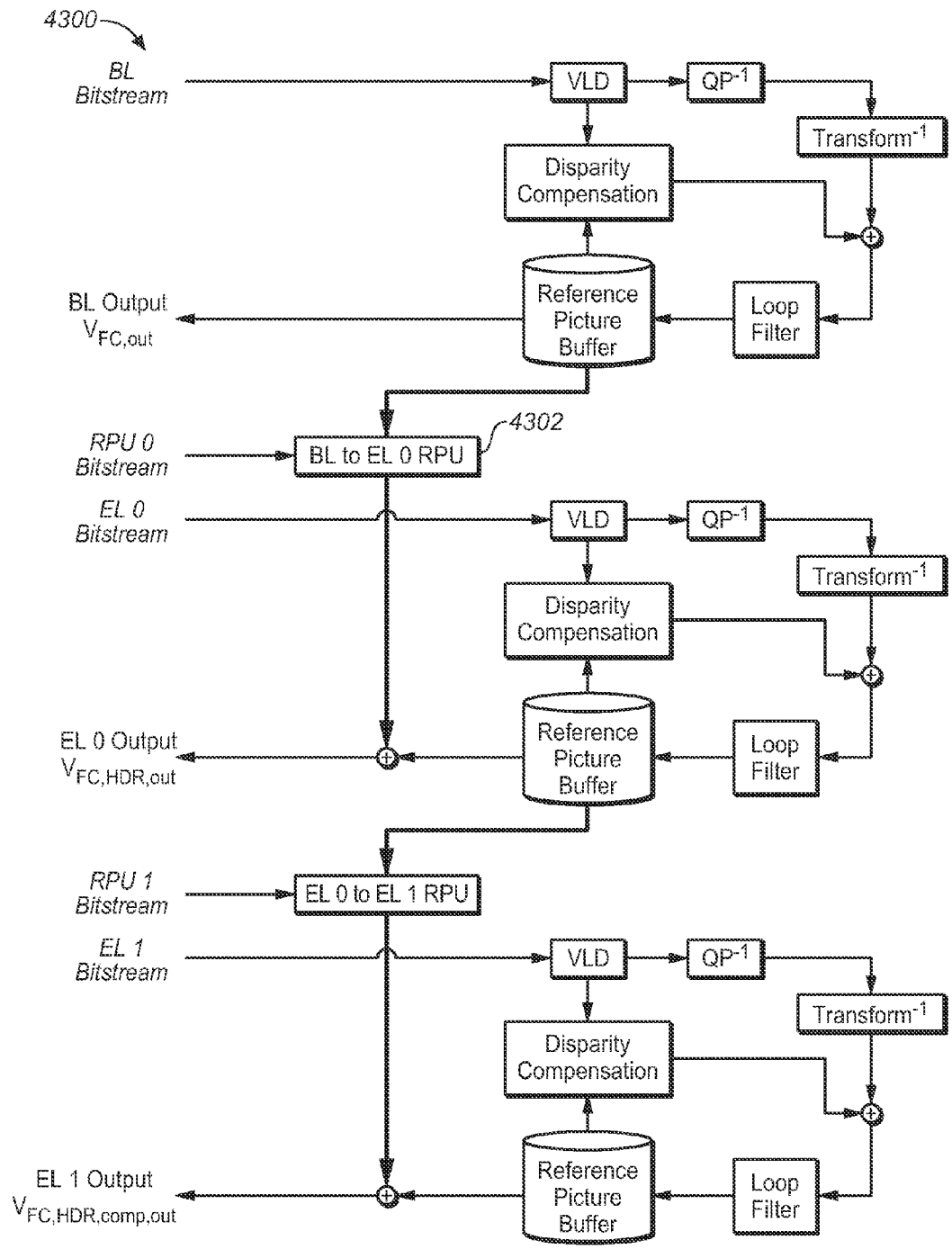
FIG. 43 shows a decoder that provides a frame-compatible base layer, a first enhancement layer with a frame-compatible HDR representation difference signal, and a second enhancement layer with the complementary frame-compatible HDR representation difference signal.

In some embodiments, the enhancement layer of the second group can code a difference signal instead of the view or frame-compatible representation. The difference signal can be derived by subtracting the prediction of the view or frame-compatible representation that corresponds to the layer from the original view or frame-compatible representation derived with a module as those shown in FIG. 9. The prediction can be the decoded picture from some other higher-priority layer that can additionally be processed with a reference processing element, such as an RPU (4202). A similar RPU (4302) is used in a post-processing operation at the decoder in order to add the prediction to the coded difference signal and thus derive the view or frame-compatible representation. Exemplary encoding (4200) and decoding (4300) arrangements for the above two embodiments are shown, for example, in FIGS. 42-43 for method A.

In some embodiments, the base layer can code a representation with a first range of frequency content, while the additional enhancement layers of the first group can provide a second range of frequency content. Their output can be combined at the decoder to provide a better representation of the original BDR data categories. This process can also be applied to the layers of the second group, such as, one carries a first range of frequencies, while a second layer or layers carries a second range of frequencies. These embodiments can be realized by applying the teachings on complementary filtering of as described in reference [8], and shown for two layers in FIG. 11. One could also repeat the process of FIG. 11 for the layers of the second group.

In summary, according to several embodiments, the present disclosure considers data enhancement or processing systems and methods, such as in-loop (part of the encoding/decoding process) or out of loop (pre-processing or post-processing stage) processing, such as deblocking and denoising, for data that may have been sampled and multiplexed with a variety of methods. These systems and methods can be applied to existing codecs (encoders and decoders), but can also extend to future encoders and decoders by also providing modifications to core components. Applications could include BLU-RAY™ video encoders and players, set-top boxes, software encoders and players but also broadcast and download solutions which are more bandwidth-constrained. Additional applications include BD video encoders, players, and video discs created in the appropriate format, or even content and systems targeted for other applications such as broadcast, satellite, and IPTV systems, etc.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. C. Hutchison, "Introducing DLP 3-D TV", http://www.dlp.com/downloads/Introducing DLP 3D HDTV Whitepaper.pdf

[2] Advanced video coding for generic audiovisual services, http://www.itu.int/rec/recommendation.asp?type=folders&lang=e&parent=T-REC-H.264, March 2010.

[3] SMPTE 421M, "VC-1 Compressed Video Bitstream Format and Decoding Process", April 2006.

[4] J. Bankoski, P. Wilkins, and Y. Xu, "Technical Overview of VP8, an Open Source Video Codecs for the Web", Google Inc. Technical Report, 2010.

[5] A. Tourapis, P. Pahalawatta, A. Leontaris, K. Stec, and W. Husak, "Encoding and Decoding Architecture for Format Compatible 3D Video Delivery," U.S. patent application Ser. No. 13/376,707 filed 7 Dec. 2011.

[6] A. Leontaris, A. Tourapis, and P. Pahalawatta, "Enhancement Methods for Sampled and Multiplexed Image and Video Data," International Patent Application No. PCT/US2011/044556 filed 19 Jul. 2011.

[7] A. Tourapis, A. Leontaris, P. Pahalawatta, and K. Stec, "Directed Interpolation and Post-Processing," U.S. patent application Ser. No. 13/255,308 filed 8 Sep. 2011.

[8] P. Pahalawatta, A. Tourapis, W. Husak, "System And Methods For Multi-Layered Image and Video Delivery Using Reference Processing Signals", International Patent Application No. PCT/US2011/042990 filed 6 Jul. 2011.

[9] A. Leontaris, A. Tourapis, P. Pahalawatta, K. J. Stec, and W. J. Husak, "Systems and Methods for Multi-Layered Frame-Compatible Video Delivery", International Patent Application No. PCT/US2011/044757 filed 20 Jul. 2011.

[10] K. Minoo, V. Kung, D. Baylon, K. Panusopone, A. Luthra, and J. H. Kim, "On scalable resolution enhancement of frame-compatible stereoscopic 3D video", MPEG Document m18486, MPEG2010, October 2010.

[11] Y. Gao, Y. Wu, "Applications and requirements for color bit depth SVC." Document No JVT-U049, October 2006.

[12] Y. Gao, Y. Wu, "Bit depth scalability", Document no JVT-V061, January 2007.

[13] M. Winken, H. Schwarz, D. Marne, T. Wiegand, "SVC bit depth scalability," Document no JVT-V078, January 2007.

[14] A. Tourapis, A. Leontaris, Z. Li, "Bitdepth and Color Scalable Video Coding", International Patent Application No. PCT/US2012/028370, filed 8 Mar. 2012; "Reference Processing for Bitdepth and Color Format Scalable Video Coding", International Patent Application No. PCT/US2012/028371 filed 8 Mar. 2012; "Joint Rate Distortion Optimization for Bitdepth Color Format Scalable Video Coding", International Patent Application No. PCT/US2012/028366 filed 8 Mar. 2012; and "Pre-Processing for Bitdepth and Color Format Scalable Video Coding", International Patent Application No. PCT/US2012/028368 filed 8 Mar. 2012.

[15] Walter Gish, et al., "Compatible Compression of High Dynamic Range, Visual Dynamic Range, and Wide Color Gamut Video", U.S. patent application Ser. No. 13/091,311 filed 21 Apr. 2011.

[16] Walter Gish, et al., "Extending Image Dynamic Range", International Patent Application No. PCT/US2011/048861 filed 23 Aug. 2011.

[17] Image Tech Research, "Dolby AVC Visual Dynamic Range (AVC HDR) Media Codec", September 2010.

[18] T. Wiegand, W.-J. Han, B. Bross, J.-R. Ohm, and G. J. Sullivan, "WD3: Working Draft 3 of High Efficiency Video Coding", ITU-T/ISO/IEC JCT-VC, Doc. JCTVC-E603, March 2011.

[19] F. Bossen, D. Flynn, K. Sühring, "JCT-VC AHG report: Software development and HM software technical evaluation", Document no JCTVC-D003, January 2011.

[20] A. Segall, Y. Su, "System for bit-depth scalable coding," Document no JVT-W113, April 2007.

[21] S. Liu, A. Vetro, "SVC bit-depth scalability results", Document no JVT-Y067, October 2010.

[22] A. M. Tourapis, P. Pahalawatta, A. Leontaris, Y. He, Y. Ye, K. Stec, and W. Husak, "A Frame Compatible System for 3D Delivery," ISO/IEC JTC1/SC29/WG11 MPEG2010, M17925, Geneva, Switzerland, July 2010.

The invention claimed is:

1. A method of encoding input video data into bitstreams, the input video data comprising a plurality of video data categories being two or more views or being two views and a depth map indicating multi-view depth information, the method comprising:

providing a first basic dynamic range (BDR) layer, the first BDR layer comprising a frame-compatible BDR representation of the plurality of video data categories from the input video data; and providing a layer grouping, the layer grouping comprising at least one second higher dynamic range (HDR) layer and one third HDR layer, the second HDR layer comprising a second frame-compatible HDR representation of the plurality of video data categories from the input video data, and the third HDR layer comprising a third frame-compatible HDR representation of the plurality of video data categories from the input video data, the third frame-compatible HDR representation being complementary with respect to the second frame-compatible HDR representation;

providing a further layer grouping, the further layer grouping comprising at least one fourth BDR layer comprising a fourth frame-compatible BDR representation of the plurality of video data categories from the input video data, the fourth frame-compatible BDR representation being complementary with respect to the first frame-compatible BDR representation;

encoding the first BDR layer to generate a first layer bitstream;

generating a first layer filtered reconstructed image based on the first layer bitstream in a first layer reference picture buffer;

encoding the fourth BDR layer to generate a fourth layer bitstream, wherein the fourth layer bitstream is generated by considering at least one selected from the group consisting of: a difference between the fourth frame-compatible BDR representation and the first layer filtered reconstructed image, inter prediction of temporally decoded pictures of the fourth BDR layer, and intra prediction of the fourth BDR layer;

generating a fourth layer filtered reconstructed image based on the fourth layer bitstream in a fourth layer reference picture buffer encoding the second HDR layer to generate a second layer bitstream, wherein the second layer bitstream is generated by considering at least one selected from the group consisting of: a difference between the second frame-compatible HDR representation and the first layer filtered reconstructed image, inter prediction of temporally decoded pictures of the second HDR layer, and intra prediction of the second HDR layer;

generating a second layer filtered reconstructed image based on the second layer bitstream in a second layer reference picture buffer; and encoding the third HDR layer to generate a third layer bitstream, wherein the third layer bitstream is generated by considering at least one selected from the group consisting of: a difference between the third frame-compatible HDR representation and the second layer filtered reconstructed image, inter prediction of temporally decoded pictures of the third HDR layer, intra prediction of the third HDR layer, and a difference between the third frame-compatible HDR representation, the second layer filtered reconstructed image, and the fourth layer filtered reconstructed image;

wherein the first BDR layer is a base layer, and the fourth BDR layer, the second HDR layer, and the third HDR layer are enhancement layers; and wherein the method further comprises:

reference processing one or more of the first layer filtered reconstructed image, the fourth layer filtered reconstructed image, and the second layer filtered reconstructed image with a plurality of reference processing units, the reference processing comprising at least one of de-multiplexing, up-sampling, de-interlacing, frequency filtering, and interpolating the filtered reconstructed images, wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

2. The method according to claim 1, further comprising providing further layers, the number of further layers determined according to the number of video data categories of the input video data.

3. A method of encoding input video data into bitstreams, the input video data comprising a plurality of video data categories being two or more views or being two views and a depth map indicating multi-view depth information, the method comprising:

providing a first layer, wherein the first layer comprises a frame-compatible representation of the plurality of video data categories from the input video data;

providing a layer grouping, the layer grouping comprising at least one second BDR layer and one third BDR layer, the second BDR layer comprising a second frame-compatible representation of the plurality of video data categories from the input video data, and the third BDR layer comprising a third frame-compatible BDR representation of the plurality of video data categories from the input video data;

providing a further layer grouping, the further layer grouping comprising at least one fourth HDR layer and a fifth HDR layer, the fourth HDR layer comprising a fourth HDR representation of the plurality of video data categories from the input video data, and the fifth HDR layer comprising a fifth HDR representation of the plurality of video data categories from the input video data;

encoding the first layer to generate a first layer bitstream;

generating a first layer filtered reconstructed image based on the first layer bitstream in a first layer reference picture buffer;

encoding the second BDR layer to generate a second layer bitstream, wherein the second layer bitstream is generated by considering at least one selected from the group consisting of: a difference between the second frame-compatible BDR representation and the first layer filtered reconstructed image, inter prediction of temporally decoded pictures of the second BDR layer, and intra prediction of the second BDR layer;

generating a second layer filtered reconstructed image based on the second layer bitstream in a second layer reference picture buffer;

encoding the third BDR layer to generate a third layer bitstream, wherein the third layer bitstream is generated by considering at least one selected from the group consisting of: a difference between the third BDR representation, the first layer filtered reconstructed image, and the second layer filtered reconstructed image, inter prediction of temporally decoded pictures of the third BDR layer, and intra prediction of the third BDR layer;

generating a third layer filtered reconstructed image based on the third layer bitstream in a third layer reference picture buffer;

encoding the fourth HDR layer to generate a fourth layer bitstream, wherein the fourth layer bitstream is generated by considering at least one selected from the group consisting of: a difference between the fourth HDR representation and the third layer filtered reconstructed image, inter prediction of temporally decoded pictures of the fourth HDR layer, and intra prediction of the fourth HDR layer;

generating the fourth layer filtered reconstructed image based on the fourth layer bitstream in a fourth layer reference picture buffer;

encoding the fifth HDR layer to generate a fifth layer bitstream, wherein the fifth layer bitstream is generated by considering at least one selected from the group consisting of: a difference between the fifth HDR representation, third layer filtered reconstructed image, and the fourth layer filtered reconstructed image, inter prediction of temporally decoded pictures of the fifth HDR layer, and intra prediction of the fifth HDR layer;

wherein the first layer is a base layer, and the second BDR layer, the third BDR layer, the fourth HDR layer, and the fifth HDR layer are enhancement layers, or first layer, the second BDR layer, and the third BDR layer are base layers, and the fourth HDR layer and the fifth HDR layer are enhancement layers; and wherein the method further comprises:

reference processing one or more of the first layer filtered reconstructed image, the second layer filtered reconstructed image, the third layer filtered reconstructed image, and the fourth layer filtered reconstructed image with a plurality of reference processing units, the reference processing comprising at least one of de-multiplexing, up-sampling, de-interlacing, frequency filtering, and interpolating the filtered reconstructed images, wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

4. A method of encoding input video data into bitstreams, the input video data comprising a plurality of video data categories being two or more views or being two views and a depth map indicating multi-view depth information, the method comprising:

providing a first layer, wherein the first layer comprises a frame-compatible representation of the plurality of video data categories from the input video data;

providing a layer grouping, the further layer grouping comprising at least one second BDR layer, the second BDR layer comprising a second frame-compatible BDR representation of the plurality of video data categories from the input video data, the second frame-compatible BDR representation being a multiplexed second representation of a first data category and a second data category;

providing a further layer grouping, the second group comprising at least one third HDR layer, the third HDR layer comprising a third frame-compatible HDR representation of the plurality of video data categories from the input video data, the third frame-compatible HDR representation being a multiplexed third layer representation of a third data category and a fourth data category;

encoding the first layer to generate a first layer bitstream;

generating a first layer filtered reconstructed image based on the first layer bitstream in a first layer reference picture buffer;

encoding the second BDR layer to generate a second layer bitstream, wherein the second layer bitstream is generated by considering at least one selected from the group consisting of: a difference between the second layer multiplexed representation and the first layer filtered reconstructed image, inter prediction of temporally decoded pictures of the second BDR layer, and intra prediction of the second BDR layer;

generating a second layer filtered reconstructed image based on the second layer bitstream in a second layer reference picture buffer; and encoding the third HDR layer to generate a third layer bitstream, wherein the third layer bitstream is generated by considering at least one selected from the group consisting of: a difference between the third layer multiplexed frame-compatible representation and the second layer filtered reconstructed image, inter prediction of temporally decoded pictures of the third HDR layer, and intra prediction of the third HDR layer;

wherein the first layer is a base layer, and the second BDR layer and the third BDR layer are enhancement layers; and wherein the method further comprises:

reference processing one or more of the first layer filtered reconstructed image and the second layer filtered reconstructed image with a plurality of reference processing units, the reference processing comprising at least one of de-multiplexing, up-sampling, de-interlacing, frequency filtering, tone mapping, and interpolating the filtered reconstructed images, wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

5. A method of encoding input video data into bitstreams, the input video data comprising a plurality of video data categories being two or more views or being two views and a depth map indicating multi-view depth information, the method comprising:

providing a first layer, wherein the first layer comprises a frame-compatible representation of the plurality of video data categories from the input video data;

providing a layer grouping, the layer grouping comprising at least one second BDR layer comprising a second frame-compatible BDR representation of the plurality of video data categories from the input video data, the second frame-compatible BDR representation being complementary with respect to the first layer representation;

providing a further layer grouping, the second group comprising at least one third HDR layer and a fourth HDR layer, the third HDR layer comprising a third HDR representation of the plurality of video data categories from the input video data, and the fourth HDR layer comprising a fourth HDR representation of the plurality of video data categories from the input video data;

encoding the first layer to generate a first layer bitstream;

generating a first layer filtered reconstructed image based on the first layer bitstream in a first layer reference picture buffer;

encoding the second BDR layer to generate a second layer bitstream, wherein the second layer bitstream is generated by considering at least one selected from the group consisting of: a difference between the second BDR representation and the first layer filtered reconstructed image, inter prediction of temporally decoded pictures of the second BDR layer, and intra prediction of the second BDR layer;

generating a second layer filtered reconstructed image based on the second layer bitstream in a second layer reference picture buffer encoding the third HDR layer to generate a third layer bitstream, wherein the third layer bitstream is generated by considering at least one selected from the group consisting of: a difference between the third HDR representation, the first layer filtered reconstructed image, and the second layer filtered reconstructed image, inter prediction of temporally decoded pictures of the third HDR layer, and intra prediction of the third HDR layer;

generating a third layer filtered reconstructed image based on the third layer bitstream in a third layer reference picture buffer; and encoding the fourth HDR layer to generate a fourth layer bitstream, wherein the fourth layer bitstream is generated by considering at least one selected from the group consisting of: a difference between the fourth HDR representation, the first layer filtered reconstructed image, the second layer filtered reconstructed image, and the third layer filtered reconstructed image, inter prediction of temporally decoded pictures of the fourth HDR layer, and intra prediction of the fourth HDR layer;

wherein the first layer is a base layer and all other layers are enhancement layers; and wherein the method further comprises:

reference processing one or more of the first layer filtered reconstructed image, the second layer filtered reconstructed image, and the third layer filtered reconstructed image with a plurality of reference processing units, the reference processing comprising at least one of de-multiplexing, up-sampling, de-interlacing, frequency filtering, and interpolating the filtered reconstructed images, wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

6. The method according to claim 5, wherein
the reference processing for the third HDR layer and/or the fourth HDR layer are predicted from the first layer reconstructed image and/or the second layer reconstructed image.

7. A method of encoding input video data into bitstreams, the input video data comprising a plurality of video data categories being two or more views or being two views and a depth map indicating multi-view depth information, the method comprising:

providing a first layer, wherein the first layer comprises a first BDR layer representation of a first video data category from the input video data;

providing a layer grouping, the layer grouping comprising at least one second BDR layer comprising a second BDR representation of a second video data category from the input video data;

providing a further grouping, the further grouping comprising at least one third HDR layer and a fourth HDR layer, the third HDR layer comprising a third HDR representation of a third video data category from the input video data, and the fourth HDR layer comprising a fourth HDR representation of a fourth video data category from the input video data;

encoding the first layer to generate a first layer bitstream;

generating a first layer filtered reconstructed image based on the first layer bitstream in a first layer reference picture buffer;

encoding the second BDR layer to generate a second layer bitstream, wherein the second layer bitstream is generated by considering at least one selected from the group consisting of: a difference between the second BDR representation and the first layer filtered reconstructed image, inter prediction of temporally decoded pictures of the second BDR layer, and intra prediction of the second BDR layer;

generating a second layer filtered reconstructed image based on the second layer bitstream in a second layer reference picture buffer;

encoding the third HDR layer to generate a third layer bitstream, wherein the third layer bitstream is generated by considering at least one selected from the group consisting of: a difference between the third HDR representation and the first layer filtered reconstructed image, inter prediction of temporally decoded pictures of the third HDR layer, and intra prediction of the third HDR layer;

generating a third layer filtered reconstructed image based on the third layer bitstream in a third layer reference picture buffer; and encoding the fourth HDR layer to generate a fourth layer bitstream, wherein the fourth layer bitstream is generated by considering at least one selected from the group consisting of: a difference between the fourth HDR representation, the second layer filtered reconstructed image, and the third layer filtered reconstructed image, inter prediction of temporally decoded pictures of the fourth HDR layer, and intra prediction of the fourth HDR layer;

wherein the first layer is a base layer and all other layers are enhancement layers; and wherein the method further comprises:

reference processing one or more of the first layer filtered reconstructed image, the second layer filtered reconstructed image, and the third layer filtered reconstructed image with a plurality of reference processing units, the reference processing comprising at least one of de-multiplexing, up-sampling, de-interlacing, frequency filtering, and interpolating the filtered reconstructed images, wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

8. A method of encoding input video data into bitstreams, the input video data comprising a plurality of video data categories being two or more views or being two views and a depth map indicating multi-view depth information, the method comprising:
providing a first layer, wherein the first layer comprises a first BDR representation of a first video data category from the input video data;
providing a layer grouping, the layer grouping comprising at least one second BDR layer comprising a second BDR representation of a second video data category from the input video data;
providing a further layer grouping, the further layer grouping comprising at least one third HDR layer, the third HDR layer comprising a third HDR representation of the plurality of video data categories from the input video data, the third frame-compatible HDR representation being a frame-compatible multiplexed HDR representation of a third data category and a fourth data category;
encoding the first layer to generate a first layer bitstream;
generating a first layer filtered reconstructed image based on the first layer bitstream in a first layer reference picture buffer;
encoding the second BDR layer to generate a second layer bitstream, wherein the second layer bitstream is generated by considering at least one selected from the group consisting of: a difference between the second BDR representation and the first layer filtered reconstructed image, inter prediction of temporally decoded pictures of the second BDR layer, and intra prediction of the BDR second layer;
generating a second layer filtered reconstructed image based on the second layer bitstream in a second layer reference picture buffer;
encoding the third HDR layer to generate a third layer bitstream, wherein the third layer bitstream is generated by considering at least one selected from the group consisting of: a difference between the third HDR representation, the first layer filtered reconstructed image, and the second layer filtered reconstructed image, inter prediction of temporally decoded pictures of the third HDR layer, and intra prediction of the third HDR layer; and
generating a third layer filtered reconstructed image based on the third layer bitstream in a third layer reference picture buffer;
wherein the first layer is a base layer and all other layers are enhancement layers; and
wherein the method further comprises:
reference processing one or more of the first layer filtered reconstructed image, and the second layer filtered reconstructed image with a plurality of reference processing units,
the reference processing comprising at least one of de-multiplexing, up-sampling, de-interlacing, frequency filtering, and interpolating the filtered reconstructed images,
wherein reference processing is performed on reference pictures at the base layer picture puffer for enhancing inter-layer prediction for one or more of the enhancement layers and on reference pictures in the reference picture buffers of higher-priority enhancement layers belonging to a same layer grouping having at least two enhancement layers for enhancing inter-layer prediction for one or more of the enhancement layers in that same layer grouping.

9. The method according to claim 1, wherein
the generating the filtered reconstructed images further comprises generating and storing the filtered reconstructed images.

10. The method according to claim 1, wherein
the encoding of the first layer comprises:
performing disparity estimation on the first layer representation of the video data categories from the input video data with the filtered reconstructed image from the first layer reference picture buffer to generate disparity estimation parameters;
performing disparity compensation on the first layer disparity estimation parameters with the filtered reconstructed image from the first layer reference picture buffer to generate disparity compensation parameters;
taking a difference between the first layer representation and the first layer disparity compensation parameters to obtain first layer residuals, the first layer residual being associated with the video data category;
performing transformation and quantization on the first layer residuals to obtain first layer quantized transform residuals; and
performing entropy encoding on the first layer quantized transform residuals, thus generating the first layer bitstream.

11. The method according to claim 10, wherein
the method is performed to each layer.

12. The method according to claim 10, wherein
generating the first layer filtered reconstructed pictures comprises:
performing transformation and quantization of the first layer residuals to obtain first layer quantized transform residuals;
performing inverse quantization and inverse transformation of the first layer quantized transform residuals to obtain first layer inverse processed residuals; and
generating the first layer filtered reconstructed image by combining the first layer inverse processed residuals and the first layer disparity compensation parameters.

13. The method according to claim 10, further comprising loop filtering the first layer reconstructed image to obtain the first layer filtered reconstructed image, wherein pictures in the first layer reference picture buffer are based on the filtered first layer filtered reconstructed pictures.

14. The method according to claim 1, wherein
when a data category combined with a complementary representation of the same data category yields a full-resolution representation of the data category.

15. The method according to claim 1, wherein
the reference processing comprises inter-layer prediction from a depth map to a frame-compatible representation.

16. The method according to claim 1, wherein
the first group is a standard dynamic range representation and the second group is a high dynamic representation.

17. The method according to claim 1, The method according to any one of the previous claims, wherein a first data category for the frame-compatible representation comprises even or odd columns for the first data category and a second data category for the frame-compatible representation comprises odd or even columns for the second data category.

18. The method according to claim 1, wherein
a plurality of the reference picture buffers is controlled with memory management control operations (MMCO).

19. The method according to claim 1, further comprising
controlling generation of reference picture lists with a reordering signal, wherein the reference picture lists point to reference pictures in the reference picture buffers.

20. The method according to claim 19, wherein
the reordering comprises inter-layer references.

21. The method according to claim 19, wherein
the reordering comprises removing inter-layer references from the reference picture buffers, and keeping reference pictures in the reference picture buffer.

22. The method according to claim 1, wherein
same motion information is reused in the reference processing units across all layers.

23. The method according to claim 22, wherein
the reused motion information is processed differently for each of the layers.

24. The method according to claim 23, wherein
the motion information comprises motion parameters with constraints, the constraints configured to provide efficient prediction of the motion parameters from the motion parameters of a higher priority layer.

25. The method according to claim 1, wherein
the enhancement layer in the layer grouping comprises encoding a difference signal, the difference signal being a difference between an original frame-compatible representation and a predicted frame-compatible representation.

* * * * *